US012472149B2

(12) United States Patent
De Bilde et al.

(10) Patent No.: US 12,472,149 B2
(45) Date of Patent: Nov. 18, 2025

(54) MULTILAYERED PHARMACEUTICALLY ACTIVE COMPOUND-RELEASING MICROPARTICLES IN A LIQUID DOSAGE FORM

(71) Applicant: BE PHARBEL MANUFACTURING, Courcelles (BE)

(72) Inventors: Geoffrey De Bilde, Pont-à-Celles (BE); Pierre Sacre, Maizeret (BE); Jonathan Goole, Woluwe-Saint-Lambert (BE); Karim Amighi, Woluwe Saint-Pierre (BE); Olivier Laloux, Court-Saint-Etienne (BE); Georges Guillaume, Ophain (BE); Vincent Stephenne, Baisy-Thy (BE)

(73) Assignee: BE PHARBEL MANUFACTURING, Courcelles (BE)

( * ) Notice: Subject to any disclaimer, the term of this patent is extended or adjusted under 35 U.S.C. 154(b) by 680 days.

(21) Appl. No.: 16/825,873

(22) Filed: Mar. 20, 2020

(65) Prior Publication Data

US 2020/0315978 A1 Oct. 8, 2020

Related U.S. Application Data

(63) Continuation-in-part of application No. 15/745,190, filed as application No. PCT/EP2016/066597 on Jul. 13, 2016, now abandoned.

(30) Foreign Application Priority Data

Jul. 17, 2015 (EP) .................................... 15177221
Jul. 1, 2016 (BE) ................................... 2016/5555

(51) Int. Cl.
*A61K 9/50* (2006.01)
*A61K 31/426* (2006.01)
*A61K 9/00* (2006.01)

(52) U.S. Cl.
CPC .......... *A61K 9/5073* (2013.01); *A61K 9/5015* (2013.01); *A61K 9/5026* (2013.01); *A61K 31/426* (2013.01); *A61K 9/0053* (2013.01)

(58) Field of Classification Search
None
See application file for complete search history.

(56) References Cited

U.S. PATENT DOCUMENTS

| | | | |
|---|---|---|---|
| 4,786,505 A | 11/1988 | Lovgren et al. | |
| 4,859,469 A * | 8/1989 | Baudier | A61K 31/275 424/458 |
| 4,886,812 A * | 12/1989 | Griss | C07D 277/82 514/321 |
| 5,292,522 A | 3/1994 | Petereit et al. | |
| 2003/0064036 A1* | 4/2003 | Petereit | A61K 47/20 424/49 |
| 2004/0005362 A1 | 1/2004 | Taneja | |
| 2005/0238719 A1 | 10/2005 | Buzsaky | |
| 2005/0244517 A1 | 11/2005 | Hall et al. | |
| 2006/0165807 A1* | 7/2006 | Castan | A61K 9/5015 424/490 |
| 2006/0204576 A1 | 9/2006 | Petereit et al. | |
| 2011/0033532 A1 | 2/2011 | Angel et al. | |
| 2011/0223245 A1* | 9/2011 | Cifter | A61K 31/428 424/452 |
| 2013/0266658 A1 | 10/2013 | Wei et al. | |

FOREIGN PATENT DOCUMENTS

| | | | | |
|---|---|---|---|---|
| DE | 102010052847 A1 | 5/2012 | | |
| EP | 0247983 A2 | 12/1987 | | |
| EP | 1051174 A1 | 11/2000 | | |
| EP | 1728512 A1 | 12/2006 | | |
| EP | 1830816 A1 | 9/2007 | | |
| EP | 2870965 A1 * | 5/2015 | ........... | A61K 31/428 |
| JP | 2014-508812 A | 4/2014 | | |
| WO | 0044353 A1 | 8/2000 | | |
| WO | 2004004682 A2 | 1/2004 | | |
| WO | 2004004718 A1 | 1/2004 | | |
| WO | 2004004719 A1 | 1/2004 | | |
| WO | 2007052121 A2 | 5/2007 | | |
| WO | WO-2010010138 A1 * | 1/2010 | ........... | A61K 31/428 |
| WO | WO-2010132205 A1 * | 11/2010 | ............... | A23G 3/02 |
| WO | 2011/107855 A1 | 9/2011 | | |
| WO | WO-2011107855 A2 * | 9/2011 | ......... | A61K 31/4015 |
| WO | 2012/129551 A1 | 9/2012 | | |

OTHER PUBLICATIONS

Hans-Ulrich Petereit; "New aspects of moisture protection and insulation of solid dosage forms with EUDRAGIT E PO," 33st Internationl EUDRAGIT Workshop, 2001, pp. 1-17. (Year: 2001).*

(Continued)

Primary Examiner — Tigabu Kassa
Assistant Examiner — Ivan A Greene
(74) Attorney, Agent, or Firm — MH2 Technology Law Group, LLP

(57) ABSTRACT

A controlled-release multilayer microparticle containing a pharmaceutically active compound, which is intended for oral administration or direct administration in the stomach, which may be done using a liquid pharmaceutical composition containing the microparticle. The microparticle may include: a core that includes the pharmaceutically active compound, which may be pramipexole; a controlled-release intermediate coating layer; and an outmost external protection coating layer surrounding the controlled-release intermediate coating layer. The external protection coating layer may include a mixture of: a hydrophilic gastro-soluble component which is insoluble in aqueous media at a pH of between 6.5 and 7.5; and a hydrophobic and/or insoluble component. Also disclosed are a liquid pharmaceutical composition containing the microparticles, a kit for the preparation of the liquid pharmaceutical composition, a pharmaceutical solid composition reconstitutable as the liquid composition, a process of preparing the liquid composition, and a method for treating disease with the liquid composition.

16 Claims, 12 Drawing Sheets

(56) References Cited

OTHER PUBLICATIONS

Cellets(TM)—"Pellets from microcrystalline cellulose," product brochure retrieved from <https://cellets.com/> on Dec. 17, 2021, pp. 1-6. (Year: 2021).*
The Merck Index Online entry for Pramipexole (M9095), p. 1. (Year: 2013).*
Ansel et al.; "Pharmaceutical Dosage Forms and Drug Delivery Systems, 7th ed.," 1999, Chapter 13, pp. 346-364. (Year: 1999).*
Sinko; "Martin's Physical Pharmacy and Pharmaceutical Science, 5th ed.," 2006, Chapter 18, pp. 499-530. (Year: 2006).*
Hans-Ulrich Petereit; "New aspects of moisture protection and insulation of solid dosage forms with EUDRAGIT E PO," 33st International EUDRAGIT Workshop, 2001, pp. 1-17. (Year: 2001).*
Ansel et al.; "Pharmaceutical Dosage Forms and Drug Delivery Systems, 7th ed.," 1999, Chapters 2-3, pp. 23-100. (Year: 1999).*
Patra et al.; "Pharmaceutical significance of Eudragit: A review," 2017, Elsevier; Future Journal of Pharmaceutical Sciences, vol. 3, pp. 33-45. (Year: 2017).*
European Office Action dated May 24, 2019 in EP Application No. 16738185.4, pp. 1-4.
Evonik Industries, product literature for "EUDRAGIT Acrylic Polymers for Solid Oral Dosage Forms," pp. 1-11. (Year: 2008).
International Search Report and Written Opinion dated Sep. 13, 2016 in corresponding PCT Application No. PCT/EP2016/066597, pp. 1-10.
Angiolillo, D. et al., "Impact of concomitant low-dose aspirin on the safety and tolerability of naproxen and esomeprazole magnesium delayed-release tablets in patients requiring chronic nonsteroidal anti-inflammatory drug therapy: an analysis from 5 Phase III studies", J Thromb Thrombolysis, 2014, vol. 38, pp. 11-23.
Darwiche, A. et al., "Rheology of polymer solutions using colloidal-probe atomic force microscopy", Physical Review E., 2013, vol. 87, 10 pages.
Dressman, J. et al., "Dissolution Testing as a Prognostic Tool for Oral Drug Absorption: Immediate Release Dosage Forms", Pharmaceutical Research, 1998, vol. 15, No. 1, pp. 11-22.
Ha, J. et al., "Preparation and Evaluation of Sustained-Release Doxazosin Mesylate Pellets", Chem Pharm Bull, 2013, vol. 61, No. 4, pp. 371-378.
Harris, M. et al., "Aqueous Polymeric Coating for Modified Release Oral Dosage Forms", Aqueous Polymeric Coatings for Pharmaceutical Dosage Forms, Third Edition, 2008, pp. 81-100.
Hirani, J. et al., "Orally Disintegrating Tablets: A Review", Tropical Journal of Pharmaceutical Research, Apr. 2009, vol. 8, No. 2, pp. 161-172.
Huanbutta, K. et al., "Application of multiple stepwise spinning disk processing for the synthesis of poly(methyl acrylates) coated chitosan-diclofenac sodium nanoparticles for colonic drug delivery", European Journal of Pharmaceutical Sciences, 2013, vol. 50, pp. 303-311.
Lyseng-Williamson, K., "Torasemide Prolonged Release", Drugs, 2009, vol. 69, No. 10, pp. 1363-1372.
Mousavi, M. et al., "Relationship between continuous use of low-dose enteric-coated aspirin and gastrointestinal injuries in patients with gastrointestinal hemorrhage", Turk J Gastroenterol, 2013, vol. 24, No. 2, pp. 93-98.
Qiu, Y. et al., "Influence of Drug Property and Product Design on In Vitro-In Vivo Correlation of Complex Modified-Release Dosage Forms", Journal of Pharmaceutical Sciences, 2014, vol. 103, pp. 507-516.
Tirpude, R. et al., "Rabeprazole sodium delayed-release multiparticulates: Effect of enteric coating layers on product performance", Journal of Advanced Pharmaceutical Technology Research, 2011, vol. 2, No. 3, pp. 184-199.
Petereit, Hans-Ulrich, "New aspects of moisture protection and insulation of solid dosage forms with EUDRAGIT E OP," 33st International EUDRAGIT Workshop, 2001, pp. 1-17.
Stoyer et al., "Solid State Interactions between the Proton Pump Inhibitor Omeprazole and Various Enteric Coating Polymers," WILEY-InterScience, Journal of Pharmaceutical Sciences, 2006, pp. 1342-1353, vol. 95, No. 6.
First Office Action for Chinese Application No. 201680054102.9 dated Apr. 2, 2020, pp. 1-24 (Includes Machine-Generated English Translation).
Notice of Reasons for Refusal for Japanese Application No. 2018-521698 dated Mar. 3, 2020, pp. 1-12 (Includes English Translation).
Communication from the European Patent Office for European Application No. 16738185.4, dated May 19, 2020.
Johnson et al., "Stability of Esomeprazole Capsule Contents After In Vitro Suspension in Common Soft Foods and Beverages," Pharmacotherapy 2003, vol. 23, No. 6, pp. 731-734.
Ronchi, Fredrica et al., "Development of an omeprazole-based delayed-release liquid oral dosage form," Elsevier, International Journal of Pharmaceuticals 2019, vol. 567, Article, 118416, pp. 1-11.
Skalsky et al., "Chemistry and Application Properties of Polymethacrylate Systems," from Aqueous polymeric coatings for pharmaceutical dosage forms, CRC Press 2008, pp. 237-277.

* cited by examiner

MULTILAYERED PHARMACEUTICALLY ACTIVE COMPOUND-RELEASING MICROPARTICLES IN A LIQUID DOSAGE FORM

CROSS-REFERENCE TO RELATED APPLICATIONS

This application is a Continuation-in-Part of U.S. patent application Ser. No. 15/745,190 filed 16 Jan. 2018, which is a U.S. National Stage application of International Application No. PCT/EP2016/066597 filed 13 Jul. 2016, which claims priority to European Application No. 15177221.7 filed 17 Jul. 2015 and to Belgium Application No. 2016/5555 filed 1 Jul. 2016, all of which are hereby expressly incorporated by reference in their entireties into the present application.

The invention pertains to the technical field of pharmaceutically active compound controlled-release composition. In particular, it relates to a multilayered pharmaceutically active compound-releasing microparticle in a liquid pharmaceutical composition wherein the pharmaceutically active compound is pramipexole.

Oral administration of pharmaceutically active compounds improves the quality of life of patients including by improving the ease of administration and by increasing both patient compliance and cost-effectiveness. The flexibility of designing a broad variety of different pharmaceutical compositions further makes oral administration attractive for formulating a large variety of active ingredients.

A large number of pharmaceutically active compounds can achieve maximal pharmacological effect or limit unwanted side effects when they are released from the pharmaceutical composition in the intestine (i.e. proximal or distal intestinal region).

In particular many pharmaceutically active 'fragile' compounds lack stability in the acidic environment of the stomach. These are referred to as acid-labile compounds. Examples of acid-labile compounds are antibiotics (such as erythromycin) or proton pump inhibitors (PPI) such as omeprazole, lansoprazole, tenatoprazole, esomeprazole, rabeprazole, pantoprazole etc. Acid-labile compounds delivered in the acidic environment of the stomach (either by oral administration or by direct infusion or injection in the stomach) are susceptible to degradation prior to reaching the enteric region where they can be absorbed in the systemic circulation.

Other oral-delivered pharmaceutically active compounds may provoke irritation of the gastric mucosa and should be, therefore, preferably shielded from the gastric environments until their release in the intestine (e.g. intestinal and colonic release) where they can be absorbed in the systemic circulation. This is the case for pharmaceutically active compounds such as non-steroidal inflammatory pharmaceutically active compounds (e.g. diclofenac, aceclofenac, ibuprofen, ketoprofen, oxaprozine, indomethacin, meloxicam, piroxicam, tenoxicam, celecoxib, etoricoxib, nabumetone, naproxen or aspirin).

Other oral-delivered pharmaceutically active compounds need to specifically target a section of the gastro intestinal tract other than the stomach such as the colon or the intestine. This is the case of chemotherapeutic agents for (colon) cancer treatment (e.g. fluorinated pyrimidines such as hexycarbamoyl-5-fuorouracil (carmofur), uracil/tegafur, uracil/tegafur/leucovorin, capecitabine etc.) or for the treatment of intestinal bowl diseases such as ulcerative colitis or Crohn's disease such as anti-inflammatory drugs (e.g. mesalazine, sulfasalazine) or oral corticosteroids (e.g. budesonide, beclometasone dipropionate).

Finally other oral-delivered pharmaceutically active compounds have an improved or prolonged therapeutic efficacy by using a sustained-release pharmaceutical composition, such as antibiotics (e.g. amoxicilline, cefadroxil, cefazoline, cefuroxime, cefotaxime, meropenem, aztreonam, erythromycin, azithromycin, clarithromycin, roxithromycin, spiramycine, doxycycline, minocycline, clindamycin, lincomycin, ciprofloxacin, levofloxacin, moxifloxacin, norfloxacin, ofloxacin, sulfamethazole & trimethroprim, isoniazide, rifampicine, ethambutol, gentamicine), antihypertensive (e.g. nifedipine, amlodipine, barnidipine, felodipine, isradipine, lacidipine, lercanidipine, nicardipine, nimodipine, nisoldipine, nitrendipine, verapamil, diltiazem), antiarrhythmic (e.g. flecaïnide, amiodarone, cibenzoline, disopyramide, sotalol), beta-blocker (e.g. metoprolol, atenolol, bisoprolol, carvedilol, celiprolol, esmolol, labetalol, nebivolol, propranolol), diuretics (e.g. furosemide, torasemide, spironolactone), anti-inflammatory drugs (e.g. ibuprofen, diclofenac), analgesics (e.g. tramadol, oxycodone, morphine, fentanyl, buprenorphin) or alpha-1 blockers (e.g. alfuzonie, tamsulosine, silodosine, terazosine), dopamine agonist such as pramipexole and ropinirole.

Thus, the advantages of using oral administration combined to the need to protect the pharmaceutically active compounds from the gastric environment, to target a specific-site release or to prolong their action explain that current oral pharmaceutical compositions often have controlled-release properties (e.g. delayed release, prolonged release, sustained release etc.).

However, as it is the case for the pharmaceutically active compounds, orally administered pharmaceutical compositions are also exposed to the wide range of highly variable conditions during their transit throughout the gastro-intestinal tract. Food ingestion and the type of meal—caloric content, volume, viscosity, physical state—influence the gastric physiology and thus the release of the pharmaceutically active compound from the pharmaceutical composition. Indeed, the gastric pH fluctuates around pH 1-3 in fasted state and within a range of pH 3-7 in fed condition, whereas intestinal pH ranges between 6 and 8.

Oral pharmaceutical compositions can be either liquid pharmaceutical compositions (suspensions, emulsions, dispersion of a solid in a liquid, solutions, pastes, gels) or solid pharmaceutical compositions (e.g., tablets, microparticles (also called pellets), capsules, powders).

Solid oral pharmaceutical compositions are usually preferred compared to liquid pharmaceutical compositions because they enable to reach increased stability of the incorporated pharmaceutically active compound during storage. Indeed, the presence of water or other solvent in the liquid pharmaceutical compositions, and even, the presence of substantial amount of residual moisture in solid dosage forms is known to increase both biological contamination and physico-chemical degradation of pharmaceutically active compounds. Solid oral pharmaceutical compositions include single unit pharmaceutical compositions such as tablets, capsules or powders and multi-unit pharmaceutical compositions such as microparticles (pellets). Both single unit and multi-unit pharmaceutical compositions may be coated in order to bypass physiological issues met in the gastrointestinal tract such as modification of pH or enzymatic and microbiological activities. Multiple-units controlled-release pharmaceutical compositions (i.e. delayed- or prolonged- or sustained-release) contained in a capsule or a tablet (e.g. MUPS®), which can be opened or dispersed prior to their administration, are particularly convenient for the development of controlled-release pharmaceutical compositions since they enable to reduce the inter-subject variability of the absorbed dose of the pharmaceutically active compound, lower-dose dumping probability, to have a more reproducible gastric residence time and to show better dispersion throughout the gastrointestinal tract.

Multiple-unit pharmaceutical compositions are particularly convenient for the preparation of controlled-delivery systems of acid-labile pharmaceutically active compounds such as, for example, PPIs. Several approaches exist for improving the properties of the enteric coating of the microparticles leading to both optimized protection of the acid-labile pharmaceutically active compounds and control of their release in the intestinal region.

Whereas the use of solid oral pharmaceutical compositions have many advantages, large size solid oral pharmaceutical compositions like tablets or capsules can hardly be orally administered to young patients (pediatric patients) and other patients having difficulty to swallow or who cannot swallow at all (such as critically ill patients). These include pediatric and geriatric patients who have difficulty in swallowing or chewing solid pharmaceutical compositions; patients who are unwilling to take solid pharmaceutical compositions due to fear of choking; very elderly patients who may not be able to swallow a daily dose of a pharmaceutically active compound or schizophrenic patients in an institutional setting who may try to hide a conventional tablet under their tongue to avoid their daily dose therapeutics. Young children, elderly or ill patients often need controlled-release pharmaceutical compositions to simplify the dosing schedule.

For patients having swallowing difficulties or impairment, the oral administration of multiple-units controlled-release pharmaceutical compositions (i.e. delayed- or sustained-release) contained in a capsule or a tablet (e.g. MUPS®) also raise problems. In these cases, sometimes, prior to their administration, microparticles contained in the capsule or tablet may be dispersed within an appropriate liquid-vehicle such as water, yoghourt, fruit juice or applesauce. However, the risk exists that the microparticles are chewed prior to swallowing leading to the potential degradation of the pharmaceutically active compounds (such as acid-labile pharmaceutically active compounds) in the acidic gastric environment once ingested and therefore to the lack of control of the administered doses. Other disadvantages of dispersing microparticles in a liquid vehicle prior to ingestion are handling error (e.g. inappropriate dispersion, loss of fractions of microparticles) due to repeated manipulation of the dosage form, the possible unpleasant taste (in case of chewing of the microparticles) and unpleasant palatability due, namely, to the size of the microparticles, which provoke inappropriate dosage or rejection by the patients, in particular by young patients.

In some other cases, the multiple-units controlled-release pharmaceutical compositions (i.e. delayed- or sustained-release) contained in a capsule or a tablet (e.g. MUPS®) are mixed with a water solution (such as sterile water for injection) and administered directly into the stomach by using a nasogastric tube or a gastronomy tube. However, in this case, aggregations of the microparticles and obstructions issues exist.

A dose taken from the mixture of the controlled-release microparticles with a liquid vehicle (reconstituted mixture) is usually administered rapidly to the patient because often the coatings (e.g. enteric coatings) dissolve at pH greater than 6 (such as what is found in the intestinal region) leading to degradation of the pharmaceutically active compound.

Other issues are associated to such preparation such as lack of convenience and thus poor compliance, lack of reproducible administered doses, risks of chewing of the microparticles provoking degradation of the pharmaceutically active compound even before ingestion.

Thus there is a need of developing a liquid pharmaceutical composition containing controlled-release multi-layered microparticles that maintains the pharmaceutically active compounds unchanged (non-degraded, pharmacologically active) and the controlled release unchanged for long periods of time at 4° C., advantageously at room temperature (i.e. 20-25° C.), for example several days (such as 7 days), in particular several weeks (such as two weeks, more particularly 6 or even 7 weeks), more particularly 28 days and that ensures several uniform doses to be taken (e.g. 1-2 doses, more particularly 1 dose, per day up to 28 days), each dose containing substantially the same concentration of the pharmaceutically active compound and having substantially the same release profile.

This is highly awaited for answering the need of administrating multi-layered controlled-release microparticles comprising pharmaceutically active compounds to patients with swallowing impairment, such as pediatric patients, elderly patients, critically ill patients and disabled individuals.

Patent application EP 0 247 983 describes microgranules containing omeprazole intended for oral administration, containing two layers around a core containing omeprazole. However the outmost external layer is an enteric layer and therefore is not stable in an aqueous media. On the contrary it is recommended in this patent application that this enteric layer have a very low water content in order to allow keeping a good stability of the dosage form during long term storage (page 4 line 25-page 5 line 2). This enteric coating layer will make the dosage form insoluble in an acid medium but will quickly dissolves or disintegrates in a neutral or alkaline medium (page 8 lines 14 to 18). Therefore these micro-granules cannot be administered in the form of an aqueous liquid pharmaceutical composition.

DE 10 2010 052 847 describes a process of preparation of granules containing proton pump inhibitor. These granules are intended for the oral administration in the solid form such as tablets, capsules or caplets and the like. Moreover they could not be used in the form of a pharmaceutical aqueous liquid composition since they would not be stable. Indeed the pellets contained in said granules containing proton pump inhibitor are enterically coated and therefore would not be stable in an aqueous media having a pH greater than 5.

WO 00/44353 describes a solid pharmaceutical composition for slow release of active ingredient in the gastrointestinal tract. No liquid pharmaceutical composition is described.

WO 2004/04718 describes a liquid formulation of acid-labile active ingredients consisting in dispersing enteric-coated micro-granules (size 100-900 μm) in an acidic aqueous phase having a pH lower than 6.0 and, accordingly, preventing the micro-granule to dissolve. The inventors claim better stability, low liquid volumes needed and suitability to ad-hoc dosage through naso-gastric tubes or gastrostomy tubes. Any of the well-known enteric coating materials are suitable for use in this invention. Other ingredients such as flavoring agents, surfactants, sweeteners and other well-known excipients can be added. WO 2004/04718 also discloses a kit comprising 2 containers, one for the liquid and the other for the micro-granules, enabling the liquid formulation to be prepared before use.

However, WO 2004/04718 intends mainly to prepare an extemporaneous aqueous suspension of microgranules, in particular for its injection using a naso-gastric tube. The preparation is therefore used within a short period of time after the mixing of the microgranules with the liquid vehicle (maximum 60 minutes). This document therefore does not disclose a liquid pharmaceutical composition which is stable for more than a few hours when stored at ambient temperature before its administration.

WO 2004/04719 discloses a composition comprising a PPI (lansoprazole) and a liquid vehicle which pH is greater than 6.5 and which viscosity is at least 50 cP (Brookfield). The formulation comprising the PPI, a metal salt buffer and a thickening agent and having a viscosity of at least 50 cP is claimed to maintain an appropriate and homogeneous concentration of PPI throughout the formulation for 15 minutes. The formulation is claimed to be easily administered to patients having difficulty to swallow. Thus similarly to WO 2004/04718, this document intends to prepare liquid pharmaceutical compositions which are stable only during very short periods of time. Therefore WO 2004/04719 does not provide a solution to the problem of preparing a liquid pharmaceutical composition which is stable for more than 15 minutes.

EP 1830816 relates to a solid rapidly gelling oral pharmaceutical composition comprising a PPI compound as the active ingredient distributed in a multitude of enteric coated pellets and a suspension modifying granulate. EP1830816 describes the use of dry suspension modifying granulate and the PPI-containing enteric coated particles are dissolved/suspended in an aqueous vehicle providing a viscous liquid formulation for oral administration. The suspension modifying granulate, when suspended in water, creates quickly and reproducibly an aqueous vehicle having the desired pH, stable viscosity and viscoelasticity. Therefore the objective of EP 1830816 is to ensure that the liquid pharmaceutical composition is stable during only short periods of time prior to their administration (namely via e.g. naso-gastric tubes). The solution proposed by EP 1830816 is to use the suspension modifying granulate described therein and is claimed to be appropriate for permitting to create rapidly and reproducibly a viscous liquid environment for the microparticles that ensure the delivery of the right dose of pharmaceutically active compounds shortly after the viscous liquid preparation. The microparticles, as such, are not modified. In particular, the external layer of the microparticles is the enteric coating and it is not surrounded by any additional overcoat as mentioned paragraph [0045] of this document. EP 1830816 does not provide any indication that the enteric coating will be stable over time once the liquid pharmaceutical composition is prepared. In addition, there is no indication that the concentration of the pharmacologically active compound will remain essentially unchanged over time.

EP 1051174 discloses a formulation of enteric-coated, omeprazole-containing microgranules, said formulation containing at least one hydrophobic substance selected to increase the stability of omeprazole namely by protecting it from the ambient moisture (40-75% moisture at 25° C.) and to reach the pharmaceutically active compound dissolution profile. The hydrophobic substance (Gelucire, silicone) can be located within the different layers of the multi-layer assembly including within the outer enteric coating. In the latter case, EP 1051174 discloses the use of hydrophobic agents such as glycerides in association with the components classically used for preparing the enteric coating. Therefore such a coating, which is still an enteric coating, should not be stable in an aqueous environment of a liquid having a pH above 6. Moreover, as such EP 1051174 does not provide any indication that the microparticles of EP 1051174 are able to withstand the hydrolytic action of water contained in the liquid phase when they are dispersed in it.

EP 1728512 discloses the use of waxes for improving the controlled-release of active ingredients contained in pharmaceutical compositions. This document discloses a controlled-release pharmaceutical composition comprising: 1) a core containing an acid-unstable physiologically active substance and a disintegrant; and 2) a release-controlling coating which covers the core, and which contains a water-insoluble polymer, an enteric polymer and a hydrophobic wax. Similarly to EP 1051174, the objective of the invention is to reach appropriate pharmaceutically active compound dissolution profiles and is not meant to increase the stability of the modified-release multilayer microparticles within a liquid pharmaceutical composition. Moreover, such a coating will still have the function of an enteric coating layer and therefore should not be stable over time in a liquid preparation having a pH above 6.

Therefore, there is still the need to formulate controlled-release microparticles in the form of a liquid pharmaceutical composition intended for oral administration which should be stable for a longer period of time than the prior art, and in particular for more than a few hours at ambient temperature, more particularly when the pharmaceutically active compound is pramipexole which is intended to be used in elderly patients (patients suffering in particular from Parkinson's disease, more particularly early-stage Parkinson's disease). Indeed patients with Parkinson's disease have swallowing difficulties because they lose the control of their mouth and throat muscles.

This is particularly needed in the case of pharmaceutically active compounds that should not be released in the stomach, such as acid-labile or gastric mucosa aggressive pharmaceutically active compounds, and which therefore need protection from the gastric environment after ingestion. This is also needed in the case of oral-delivered pharmaceutically active compounds which need to specifically target a section of the gastro intestinal tract other than the stomach or in the case of oral-delivered pharmaceutically active compounds having an improved or prolonged therapeutic efficacy by using a sustained-release pharmaceutical composition such as pramipexole.

The inventors have surprisingly discover that it is possible to formulate such a composition by coating the microparticles with an outmost coating layer which will protect the particles from the deleterious effect of the liquid medium and therefore prevent the release of the pharmaceutically active compounds in the liquid pharmaceutical composition before its ingestion while maintaining the efficacy of said pharmaceutically active compound, the outmost coating layer being soluble in the gastric fluid in order for the particles to recover their controlled-release characteristic that was shielded by this layer, after administration in the stomach.

Therefore the particles thus obtained will at the same time:
  be stable in the liquid pharmaceutical composition for at least several hours, preferably several days, and more preferably several weeks, in particular at least 7 weeks, when stored at 4° C. and even at 25° C.
  have a controlled-release characteristic after ingestion, in particular in order to avoid the release of the pharmaceutically active compound contained therein in the stomach or to only begin the release in the stomach, the release being finished outside the stomach (prolonged or sustained release).

In order to have this function, the inventors have discover that the outmost coating layer should contain a mixture of
a) a hydrophilic gastro-soluble component which is insoluble in aqueous media at a pH of between 6.5 and 7.5, advantageously at a pH>5, and
b) a hydrophobic and/or insoluble component.

Therefore the present invention concerns a controlled-release multilayer microparticle containing a pharmaceutically active compound, said microparticle being intended for oral administration or direct administration in the stomach in the form of a liquid pharmaceutical composition and said microparticle comprising:

a core comprising the pharmaceutically active compound, said pharmaceutically active compound being pramipexole;
a controlled-release intermediate coating layer;
an outmost external protection coating layer surrounding the controlled-release intermediate coating layer and containing a mixture of
a) a hydrophilic gastro-soluble component which is insoluble in aqueous media at a pH of between 6.5 and 7.5, advantageously at a pH >6.5, more advantageously at a pH>6, in particular at a pH >5.0 and
b) a hydrophobic and/or insoluble component.

In the sense of the present invention, the term "controlled-release microparticle" is intended to mean that the release of the pharmaceutically active compound contained in the microparticle is controlled and in particular that the release of the whole quantity of the pharmaceutically active compound contained therein should not happen in the stomach (e.g. enteric release, colon targeting or sustained-release or prolonged-release dosage forms). Therefore it is not an immediate release microparticle. In some cases such as for pramipexole, the release of the pharmaceutically active compound could begin in the stomach (e.g. prolonged or sustained release dosage form) and then continue in other part of the gastrointestinal tract, for example for a duration of at least 24 hours.

Therefore the "controlled-release microparticle" could be a delayed or prolonged or sustained release microparticle. In case of a delayed release, the release of the pharmaceutically active compound could happen in the intestine or even in the colon. Advantageously the controlled-release microparticle is a prolonged or sustained release microparticle.

The term "pharmaceutically active compound" is intended to mean any compound having a pharmaceutically activity in the organism of an animal, in particular in the organism of a human being.

In particular the pharmaceutically active compound is:
an acid labile pharmaceutically active compound or an unstable pharmaceutically active compound in acidic conditions such as a proton pump inhibitor, in particular chosen in the group consisting of omeprazole, lansoprazole, tenatoprazole, esomeprazole, rabeprazole and pantoprazole, or an antibiotic such as erythromycin or antiretroviral agent (such as didanosine) or peptides and proteins (such as insulin, pancreatin);
a pharmaceutically active compound which is aggressive for the gastric mucosa such as a non-steroidal anti-inflammatory pharmaceutically active compound (e.g. diclofenac, aceclofenac, ibuprofen, ketoprofen, oxaprozine, indomethacin, meloxicam, piroxicam, tenoxicam, celecoxib, etoricoxib, nabumetone, naproxen or aspirin);
a pharmaceutically active compound whose therapeutical efficacy needs to be improved or prolonged with a sustained-release or prolonged-released layer, such as an antibiotic (e.g. amoxicillin, cefadroxil, cefazoline, cefuroxime, cefotaxime, meropenem, aztreonam, eruthromycin, azithromycin, clarithromycin, roxithromycin, spiramycine, doxycycline, minocycline, clindamycin, lincomycin, ciprofloxacin, levofloxacin, moxifloxacin, norfloxacin, ofloxacin, sulfamethazole & trimethroprim, isoniazide, rifampicine, ethambutol, gentamicine), an antihypertensive (e.g. nifedipine, amlodipine, barnidipine, felodipine, isradipine, lacidipine, lercanidipine, nicardipine, nimodipine, nisoldipine, nitrendipine, verapamil, diltiazem), an antiarrhythmic (e.g. flecaïinide, amiodarone, cibenzoline, disopyramide, sotalol), a beta-blocker (e.g. metoprolol, atenolol, bisoprolol, carvedilol, celiprolol, esmolol, labetalol, nebivolol, propranolol), a diuretic (e.g. furosemide, torasemide, spironolactone), a cardiovascular drug (e.g. doxazosine), an anti-inflammatory drugs (e.g. ibuprofen, diclofenac) or an analgesic (e.g. tramadol, oxycodone, morphine) or dopamine agonist such as pramipexole, apomorphine, rotigotine or ropinirole or MAO-B Inhibitors such as selegiline or rasagiline, anticholinergiques such as trihexyphenidyl or benztropine.
a pharmaceutically active compound who needs to target a section of the gastrointestinal tract other than the stomach such as a chemotherapeutic agent for (colon) cancer treatment (e.g. fluorinated pyrimidines such as hexycarbamoyl-5-fuorouracil (carmofur), uracil/tegafur, uracil/tegafur/leucovorin, capecitabine etc.) or for the treatment of intestinal bowl diseases such as ulcerative colitis or Crohn's disease such as an anti-inflammatory drug (e.g. mesalazine, sulfasalazine) or an oral corticosteroid (e.g. budesonide, beclometasone dipropionate), in particular budesomide, beclometasone dipropionate and mesalazine, more particularly budesomide.

The pharmaceutically active compound can be a Selective Serotonin Reuptake Inhibitor (SSRIs) such as citalopram, Escitalopram, fluoxetine, fluvoxamine, paroxetine, sertraline or vilazadone, a Serotonin/Norepinephrine Reuptake Inhibitor (SSRNIs) such as desvenlafaxine, duloxetine, minalcipran, nefazodone or venlafaxine, a Tricyclic or related compound such as Amitriptyline, imipramine, nortriptyline or trazodone, another antidepressant such as bupropion or mirtazapine, a benzodiazepine such as alprazolam, clonazepam, diazepam or lorazepam, another anti-anxiety medication such as buspirone or propranolol, an acetylcholinesterase inhibitor such as donepezil, galantamine or rivastigmine, another medication to improve thinking such as memantine, methylphenidate or modafinil, a medication for hallucinations and psychosis such as pimavanserin, clozapine or quetiapine, a medication for nausea and vomiting such as carbidopa, domperidone, ondansetron trimethobenzamide, metoclopramide, prochlorperazine or promethazine, a medication for constipation such as lubiprostone or polyethylene glycol 3350 or a medications for excessive drooling such as glycopyrrolate.

Advantageously the pharmaceutically active compound is an acid labile pharmaceutically active compound or an unstable pharmaceutically active compound in acidic conditions such as a proton pump inhibitor, in particular chosen in the group consisting of omeprazole, lansoprazole, tenatoprazole, esomeprazole, rabeprazole and pantoprazole, or an antibiotic such as erythromycin. More advantageously it is a proton pump inhibitor, in particular chosen in the group consisting of omeprazole, lansoprazole, tenatoprazole, esomeprazole (such as esomeprazole magnesium), rabeprazole and pantoprazole. Still more advantageously it is omeprazole or esomeprazole, in particular omeprazole.

In another particular embodiment the pharmaceutically active compound is chosen in the group consisting of diclofenac, tenoxicam, furosemide and tramadol, more particularly consisting of diclofenac and tenoxicam.

In another particular embodiment the pharmaceutically active compound is a dopamine agonist such as pramipexole or ropinirole, in particular pramipexole, more particularly pramipexole dihydrochloride monohydrate.

In the sense of the present invention, the term "multilayer microparticle" is intended to mean a particle containing at least two layers, in particular more than two layers, surrounding its core.

Indeed the microparticle according to the present invention will comprise:
 a core comprising the pharmaceutically active compound;
 a controlled-release intermediate coating layer;
 an outmost external protection coating layer surrounding the controlled-release intermediate coating layer and containing a mixture of
  a) a hydrophilic gastro-soluble component which is insoluble in aqueous media at a pH of between 6.5 and 7.5, advantageously at a pH>5.0 and
  b) a hydrophobic and/or insoluble component.

Therefore the multilayered microparticle has an "onion-like" structure, and is in particular prepared according to stepwise or continuous coating steps using one or several coating techniques well-known to the skilled person in the art such as extrusion-spheronisation, layering techniques such as powder layering, solution layering, suspension layering, balling, congealing techniques or spray congealing techniques. Suitable equipment such as coating pan, coating, granulator or fluidized bed coating apparatus using water and/or organic solvents may be used.

The core of the microparticle according to the present invention comprises the pharmaceutically active compound.

The pharmaceutically active compound may therefore for example be incorporated within the neutral pellet which is the core of the microparticle (inner part) and/or within one or several layers of the multilayered microparticle, which are for example sprayed onto the pellet (active layer). In this latter case, the core will consist in a multilayer core.

The core of the microparticle which is to be layered can be pellets used as the support for the successive coatings. Lactose and sugars are preferably avoided to enable the administration of the stable liquid pharmaceutical composition to diabetic patients.

The pellets can be e.g. microcrystalline cellulose and cellulose derivatives, mannitol (such as M-Cell®), starch, silica or different oxides, organic polymers, inorganic salts alone or in mixtures, non-pareils, lipid or carnauba wax (e.g. C-Wax Pellets®) or calcium hydrogenophosphate, advantageously it is microcrystalline cellulose, in particular sold under the trade name Cellets®, such as Cellets® 1000, 700, 500, 350, 263, 200, 100.

They can be manufactured by process known in the art such as extrusion-spheronization, layering techniques, holt-melt extrusion or spray congealing techniques.

Alternatively, the core could already contain the pharmaceutically active compound (e.g., if produced by an extrusion/spheronisation process). The core may comprise the pharmaceutically active compounds in the form of agglomerates, compacts etc.

Advantageously, the core of the microparticle is a layered core consisting of a neutral pellet on which a layer containing the pharmaceutically active compound (active layer=first layer) is applied by a technique well known in the art, such as by spraying. More advantageously the solvent used in the spraying technique can be an alcohol such as ethanol. The layer containing the pharmaceutically active compound can also contain a binder and other suitable excipients such as a bulk agent. Binders are for example cellulose derivatives such as hydroxypropyl methylcellulose, hydroxypropyl cellulose and carboxymethyl-cellulose sodium, polyvinyl pyrrolidone (PVP), polyethylene glycols, polyvinyl alcohols, sugars (preferably not lactose), starches etc., in particular it is a hydrophilic binder such as PVP. It can also comprise a lubricant or anti-tacking agent or a bulk agent such as talc or an anti-oxidant such as palmitate ascorbyle. Advantageously the layer containing the pharmaceutically active compound, in particular pramipexole, also contains a binder such as PVP and a bulk agent such as talc.

In case the pharmaceutically active compound is omeprazole, esomeprazole, diclofenac or tenoxicam, the layer containing these pharmaceutically active compounds which surrounds the core can also contain polyvinylpyrrolidone (PVP), palmitate ascorbyle and talc.

In case the pharmaceutically active compound is budesonide, beclomethasone dipropionate, mesalazine, furosemide or tamsulosine or pramipexole or ropinirole, the layer containing these pharmaceutically active compounds which surrounds the core can also contain polyvinylpyrrolidone (PVP) and talc.

The core according to the present invention can comprise other material such as surfactants, fillers, disintegrating agents, alkaline additives alone or in admixtures.

Surfactants are for example selected in the group of non-ionic surfactant such as for instance Polysorbate 80 or ionic surfactants such as for instance sodium lauryl sulfate.

Fillers may be used in the core of the microparticle. Examples of fillers include for instance mannitol and dicalcium phosphate.

A disintegrating agent may be used in the core of the microparticle. Examples of disintegrating agents that can be used are for instance cross-linked polyvinyl pyrrolidone (i.e. Crospovidone), pregelatinized starch, microcrystalline cellulose and cross-linked sodium carboxymethyl cellulose (i.e. Croscarmellose sodium).

According to one embodiment of the invention, the pharmaceutically active compound may also be mixed with an alkaline pharmaceutically acceptable substance (or substances). Such substances can, after excluding bicarbonate salts or carbonate salts, be chosen among, but are not restricted to, substances such as the sodium, potassium, calcium, magnesium and aluminum salts of phosphoric acid, citric acid or other suitable weak inorganic or organic acids such as Disodium hydrogenophosphate dihydrate; substances normally used in antacid preparations such as aluminum, calcium and magnesium hydroxides; magnesium oxide; organic pH-buffering substances such as trihydroxymethylamino methane, basic amines or amino acids and their salts or other similar pharmaceutically acceptable pH-buffering substances.

In particular the active layer contains alkaline additives such as disodium hydrogenophosphate dihydrate, advantageously to avoid the degradation of the pharmaceutically active compound, more advantageously an acid labile pharmaceutically active compound such as omeprazole.

More advantageously, in this case, the solvent used during the preparation of the active layer which will be sprayed onto the pellet can be an alcohol such as ethanol.

In an advantageous embodiment, the weight ratio alkaline additive/ pharmaceutically active compound is within the range 30-90, in particular when the pharmaceutically active compound is an acid labile pharmaceutically active compound such as omeprazole and particularly when the alkaline additive is disodium hydrogenophosphate dihydrate.

In another particular embodiment, another layer can be included between the core and the layer containing the pharmaceutically active compound. Such a layer can comprise a film forming agent such as ethylcellulose (in particular ethocel EP), fillers such as talc and/or titanium dioxide, a plasticizer such as triethyl citrate (TEC) or acetyl triethyl citrate (ATEC), a binder and/or a lubricant as described above.

Such a layer is intended to protect the core from the osmotic effect.

In case the pharmaceutically active compound is omeprazole, such a layer can comprise ethylcellulose (such as ethocel EP), triethyl citrate (TEC), talc and titanium dioxide.

In an advantageous embodiment, the microparticle does not contain a layer between the core and the layer containing the pharmaceutically active compound.

The microparticle according to the present invention comprises a controlled-release intermediate coating layer. This layer will provide the controlled-release profile (delayed-, prolonged or sustained release using enteric, colonic or insoluble layers) depending on the pharmaceutical compound to be delivered. It will include a film-forming polymer to achieve the controlled-release properties—such as enteric (e.g. for PPI such as omeprazole, esomeprazole (in particular esomeprazole magnesium), pantoprazole, lansoprazole, tenatoprazole, rabeprazole, or diclofenac, tenoxicam), colonic (e.g. for mesalazine, budesonide, beclometasone dipropionate), insoluble (e.g. for analgesic drugs such as tramadol, diuretic drugs such as furosemide or alpha-1 blocker such as tamsulosine or dopamine agonist such as pramipexole and ropirinole) polymer.

Enteric film-forming polymers are pharmaceutically acceptable polymers such as polymers of stearic acid, palmitic acid or behenic acid, polymers like hydroxyl propyl methyl cellulose phthalate, polyvinyl acetate phthalate, cellulose acetate phthalate, methacrylic acid copolymers (e.g. Poly(methacrylic acid-co-ethyl acrylate) 1:1 such as Eudragit® L100-55 and L30D-55, Poly(methacrylic acid-co-methyl methacrylate) 1:1 and 1:2 such as Eudragit® L-100 and S-100), cellulose acetate trimellitate, carboxymethylcellulose, shellac or other suitable enteric polymers.

Colonic film-formic polymers are pharmaceutically acceptable polymers such as acrylic acid derivatives copolymers (e.g. Poly(methacrylic acid-co-methyl methacrylate) 1:1 and 1:2, Eudragit® L-100 and S-100, Poly(methyl acrylate-co-methylmethacrylate-co-methacrylic acid) 7:3:1, Eudragit® FS30D) or polymers that can be degraded by the enzymatic activity of the proximal intestine microflora (e.g. azopolymers or polysaccharides such as guar gum, pectin, chondroitin sulfate, dextran, chitosan).

Insoluble film-formic polymers are pharmaceutically acceptable polymers such as insoluble neutral (Poly(ethyl acrylate-co-methyl methacrylate) 2:1, Eudragit® NE30D) or slightly cationic (Poly(ethyl acrylate-co-methyl methacrylate-co-trimethylammonioethyl methacrylate chloride), 1:2: 0.1 and 1:2:0.2, Eudragit® RS PO and RL100 and Eudragit® RS3OD and RL30D) polymethacrylate ester derivatives or insoluble cellulose derivatives such as ethylcellulose. Advantageously, the controlled-release intermediate coating layer is a prolonged or sustained release coating layer. More advantageously the prolonged or sustained release coating layer includes at least one insoluble film-forming polymer. It can also include a mixture of insoluble film-forming polymers, in particular a mixture of two different film-forming polymers.

In an advantageous embodiment, the insoluble film-forming polymers is selected in the group consisting of copolymers of ethyl acrylate, methyl methacrylate and methacrylic acid ester with quaternary ammonium groups more particularly of slightly cationic (Poly(ethyl acrylate-co-methyl methacrylate-co-trimethylammonioethyl methacrylate chloride), 1:2:0.1 and 1:2:0.2 (Eudragit® RS PO and RL100 and Eudragit® RS3OD and RL30D)) polymethacrylate ester derivatives. More particularly it is a poly(ethyl acrylate-co-methyl methacrylate-co-trimethylammonioethyl methacrylate chloride) 1:2:0.1 (Eudragit® RS PO or Eudragit® RS30D) either alone or in admixture with a poly(ethyl acrylate-co-methyl methacrylate-co-trimethylammonioethyl methacrylate chloride) 1:2:0.2 (Eudragit® RL100 or Eudragit® RL30D). In particular the weight ratio of poly (ethyl acrylate-co-methyl methacrylate-co-trimethylammonioethyl methacrylate chloride) 1:2:0.1 (Eudragit® RS PO or Eudragit® RS30D)/poly(ethyl acrylate-co-methyl methacrylate-co-trimethylammonioethyl methacrylate chloride) 1:2:0.2 (Eudragit® RL100 or Eudragit® RL30D) is in the range 5/1-25/1, in particular in the range 8/1-20/1, more particularly in the range 9/1-9.5/0.5.

In an advantageous embodiment, the percentage of the prolonged or sustained coating layer represents 15 to 45%, advantageously 20 to 40%, more advantageously 20 to 30%, by weight of the total weight of a microparticle according to the present invention without the outmost external protection coating layer. Advantageously, the percentage of the prolonged or sustained coating layer represents 5 to 35%, more advantageously 10 to 25%, still more advantageously 10 to 20%, by weight of the total weight of a coated microparticle according to the present invention.

Therefore, advantageously the controlled-release intermediate coating layer is a delayed release coating layer such as an enteric coating layer, a colonic coating layer or an insoluble coating layer or a sustained-release or prolonged-release coating layer, in particular it is an enteric coating layer, more particularly a prolonged or sustained release coating layer.

Such a controlled-release layer can also comprise a lubricant or bulk agent such as talc, filler such as titanium dioxide, a surfactant for example selected in the group of non-ionic surfactant such as for instance polysorbate 80 and/or an antifoam agent such as silicone oil.

It can also contain pharmaceutically acceptable plasticizers to obtain the desired mechanical properties, such as flexibility and hardness of the enteric coating layer. Such plasticizers are for instance, but not restricted to, triacetin, citric acid esters such as triethyl citrate (TEC) or acetyl triethyl citrate (ATEC), phthalic acid esters, dibutyl sebacate, cetyl alcohol, polyethylene glycols, polysorbates or other plasticizers. More particularly it is triethyl citrate (TEC).

The controlled-release intermediate coating layer can be applied to the core material by coating or layering procedures in suitable equipment such as coating pan, coating, granulator or in fluidized bed coating apparatus using water and/or organic solvents for the coating process. As an alternative the controlled-release intermediate coating layer can be applied to the core material by using powder coating technique.

In case the pharmaceutically active compound is omeprazole esomeprazole, diclofenac or tenoxicam, the enteric coating layer can comprise an anionic copolymer based on methacrylic acid and ethylacrylate (Eudragit® L30D55 for example), talc, polysorbate 80, silicone oil and acetyl triethyl citrate (ATEC), in particular an anionic copolymer based on methacrylic acid and ethylacrylate (Eudragit® L30D55 for example), talc and acetyl triethyl citrate (ATEC).

In case the pharmaceutically active compound is budesonide, beclometasone dipropionate or mesalazine, the colonic coating layer can comprise an acrylic acid derivatives copolymers (e.g. Poly(methacrylic acid-co-methyl methacrylate) 1:1 and 1:2, (Eudragit® S-100 for example), talc, and triethyl citrate (TEC).

In the case the pharmaceutically active compound is budesonide, furosemide, pramipexole, ropinirole or tamsulosine, the sustained-release or prolonged-release coating layer can comprise an insoluble neutral (Poly(ethyl acrylate-co-methyl methacrylate) 2:1, Eudragit® NE30D) or slightly cationic (Poly(ethyl acrylate-co-methyl methacrylate-co-trimethylammonioethyl methacrylate chloride), 1:2:0.1 and 1:2:0.2, (Eudragit® RS PO and RL 100 and Eudragit® RS3OD and RL30D)) polymethacrylate ester derivatives or a mixture thereof. Insoluble cellulose ether polymers such as ethylcellulose, cellulose acetate can also be used in association with hydrosoluble polymers such as hydroxypropyl methyl cellulose (HPMC) to obtain the sustained release coating.

In the case the pharmaceutically active compound is budesonide, furosemide, pramipexole, ropinirole or tamsulosine, the sustained-release or prolonged-release coating layer can comprise an insoluble neutral (Poly(ethyl acrylate-co-methyl methacrylate) 2:1, Eudragit® NE30D) or slightly cationic (Poly(ethyl acrylate-co-methyl methacrylate-co-trimethylammonioethyl methacrylate chloride), 1:2:0.1 and 1:2:0.2, Eudragit® RS and RL 100 and Eudragit® RS3OD and RL30D) polymethacrylate ester derivatives or a mixture of thereof, talc, and triethyl citrate (TEC).

Advantageously in case the core contains an active layer containing alkaline additives, for example when the pharmaceutically active compound is an acid labile pharmaceutically active compound such as omeprazole or esomeprazole, in particular omeprazole, the percentage of the enteric coating layer in the microparticle according to the present invention without the outmost layer according to the invention is of at least 10% by weight based on the total weight of the microparticle without the outmost layer. This percentage is dependent on the size of the microparticles and on the type of pharmaceutically active compound and will increase if the size increases. Moreover the percentage is higher when the pharmaceutically active compound is very sensitive and should be protected in an acid environment. For example for omeprazole, this percentage of the enteric coating layer is of at least 25-30% by weight based on the total weight of the microparticle without the outmost layer The controlled-release layer can be either directly coated onto the core (which can be a layered core as previously described) for example in case the controlled release layer is a colonic release layer and the pharmaceutically active compound is budesonide, beclometasone dipropionate or mesalazine as well as in case the controlled release layer is a sustained-release or prolonged-release layer and the pharmaceutical active compound is budesonide, furosemide or tamsulosine or pramipexole or ropinirole or other intermediary layer can be included between the core and the controlled-release intermediate coating layer, for example in case the controlled release layer is an enteric release layer and the pharmaceutically active compound is omeprazole, esomeprazole, diclofenac or tenoxicam.

Therefore, in a particular embodiment, the microparticle according to the present invention contains at least another intermediate layer between the core and the controlled-release intermediate coating layer, in particular an intermediate protective coating layer.

Therefore in this latter case, optionally, one or several protective layers (advantageously one) may be added which can be composed of one or several neutral hydrophilic polymer(s) able to protect the drug incorporated in the core (or in the layer surrounding the core in case of a layered core) from potential early degradation due to the components contained in the other layers (e.g. the adjacent layers). As an illustration this is the case for acid-labile drugs such as e.g. omeprazole or esomeprazole which contact with enteric polymers comprised in the next layer containing acidic groups in their chemical structure is sufficient to inactivate the drug. One or several separating layers may also be used to avoid unwanted potential interactions/incompatibilities between the polymer (such as film-forming polymers) and the constituents of the adjacent layers. As an illustration this is the case of enteric polymer containing acidic groups of a first layer which can interact with alkaline groups-containing gastrosoluble polymers of the next layer.

The materials for the protective or separating layer(s) are well known by the one skilled in the art and are for example sugars, polyethylene glycol, polyvinyl pyrrolidone (PVP), polyvinyl alcohol, polyvinyl acetate, hydroxypropylcellulose, methyl-cellulose, ethylcellulose, hydroxypropyl methyl cellulose (HPMC) and the like, used alone or in mixture.

Additives such as plasticizers, colorants, pigments, fillers, anti-tacking and anti-static agents, such as for instance magnesium stearate, titanium dioxide, fumed silica, talc and other additives may also be included into the separating or protective layer(s).

The separating layer(s) may serve as a diffusion barrier and may act as a pH-buffering zone. The pH-buffering properties of the separating layer(s) can be further strengthened by introducing into the layer(s) pH modifying or buffering substances, after excluding bicarbonate salts or carbonate salts, chosen from a group of compounds usually used in antacid formulations such as, for instance, magnesium oxide, hydroxide, aluminum or calcium hydroxide or silicate; composite aluminum/magnesium compounds such as, for instance $MgO.Al_2O_3.2SiO_2.nH_2O$, or other pharmaceutically acceptable pH-buffering compounds such as, for instance the sodium, potassium, calcium, magnesium and aluminum salts of phosphoric, citric or other suitable, weak, inorganic or organic acids; or suitable organic bases, including basic amino acids or amines and salts thereof. Talc or other compounds may be added to increase the thickness of the layer(s) and thereby strengthen the diffusion barrier.

The separating or protective layer(s) can be applied to the core material by coating or layering procedures in suitable equipment such as coating pan, coating, granulator or in fluidized bed coating apparatus using water and/or organic solvents for the coating process. As an alternative the separating or protective layer(s) can be applied to the core material by using powder coating technique.

In case the pharmaceutically active compound is omeprazole esomeprazole, diclofenac or tenoxicam, the microparticle according to the invention can contain at least one, advantageously only one, intermediate separating layer. Said protective layer can contain titanium dioxide, talc and PVP.

However in a particularly advantageous embodiment, in particular when the pharmaceutically active compound is pramipexole, the controlled-release layer is directly coated onto the core (which is advantageously a layered core as previously described) and there is no other intermediary layer included between the core and the controlled-release intermediate coating layer.

The microparticle according to the present invention comprises also an outmost external protection coating layer surrounding the controlled-release intermediate coating layer.

This outmost external protection coating layer can be disposed just on top of the controlled-release intermediate coating layer with no intermediate layer between the controlled-release intermediate coating layer and the outmost external protection layer.

In a particular embodiment and particularly in case the pharmaceutically active compound is a proton pump inhibitor or pramipexole, at least one intermediate layer can be present between the outmost external protection coating layer and the controlled-release intermediate coating layer. The intermediate coating layer will be an intermediate protective layer as described above. In case the pharmaceutically active compound is omeprazole, esomeprazole, diclofenac, tenoxicam, budesonide, beclometasone dipropionate, mesalazine, furosemide, pramipexole, ropinirole or tamsulosine the microparticle according to the invention can contain at least one, advantageously only one, intermediate protective layer. Said protective layer can contain talc and PVP.

In any case, this outmost external protection coating layer will be the only layer of the microparticle in direct contact with the liquid medium having a pH>6 when the microparticles are dispersed in it in order to form the liquid pharmaceutical composition.

Said outmost external protection layer has barrier properties i.e., it protects the incorporated pharmaceutically active compound from water-, solvent- or other liquid phase components-mediated degradation from the liquid medium having a pH>6 of the liquid pharmaceutical composition in which the microparticles are dispersed and avoids the early diffusion/release of the pharmaceutically active compound from the microparticles into the liquid medium during its storage, thus prior to its administration.

This outmost external protection layer will also protect the controlled-release layer from the liquid medium having a pH>6 of the liquid pharmaceutical composition in which the microparticles are dispersed. It will therefore prevent the dissolution and/or degradation of this layer in said liquid.

This outmost external protection layer is also susceptible to degradation in the acidic environment of the gastroenteric region and will therefore disappear (be degraded or dissolved) quickly in the stomach, advantageously in less than 3 hours, more advantageously in 2 hours, still more advantageously immediately (i.e. <45 min), after their contact with the gastric environment. Therefore the microparticles shortly after reaching the gastric environment will become as if the outmost external protection layer was never present and will recover their controlled-release properties. The microparticles according to the present invention will therefore recover the same characteristics (including e.g., pharmaceutically active compound release profiles) as those obtained when the multilayered microparticles without the outmost external protection coating layer are administered orally in the form of a solid oral pharmaceutical composition (ingestion of a microparticles-containing tablet or capsule, such as MUPs).

Finally the outmost external protection layer will also help the particles to stay in suspension in the liquid medium having a pH>6 in which they are dispersed. It will therefore avoid its aggregation and settlement.

For obtaining these characteristics, the outmost protection layer needs to contain a mixture of two components:

a) a hydrophilic gastro-soluble component which is insoluble in aqueous media at a pH of between 6.5 and 7.5, advantageously at a pH >5.0 and b) a hydrophobic and/or insoluble component.

Compound a) is responsible for the degradation of the microparticles in the stomach and for helping the microparticles staying in suspension in the liquid medium having a pH>6 in which they are dispersed.

Compound b) is responsible for the liquid barrier effect from the liquid medium to the core of the particle.

In the sense of the present invention the term "hydrophilic component" is intended to mean any component that is attracted to, and tends to be dissolved by water.

In the sense of the present invention the term "insoluble" is intended to mean that more than 10000 parts of solvent (volume) is necessary to dissolve one part of the component (weight).

In the sense of the present invention the term "hydrophobic component" is intended to mean a component which has no affinity with water.

Both hydrophilic and hydrophobic behavior of a molecule may be characterized by its hydrophilic-lipophilic balance (HLB) value. Currently measured by Griffin's method, an HLB value of 0 corresponds to a completely lipophilic/hydrophobic molecule, and a value of 20 corresponds to a completely hydrophilic/lipophobic molecule.

The hydrophilic gastro-soluble component (a) is therefore insoluble in the aqueous media at a pH of between 6.5 and 7.5, advantageously at a pH>6, in particular at a pH>5. On the other end, it is a gastro-soluble component, which is intended to mean that it will be at least soluble in a gastric environment, i.e. at a pH<6, more advantageously at a pH<5.5, in particular at a pH≤5.

In the sense of the present invention the term "soluble in a gastric environment" is intended to mean that 10-30 parts of the gastric fluid (volume) will dissolve one part of ingredient (weight).

In an advantageous embodiment, the hydrophilic gastro-soluble component is a cationic synthetic or natural polymer, in particular chosen in the group consisting of cationic polymer, such as a polymer based on dimethylaminomethyl methacrylate, butyl methacrylate and methyl methacrylate, chitosan and chitin. In particular it is a cationic polymer based on dimethylaminomethyl methacrylate, butyl methacrylate and methyl methacrylate, more particularly with a ratio dimethylaminomethyl methacrylate/butyl methacrylate/methyl methacrylate of 2/1/1 such as for example Eudragit E® (e.g. Eudragit® E100, Eudragit® E12,5 and Eudragit® E P0). Such a polymer has the following formula:

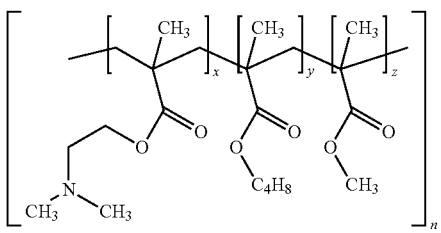

and a weight average molecular mass (Mw) based on the SEC method of around 47,000 g/mol.

Eudragit E® is soluble in aqueous fluids up to pH 5.0. However it is also swellable and permeable above pH 5.0 which makes it unsuitable to act as a barrier in a liquid for a prolonged period of time when used alone in the outmost external coating layer as exemplified in example 1.

In an advantageous embodiment, the hydrophobic and/or insoluble component (b) is chosen in the group consisting of glycerides such as glyceryl monostearate or glyceryl dibehenate (for example Compritol® 888 ATO), wax, magnesium stearate, fatty alcohol, ethyl cellulose, a copolymer based on ethyl acrylate and methyl methacrylate, in particular a copolymer of ethyl acrylate, methyl methacrylate and a low content of methacrylic acid ester with quaternary ammonium groups (the molar ratio of ethyl acrylate/methyl methacrylate/trimethylammonioethyl methacrylate being for example around 1:2:0.1, more advantageously with a weight average molar mass Mw based on the SEC method of 32 000 g/mol) such as Eudragit® RS 100, silicone, stearic acid, in particular in the group consisting of glycerides, stearic acid and magnesium stearate, more advantageously in the group consisting of magnesium stearate and glyceryl monostearate, still more advantageously it is glyceryl monostearate.

In an advantageous embodiment, the weight ratio hydrophilic gastro-soluble component/hydrophobic and/or insoluble component in the outmost external protection coating layer is of between 200/1 to 1/1, in particular of 50/1 to 5/1, more advantageously of between 7/1 to 30/1, in particular of between 10/1 to 30/1, still more advantageously between 19/1 and 21/1, in particular of around 20/1.

In another advantageous embodiment, the outmost external protection coating layer represents 8 to 40%, in particular 15-35%, more particularly 25-33% by weight of the total weight of the microparticles. Higher percentage than 40% coating layer can also be envisaged but they are unsuitable for processability reasons (i.e. too long manufacturing steps).

In still another advantageous embodiment, the weight percentage of the hydrophobic and/or insoluble component based on the total weight of the mixture gastro-soluble component +hydrophobic and/or insoluble component is of between 1 to 20%, more advantageously of between 2 and 15%, still more advantageously of between 4 and 14%.

In a further advantageous embodiment, the outmost external protection coating layer of the microparticle according to the invention contains another excipient, in particular a lubricant such as talc and/or an antistatic agent such as aluminum oxide. In particular it can contain a mixture of talc and aluminum oxide.

Advantageously, the microparticle according to the present invention has a median diameter $D_v(50)$ in volume (size in microns at which 50% of the sample volume is smaller and 50% is larger) measured by the laser granulometer Malvern Mastersizer 3000, with the dry dispersion unit Aero S (Malvern Instruments, UK) of between 80 µm and 2000 µm, advantageously of between 100 µm and 1000 µm, more advantageously of between 200 µm and 800 µm, still more advantageously of between 300 µm and 700 µm, in particular of between 300 µm and 600 µm. The latter dimensions enable to avoid palatability discomfort and the risks of unintentional chewing the outmost protection coating or the microparticles before swallowing.

The microparticles according to the present invention are intended for oral administration or direct administration in the stomach, in the form of a liquid pharmaceutical composition, in particular in the form of a liquid pharmaceutical composition having a pH>6, advantageously having a pH>6.5, in particular a pH of between 6.5 and 7.5, more particularly in the form of an aqueous liquid pharmaceutical composition.

Therefore, before oral administration or direct administration in the stomach, these microparticles will be added to a liquid medium, in particular a liquid medium having a pH>6, advantageously having a pH>6.5, in particular a pH of between 6.5 and 7.5. The liquid medium can be an organic or aqueous liquid medium. Advantageously it is an aqueous liquid medium.

The present invention also concerns a pharmaceutical liquid composition intended for oral administration or direct administration in the stomach comprising the microparticles according to the present invention homogeneously dispersed in a liquid medium having a pH>6, advantageously having a pH>6.5, in particular a pH of between 6.5 and 7.5, in particular a pH of between 7 and 7.5, more advantageously a pH of around 7.5. The liquid medium can be an organic or aqueous liquid medium. Advantageously it is an aqueous liquid medium.

In the sense of the present invention, the term "homogeneously distributed" (or even distribution) means that the distribution of the controlled-release multilayer microparticles according to the present invention in the first dose taken from the liquid pharmaceutical composition according to the present invention and the next doses until the last dose sampled from said liquid pharmaceutical composition according to the present invention is similar (i.e. comprised between 85% and 115% of the nominal dose, advantageously of between 90 and 110% of the nominal dose).

The liquid medium can comprise water as the liquid phase. It can also comprise other components besides the microparticles and the liquid, as known by the one skilled in the art, such as viscosifying agents, osmotic agents and/or buffering agents (pH adjusting agents), in particular it comprises viscosifying agents (viscosity increasing agent), osmotic agents and buffering agents. It can also comprise other excipients known by the one skilled in the art such as sweeteners, colorant, gums, cellulose or acrylic derivatives, thixotropic or pseudoplastic agents, stabilizers, preservative agents (such as methylparaben and/or potassium sorbate), flavoring agent etc..

Advantageously the viscosifying agent is chosen in the group consisting of microcrystalline cellulose, starch, hyaluronic acid, pectin, sodium carboxymethylcellulose polyvinylpyrrolidone and mixture thereof. More advantageously it is PVP and/or a mixture of microcrystalline cellulose and sodium carboxymethylcellulose that can be easily dispersed in aqueous medium, preferably at room temperature and under gentle dispersion, in particular in the form of spray-dried blend such as for example Avicel® RC-951 or Avicel® CL-611. Still more advantageously it is a mixture of PVP, microcrystalline cellulose and sodium carboxymethylcellulose, in particular in an amount in the range 2-16%, advantageously in the range 10-14%, in particular of around 12% w/w based on the total weight of the composition.

Advantageously, the osmotic agent is a polyol, such as mannitol, sorbitol or xylitol, more advantageously it is sorbitol, still more advantageously in an amount in the range 30-70%, more advantageously in the range 50-65%, still more advantageously of around 60% by weight, based on the total weight of the mixture.

Advantageously the buffering agent is chosen in the group consisting of glycine or borate buffer or phosphate buffer, in particular a phosphate buffer such as di-sodium hydrogen phosphate di-hydrate. Advantageously the concentration of glycine buffer is between 0.1M and 0.2M, more advantageously it is 0.1M. Advantageously the concentration of phosphate buffer is between 0.005M and 0.02M, more advantageously it is 0.01M.

The liquid composition may for example be a suspension, an emulsion, such as a micro-emulsion, a dispersion, a gel or a paste, still more advantageously it is a suspension, for example a suspension in an aqueous medium such as buffered solution, syrup or oily medium. In particular the liquid composition will have a thixotropic or a pseudoplastic behavior.

In an advantageous embodiment, the pharmaceutically active compound contained in the microparticles of the liquid pharmaceutical composition according to the present invention is chemically stable for at least 1 day when stored at 4° C., advantageously at room temperature (around 20-25° C.), advantageously at least one week, more advantageously at least 1 month.

In the sense of the present invention, the term "chemically stable pharmaceutically active compound" is intended to mean that the physicochemical stability of the pharmaceutically active compound remains unaltered in the liquid pharmaceutical composition according to the present invention during its storage (e.g. chemical structure, dissolution profile, crystallinity/amorphous structure, pharmacological activity). As a consequence, the level of non-degraded pharmaceutically active compound incorporated in the microparticles does not decrease below 70% by weight, preferably not below 80%, even more preferably, not below 85% compared to the level of the pharmaceutically active compound contained in the corresponding microparticle, before their mixing with the liquid medium.

In another advantageous embodiment, less than 20% by weight, advantageously less than 10%, more advantageously less than 5% of the pharmaceutically active compound contained in the microparticles is released in the liquid medium of the liquid composition according to the present invention when the composition is stored for at least 1 day at 4° C., advantageously at room temperature (such as 25° C.), advantageously at least one week, more advantageously at least 1 month, still more advantageously at least 7 weeks.

In an advantageous embodiment, the pharmaceutically active compound contained in the microparticles of the liquid pharmaceutical composition according to the present invention is physically stable for at least 10 seconds, preferably 20 seconds, even more preferably 30 seconds after homogenization by gentle mixing before being taken by the patient. In the sense of the present invention, the term "physically stable" is intended to mean that the microparticles remained evenly or homogeneously distributed throughout the entire volume of the liquid medium at least 10 seconds, preferably 20 seconds, even more preferably 30 seconds after homogenization by gentle mixing and that sedimentation, phase separation, aggregation, formation of layered structures of aggregated microparticles and the like are avoided.

The present invention also concerns a kit for the preparation of a pharmaceutical liquid composition for oral administration or direct administration in the stomach according to the present invention comprising:
- the microparticles according to the present invention and
- a liquid medium having a pH>6, advantageously a pH >6.5, more advantageously of between 6.5 and 7.5, in particular a pH of between 7 and 7.5, still more advantageously a pH of around 7.5, in particular as described above.

The microparticles and the liquid medium can be contained in separate containers and should be mixed together before use. Therefore the kit may come with appropriate instructions for mixing of the particles with the liquid medium.

In another advantageous embodiment, other excipients known by the one skilled in the art such as sweeteners, colorant, gums, cellulose or acrylic derivatives, thixotropic agents, pseudoplastic agents, stabilizers, preservative agents (such as methylparaben and/or potassium sorbate) etc.. and in particular a buffering agent, an osmotic agent and/or a viscosifying agent, advantageously as described above, can be added with the microparticles and therefore the kit contains a mixture of the microparticles with these excipients and/or viscosifying and/or buffering agents and/or osmotic agent and a liquid medium, which should be mixed by the patient or by a competent person (e.g. the pharmacist, nurse, . . . ) before administration or before the beginning of the treatment with the pharmaceutically active compound.

The present invention concerns also a pharmaceutical solid composition intended to be reconstituted in the form of a liquid pharmaceutical composition for oral administration or direct administration in the stomach, said solid composition comprising the microparticles according to the present invention, optionally in admixture with a viscosifying agent and/or a buffering agent and/or an osmotic agent. Advantageously the viscosifying agent is as described above. More advantageously the buffering agent is as described above. Still more advantageously the osmotic agent is as described above.

The pharmaceutical solid composition according to the invention can have the form of dry syrup, powder or granulates or even a fast dispersing tablet.

In case it has the form of powder or granulates, it can be packaged in sachet.

In order to prepare the liquid pharmaceutical composition according to the invention, it is simply necessary to add a liquid medium having a pH>6, advantageously a pH>6.5, in particular a pH of between 6.5 and 7.5, in particular a pH of between 7 and 7.5, still more advantageously a pH of around 7.5, to the solid pharmaceutical composition according to the invention and mixed them together, in particular with gentle stirring. The liquid medium can be as described above or it can simply be purified, mineral or tap water.

Therefore the present invention also concern a process of preparation of a liquid composition for oral administration or direct administration in the stomach according to the present invention comprising the addition of a liquid having a pH>6, advantageously a pH>6.5, in particular a pH of between 6.5 and 7.5, more particularly a pH of between 7 and 7.5, still more advantageously a pH of around 7.5, in the pharmaceutical solid composition according to the present invention. Then the resulting composition is mixed, advantageously with gentle stirring, in particular by the patient or by a competent person (e.g. the pharmacist, nurse, . . . ) before administration or before the beginning of the treatment with the pharmaceutically active compound.

The reconstituted a liquid pharmaceutical composition thus obtained can be administrated as a single dose (single administration) or as several doses (chronic administration).

The liquid pharmaceutical composition according to the present invention can be administrated to a patient in need thereof orally or directly in the stomach by means of any appropriate infusion device such as a nasogastric tube or gastrostomy tube or any other suitable device well-known to the skilled person of the art.

The liquid pharmaceutical composition according to the present invention is particularly appropriate for pediatric and geriatric patients who have difficulty in swallowing or chewing solid pharmaceutical compositions; patients who are unwilling to take solid pharmaceutical compositions due to fear of choking; very elderly patients or disabled patients who may not be able to swallow a daily dose of a pharmaceutically active compound or mental ill patients in an institutional setting who may try to hide a conventional tablet under their tongue to avoid their daily dose therapeutics.

If the pharmaceutically active compound is omeprazole, the pharmaceutical liquid composition according to the present invention is intended to be used as a drug for the prevention and/or treatment of gastrointestinal disorders, in particular for inhibiting gastric acid secretion in mammals and man. In a more general sense, it may be used for prevention and treatment of gastric acid related diseases in mammals and man, including e.g. reflux esophagitis, gastritis, duodenitis, gastric ulcer and duodenal ulcer. Furthermore, it may be used for treatment of other gastrointestinal disorders where gastric acid inhibitory effect is desirable e.g. in patients on NSAID therapy, in patients with Non Ulcer Dyspepsia, in patients with symptomatic gastroesophageal reflux disease, and in patients with gastrinomas. It may also be used in patients in intensive care situations, in patients with acute upper gastrointestinal bleeding, pre-and postoperatively to prevent acid aspiration of gastric acid and to prevent and treat stress ulceration. Further, it may be useful for prevention and treatment of irritable bowel syndrome (IBS), inflammatory bowel disease (IBD), ulcerative colitis, Crohn's disease, asthma, laryngitis, Barret's syndrome, sleep apnea, sleep disturbance, psoriasis as well as being useful for prevention and treatment of Helicobacter infections and diseases related to the above.

If the pharmaceutically active compound is pramipexole, the pharmaceutical liquid composition according to the present invention is intended to be used as a drug for the prevention and/or treatment of Parkinson's disease and/or restless legs syndrome, in particular of early-stage Parkinson's disease.

Therefor the present invention also concerns a method for treating Parkinson's disease, in particular early-stage Parkinson's disease, and/or restless legs syndrome comprising the administration of an effective amount of a liquid composition according to the present invention to a patient in need thereof.

The invention will be better understood in view of the description of the figures and the examples which are given in a non-limitative way.

FIG. 1 represents the evolution of the amount of omeprazole (in % by weight), released during a dissolution test in aqueous medium (1 L, 37° C., paddle method, 100 rpm), from microparticles (Formulation 1) as described in example 1 and the reference commercial omeprazole-containing microparticles (Losec 40 mg from AstraZeneca) depending of the pH conditions. The microparticles were placed in phosphate buffer (pH 7.0) for 2 hours, then in acidic medium (pH 1.2) for 2 hours and finally in phosphate buffer pH 6.8 (example 1).

FIG. 2 represents the dissolution profile of the microparticle (Formulation 2) according to the present invention (example 1) using the European Pharmacopoeia VIII Edition recommendation for enteric dosage form: 2 hours in acidic medium followed by 45 min in phosphate buffer pH 6.8 (1 L, 37° C., paddle method, 100 rpm) (example 1).

FIG. 3 represents the comparison among 3 omeprazole-containing microparticles in suspension in water (2 microparticles according to the present invention: Formulation 3 and Formulation 4 and a commercial enteric coated microparticle: omeprazole Sandoz 40 mg) of the retained omeprazole (within the microparticles: pellets) and released omeprazole (in the aqueous medium: supernatant) after 7 days of storage in a fridge (4-8° C.) (example 3).

FIG. 4 represents the evolution of the amount of omeprazole (in % by weight) released in the aqueous medium surrounding the microparticles (Formulation 3) according to the present invention and the reference commercial omeprazole-containing microparticles (Omeprazole Sandoz) following the 3 steps dissolution testing i.e., step 1 (from 0 to 4 h; pH 7.0—syrup-like storage condition), step 2 (from 4 hours to 6 hours in acidic medium pH 1.2 (gastric conditions)) and step 3 (45 min in phosphate buffer pH 6.8 (intestinal conditions) (example 4).

Figure 7:
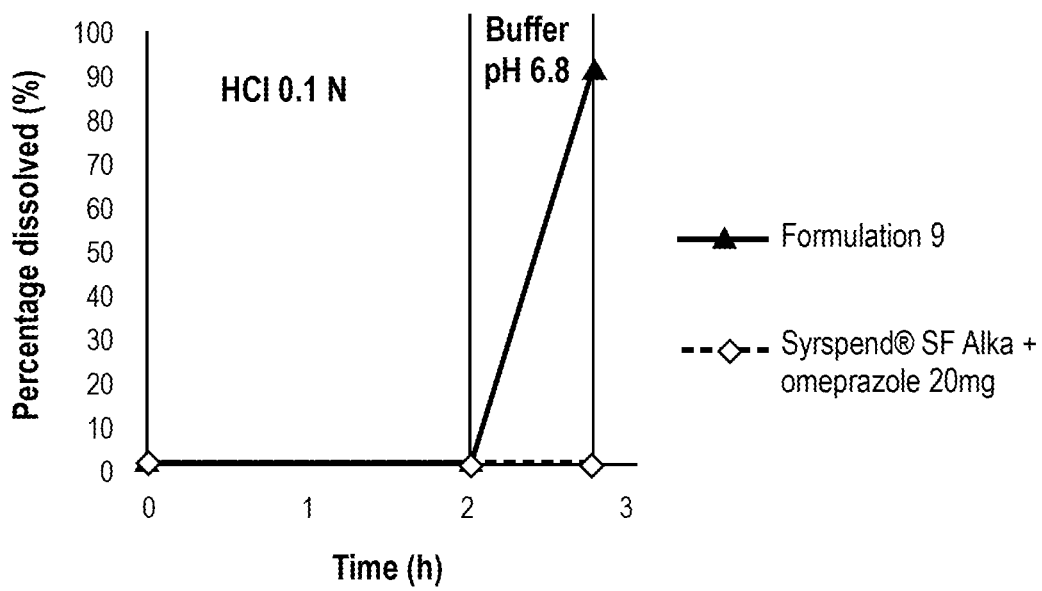

FIG. 7 represents the dissolution profile of the microparticles (Formulation 9) without the outmost layer according to the present invention and the marketed reconstituted liquid syrup product Syrspend® SF Alka kit omeprazole from Fagron using the European Pharmacopoeia VIII Edition recommendation for enteric dosage form: 2 hours in acidic medium followed by 45 min in phosphate buffer pH 6.8 (1 L, 37° C., paddle method, 100 rpm).

Figure 8:
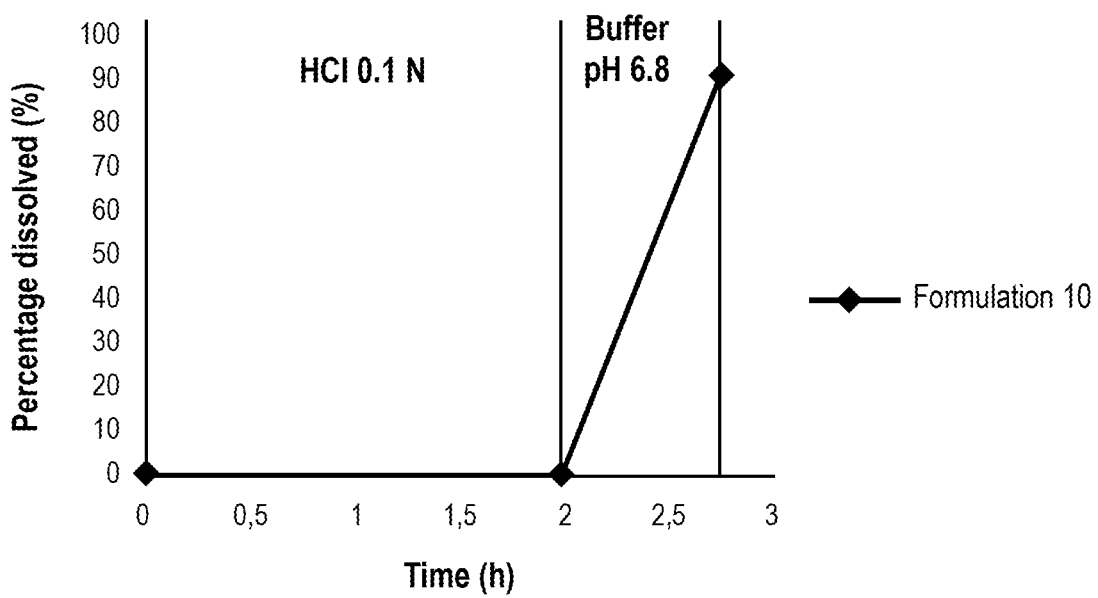

FIG. 8 represents the dissolution profile of batch the five-layered coated microparticles (Formulation 10) according to the present invention using the European Pharmacopoeia VIII Edition recommendation for enteric dosage form: 2 hours in acidic medium followed by 45 min in phosphate buffer pH 6.8 (1 L, 37° C., paddle method, 100 rpm)

Figure 9:
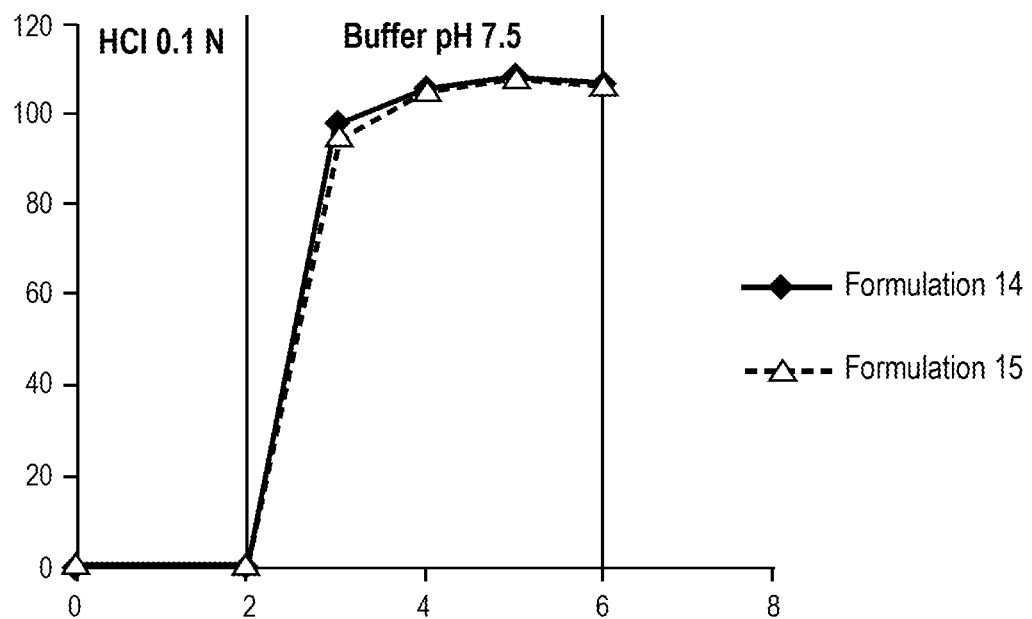

FIG. 9 represents the dissolution profiles of both Formulation 14 (24% w/w of colonic coating) and Formulation 15 (33% w/w of colonic coating) of the budesonide-containing microparticles with colonic coating based on Eudragit® S100 : 2 hours in 750 mL of acidic medium pH 1.2 and 4 hours in 1000 mL phosphate buffer pH 7.5 (37° C., paddle method, 100 rpm)

Figure 10:
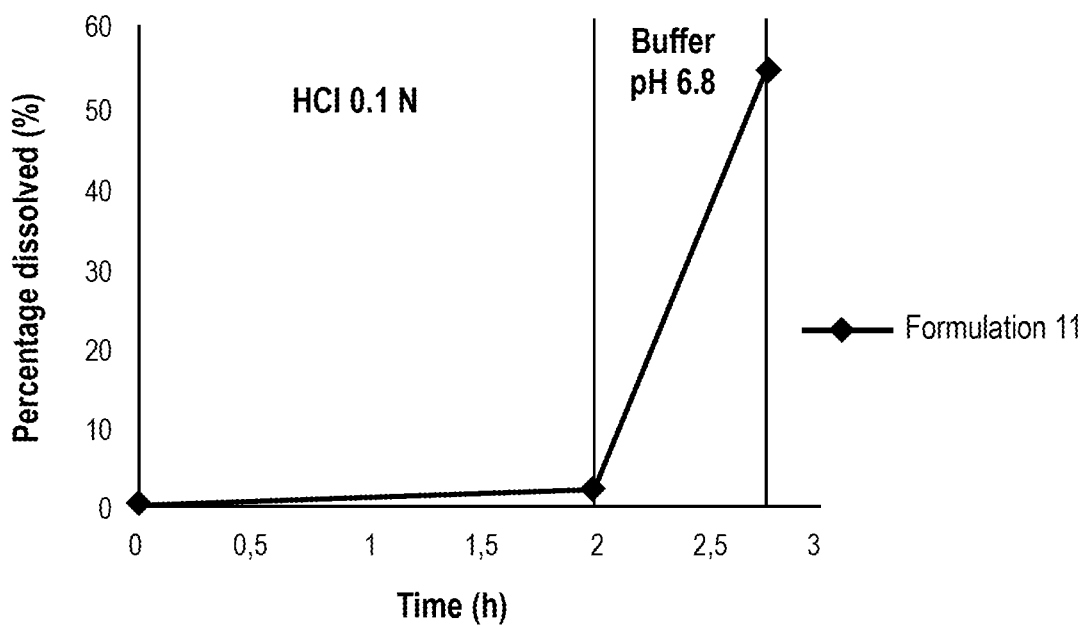

FIG. 10: represents the dissolution profile of the microparticles (Formulation 11) containing Esomeprazole without the outmost layer according to the present invention using the European Pharmacopoeia VIII Edition recommendation for enteric dosage form: 2 hours in acidic medium followed by 45 min in phosphate buffer pH 6.8 (1 L, 37° C., paddle method, 100 rpm).

Figure 11:
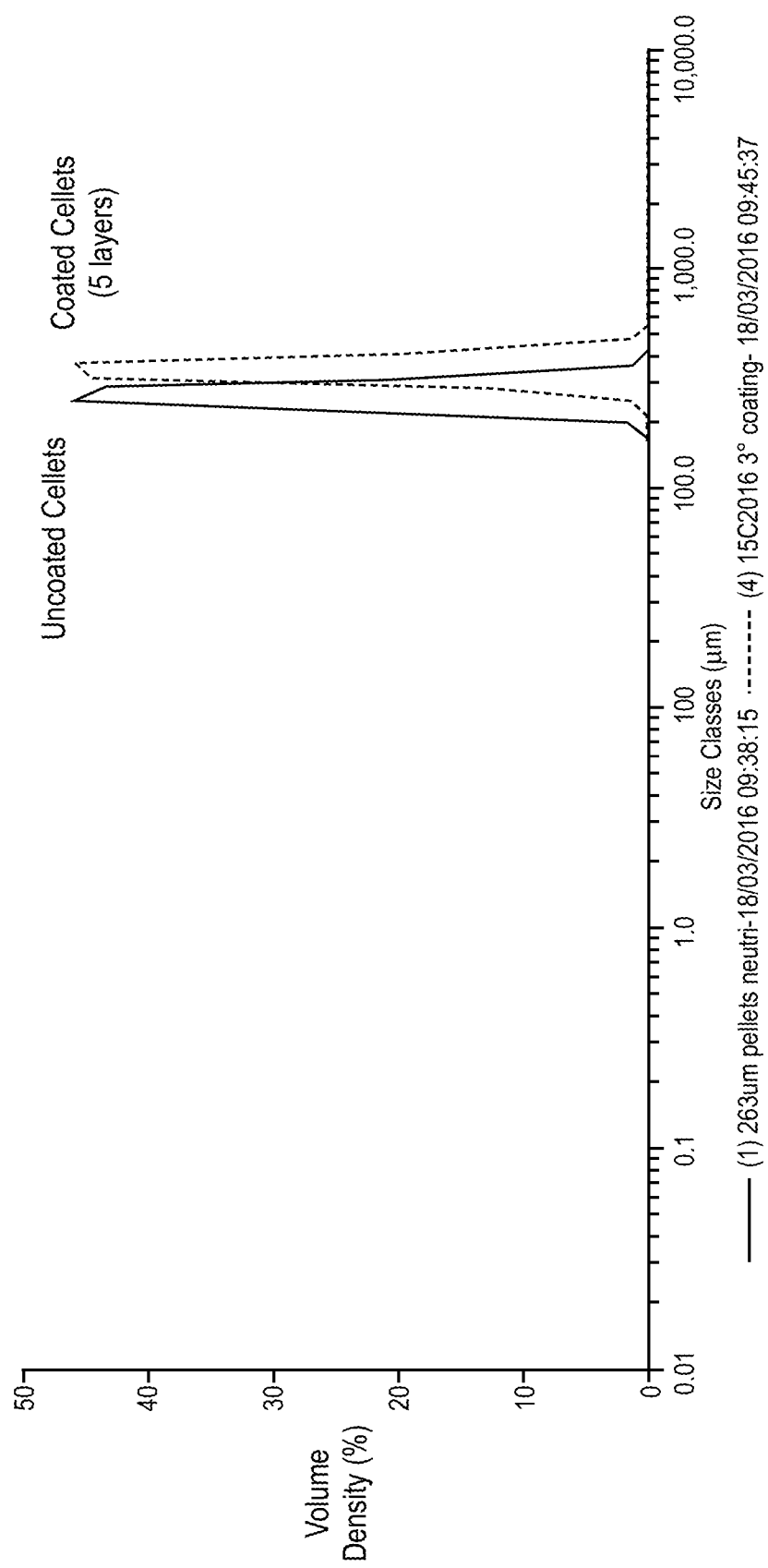

FIG. 11 represents the particle size distribution of Formulation 10 using a Mastersizer 3000 (Malvern® Instrument, UK) size characterization method for dry samples (pressure: 2 bars, vibration : 50%).

Figure 12:
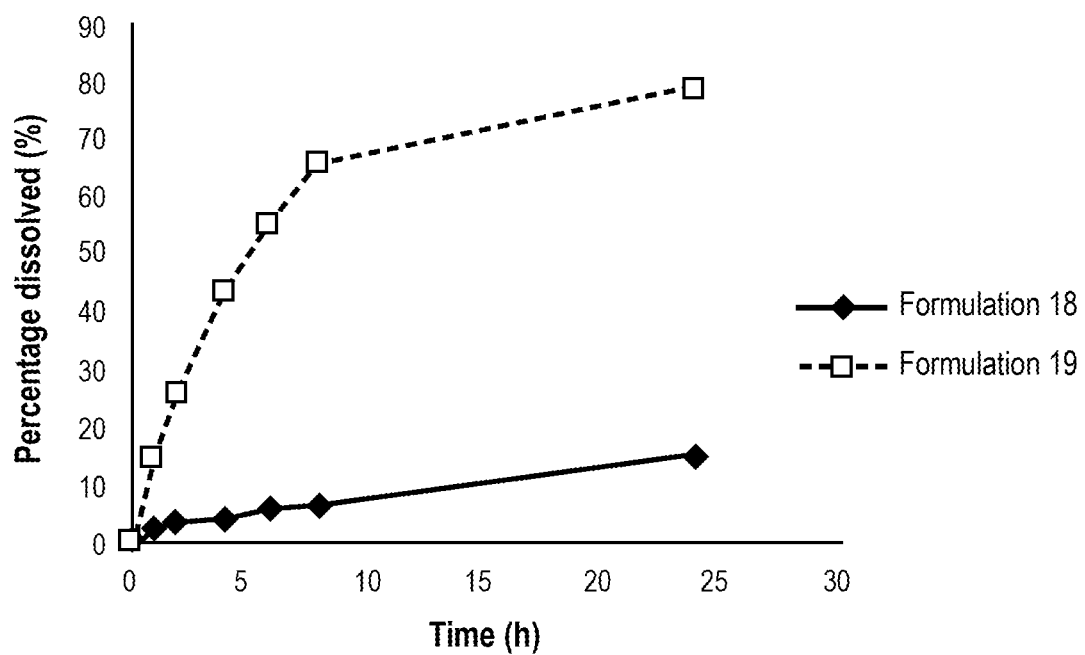

FIG. 12 represents the dissolution profiles of both formulation 18 (12% w/w of sustained-release coating) and formulation 19 (10% w/w of sustained-release coating) of the budesonide-containing microparticles with sustained-release coating based on Eudragit® RS and Eudragit® RL types during 24 hours in 1000 mL phosphate buffer pH 7.5 (37° C., paddle method, 100 rpm).

Figure 13:
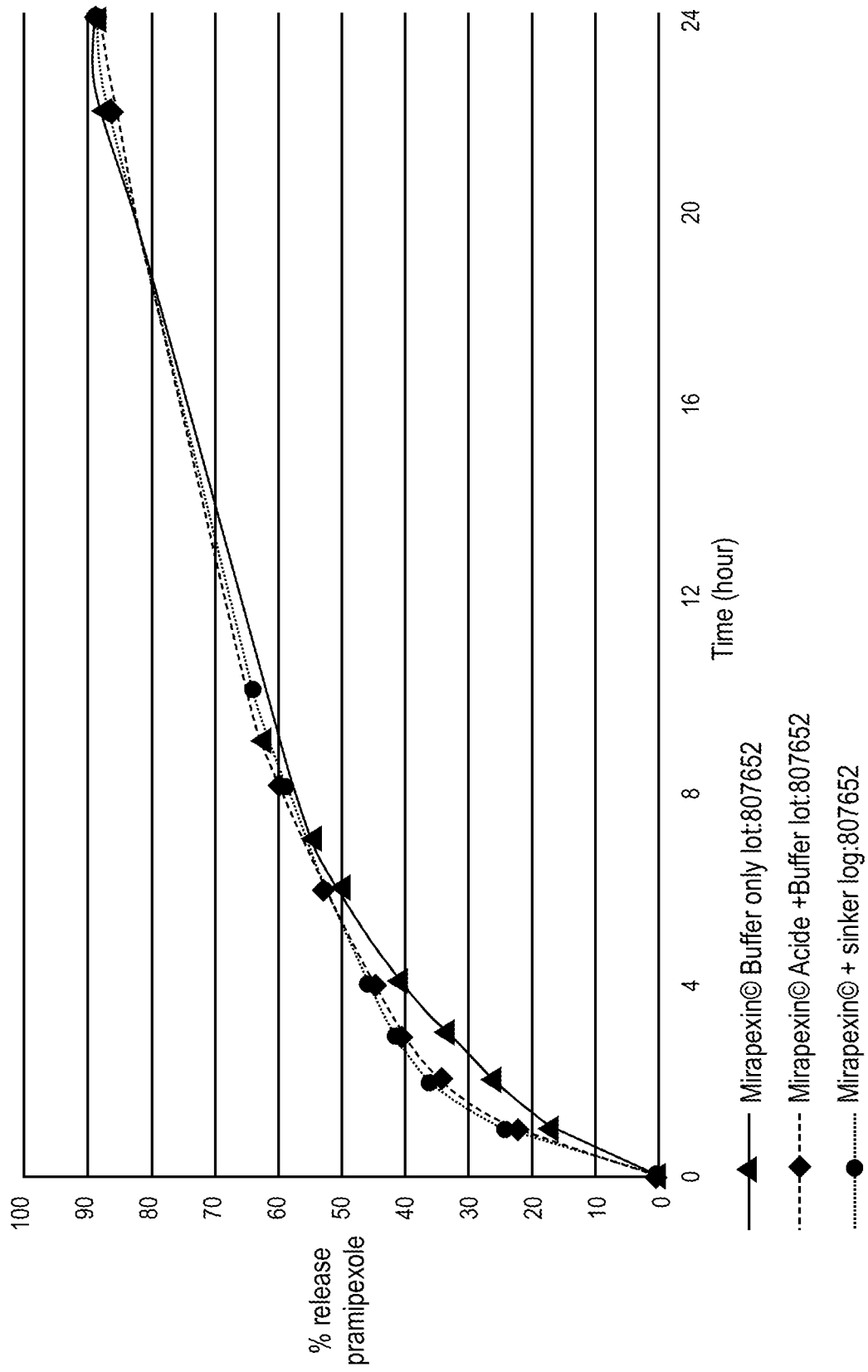

FIG. 13 represents the dissolution profiles of Mirapexin® 2.1 mg sustained-release oral tablets from Boehringer Ingelheim International GmbH in a buffer only dissolution medium (i.e. without the acid phase) (Mirapexin® buffer only), in the acid phase followed by the buffer dissolution medium (Mirapexin® acid +buffer) and with a sinker in the acid phase followed by the buffer dissolution medium (Mirapexin® +sinker).

Figure 14:
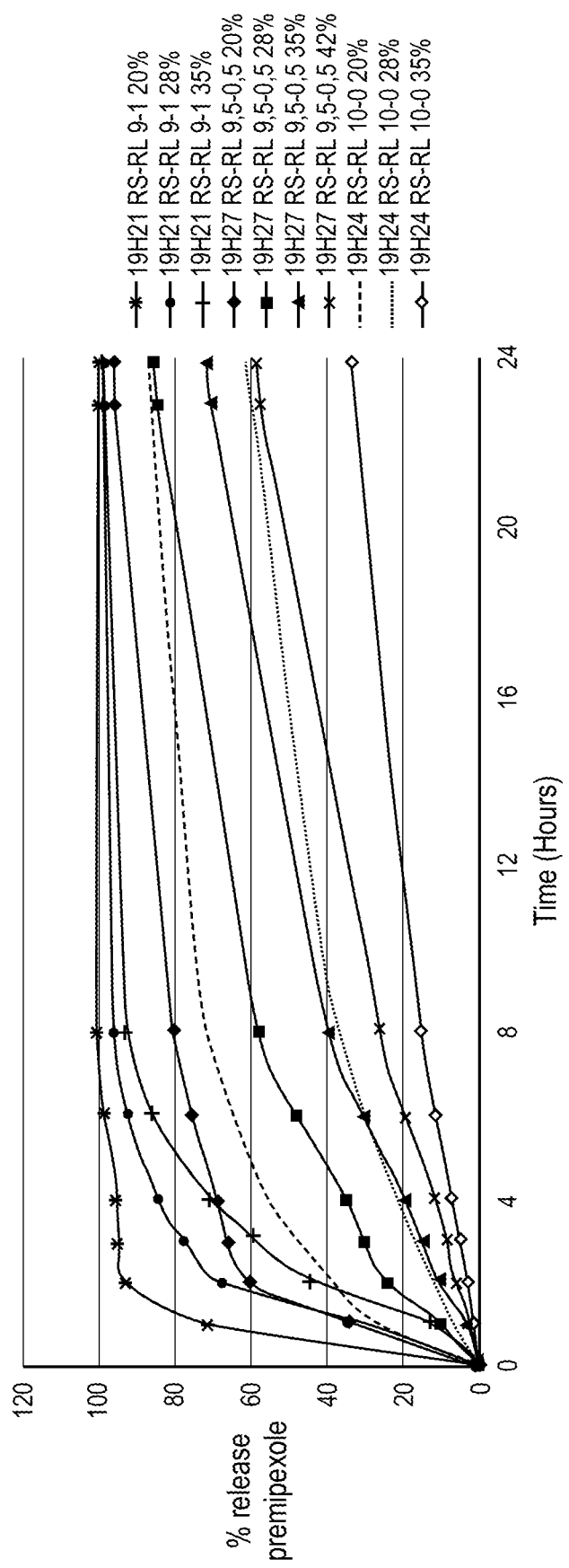

FIG. 14 represents the dissolution profiles of microparticles of pramipexole according to the invention coated only up to the sustained release layer (i.e. without the outmost coating layer and the layer 2 bis) in the dry state as disclosed in example 18, depending on the Eudragit® RS/RL ratio (10-0, 9.0-0.5 and 9-1) of the sustained release layer and on the coating thickness (between 20 and 42% w/w of the total weight of a microparticle according to the present invention without the outmost external protection coating layer and the layer 2 bis) of the sustained release layer.

Figure 15:
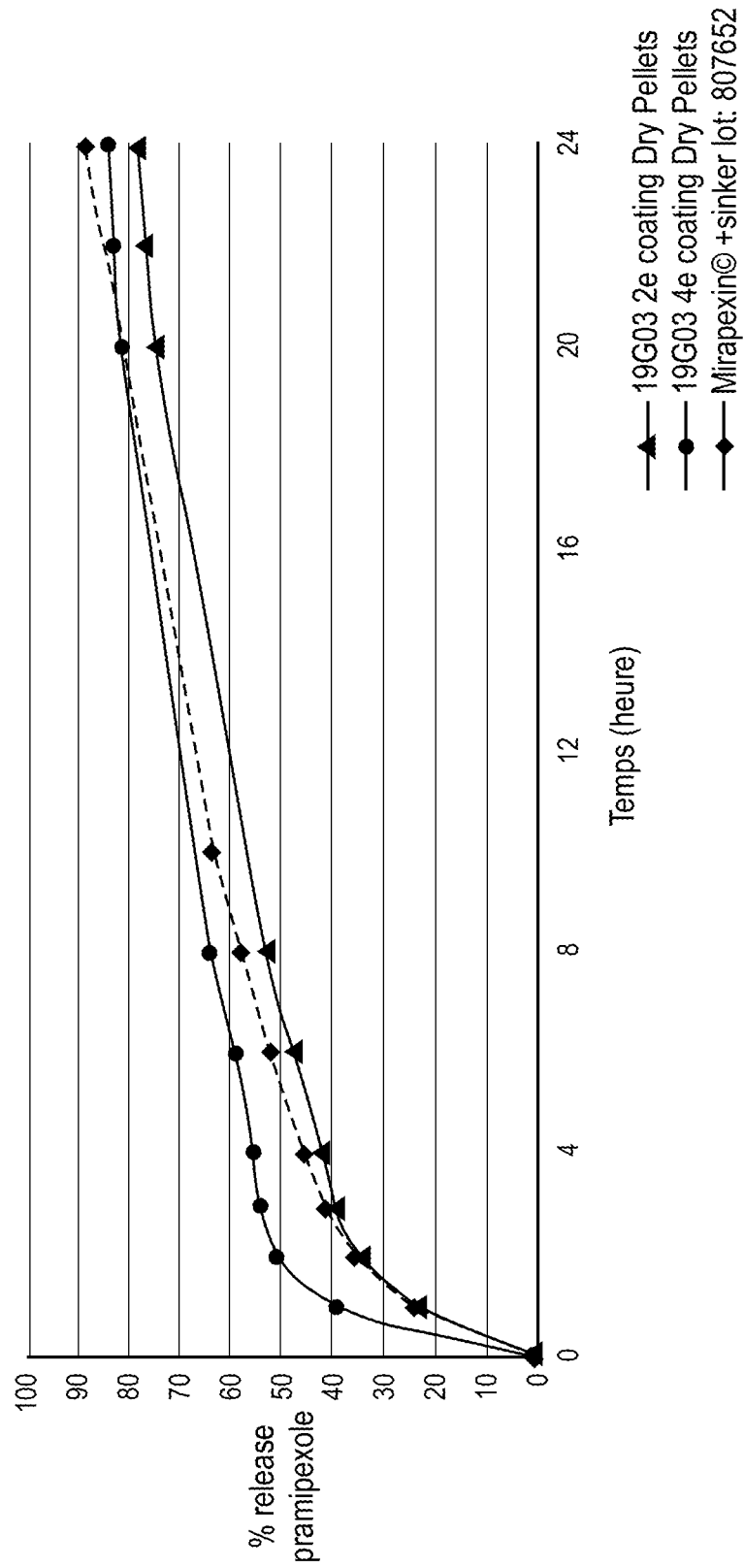

FIG. 15 represents the dissolution profiles of microparticles of pramipexole according to the invention coated up to the outmost coating layer in the dry state as disclosed in example 18, with (4e coating) or without (2e coating) the 2 bis intermediate coating and its comparison with the dissolution profiles of Mirapexin® 2.1 mg sustained-release oral tablets from Boehringer Ingelheim International GmbH with a sinker (Mirapexin®+sinker).

Figure 16:
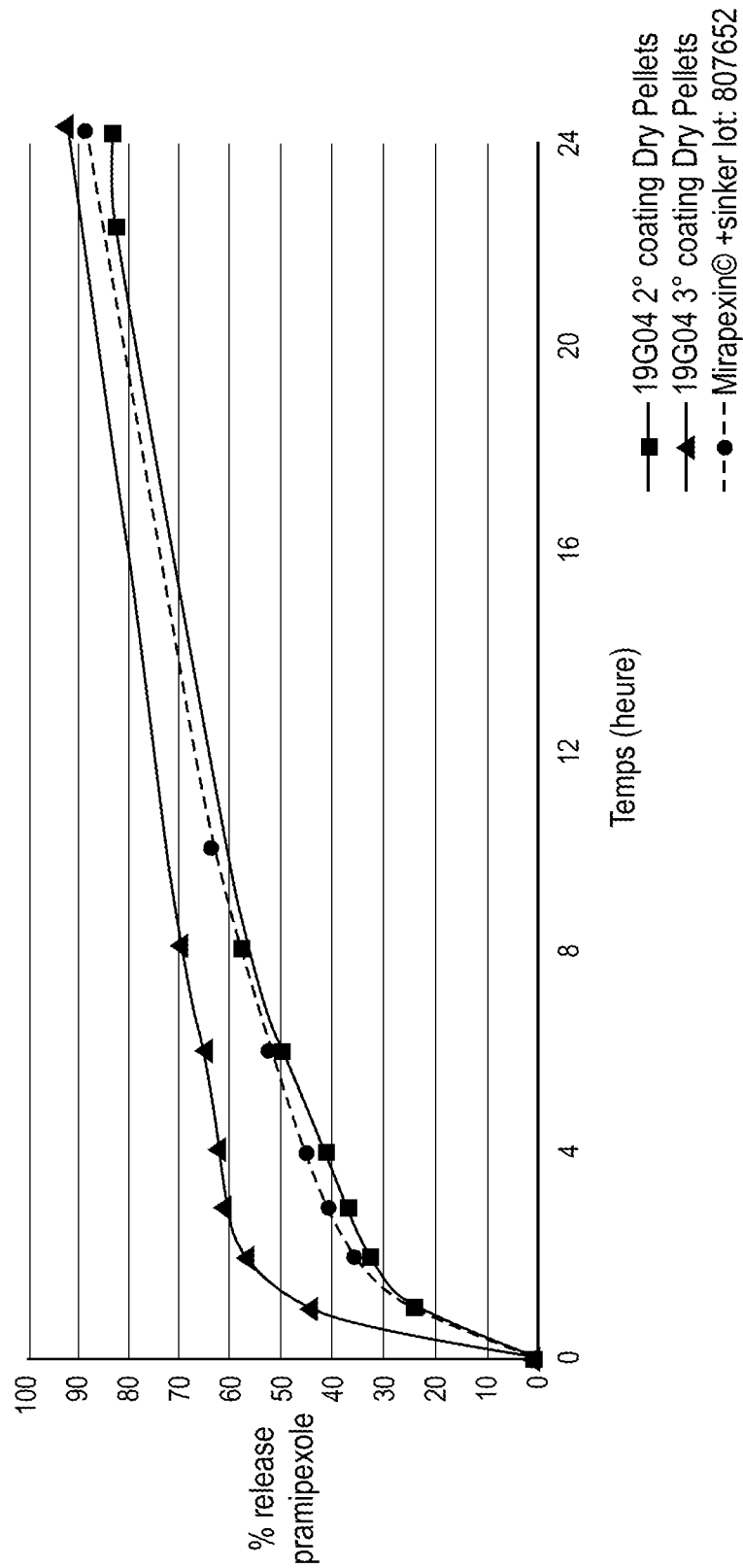

FIG. 16 represents the dissolution profiles of microparticles of pramipexole according to the invention coated up to the outmost coating layer as disclosed in example 18 before (pramipexole dry pellets) and after dispersion in the liquid syrup (pramipexole syrup) and its comparison with the dissolution profiles of Mirapexin® 2.1 mg sustained-release oral tablets from Boehringer Ingelheim International GmbH (Mirapexin®+sinker).

Figure 17:
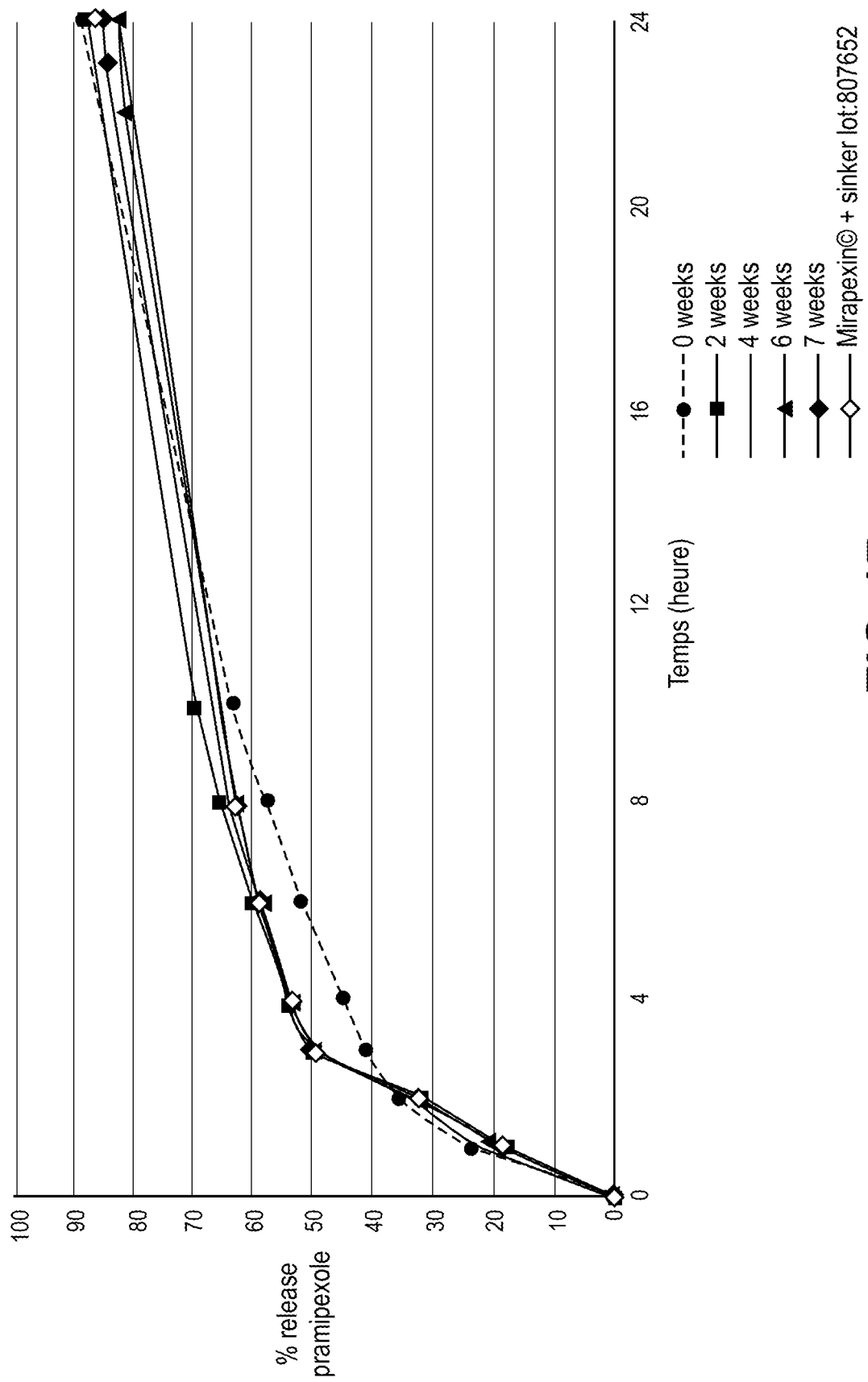

FIG. 17 represents the dissolution profiles of microparticles of pramipexole according to the invention as disclosed in example 18 dispersed in the reconstituted syrup at the predetermined storage times at 25° C. up to 7 weeks. The dissolution profiles of Mirapexin® 2.1 mg sustained-release oral tablets from Boehringer Ingelheim International GmbH are shown for comparison.

Material and Methods

The microparticles that were used as inert core for the developed coated formulations according to the examples below were made of microcrystalline cellulose microsphere named Cellets® which are characterized by different particle size distributions measured by laser diffraction):

Cellets® 1000: 1000-1400 µm
Cellets® 700: 700-1000 µm
Cellets® 500: 500-710 µm
Cellets® 350: 350-500 µm
Cellets® 263 : 200-300 µm
Cellets® 200 : 200-355 µm
Cellets® 100 : 100-200 µm When an hot melt extrusion was applied before coatings to incorporate high amount of drug (e.g. mesalazine), classic procedure was performed, including feeding of the extruder through a hopper, mixing, kneading, flow through the die, and extrusion from the die and further downstream processing. The extrudate were broken and rounded through a spheronization process before being dried to get the final product.

Raw Omeprazole was purchased from Aurobindo Pharma (India), raw esomeprazole Mg was purchased from Minakem (France), raw budesonide was purchased from Sterling S.P.A. (Italia), raw sodium diclofenac was purchased from China Meheco Corporation (China), raw tenoxicam was purchased from Sifavitor (Italy), both raw beclometasone dipropionate and meselazine were purchased from Sigma-Aldrich (UK), raw furosemide was purchased from Acef s.p.a. (Italy), raw tamsulosine HCl was purchased from An Therapeutics (India), raw pramipexole dihydrochloride monohydrate was purchased from MSN Laboratories Private Limited (India), the film-forming acrylic acid derivatives polymers Eudragit® (e.g. L, E, RS, RL, NE, FS, S types) were purchased from Evonik (UK), all the other excipients were of pharmaceutical grade. In particular PVP (Kollidon® K30) was purchased from D-BASF, Ludwigshafen am Rhein, Germany, talc (talc micronized 10 µm) was purchased from Sigma Aldrich, St. Louis, USA, TEC was purchased from Alfa Aeser, Haverhill, USA, GMS (Glyceryl monostearate) was purchased from, D-BASF, Ludwigshafen am Rhein, Germany and aluminum oxide was purchased from Sigma Aldrich, St. Louis, USA.

Furthermore Neosorb sorbitol was purchased from Roquette, Lestrem, Francee, Avicel® RC-591 (Colloidal Microcrystalline Cellulose and Sodium Carboxymethylcellulose) was purchased from FMC, Philadelphia, USA, methylparaben (methyl 4 hydroxybenzoate) was purchased from VWR, Radnor, USA, potassium sorbate was purchased from Sigma Aldrich, St. Louis, USA, di-sodium hydrogen phosphate dihydrate was purchased from Merk, Darmstadt, Germany, sodium carbonate anhydrous was purchased from Sigma Aldrich, St. Louis, USA, cochenillum E124 was purchased from Fagron, Rotterdam, Netherlands and Strawberry flavour TGDA ATO was purchased from Robertet, Grasse Cedex, France.

The commercialized products used as references were Losec MUPS 40 mg gastro-resistant tablets from Astrazeneca, Omeprazole Sandoz 40 mg gastro-resistant capsules Syrspend® SF Alka (dry) from Fagron, a pre-weighted powder buffered to pH >7 for acid-labile drugs to make suspensions and Mirapexin® 2.1 mg sustained-release oral tablets from Boehringer Ingelheim International GmbH.

Coating Parameters

The coatings were performed in a lab-scale fluid bed dryer : fluid bed coater Aeromatic, GEA (Switzerland) and fluid bed apparatus SLFLL-5, LLeal (Spain).

Briefly, according to the nature of substances used, solutions/suspensions were dissolved or dispersed in the solvents. The solutions/suspensions were prepared with a high-shear homogenizer Ultra-Turrax®. The solutions/dispersions were continuously magnetically stirred to prevent sedimentation of insoluble particles during the process. Between 500-1500 g of Cellets® (type specified in the examples) were introduced inside the fluid bed apparatus. The drying air temperature was set at 40-45° C. and 50-65° C. for organic and aqueous solutions/dispersions, respectively and 33-37° C. when the pharmaceutically active compound is pramipexole. The air pressure was ranged between 0.5 and 3.0 bars and between 1.5-1.8 bars when the pharmaceutically active compound is pramipexole. The drying air flow was fixed in order to get optimal movement of the microparticles and the flow rate was ranged between 5 and 50 g/min and 10-12 g/min when the pharmaceutically active compound is pramipexole.

Quantification Process After Coating

Approximately 1 g of microparticles was ground and an exact amount of approximately 55 mg was put in a flask with 200 mL of phosphate buffer 0.2 M, pH 6.8. After 20 minutes of sonication, the volume was brought to 200 mL. 10 mL of each sample was withdrawn and put in a falcon tube containing 2 mL of NaOH 0.25N. After mixing, the final suspensions were filtered using Millipore filters 0.45 µm. Small volume of each filtered solution was put in vials and loaded in the HPLC system. Tests were made in quintupled.

When using another drug than omeprazole, the use of NaOH 0.25N was not relevant.

Release of Omeprazole in Syrup

In general a fixed amount of omeprazole's coated microparticles were dispersed in a 100 ml flask containing purified water and stored at 5° C. However in example 2 only 100 mg were dispersed in the 100 ml flask containing purified water. After the required amount of time specified in the examples, the amount of omeprazole was quantified by HPLC both in solution (evaluation of its release in the supernatant) and inside microparticles (evaluation of its ability to be retained in the dosage form) by crushing the coated suspended microspheres with an UltraTurrax® inside the syrup.

Dissolution Test

The stated volume of the dissolution medium (±1 L) was placed in each vessel of the Apparatus 2, 100 rpm, n=3 (Distek dissolution system 2100C, Malvern instrument, UK). The dissolution medium was equilibrated to 37° C. and proper amount of microparticles were put in each vessel. For omeprazole and potential other light-sensitive drugs, the vessels were protected from light during the entire test. At specified times, 10 mL of each sample (omeprazole, esomeprazole) were withdrawn, diluted with 2 mL of NaOH 0.25N. The final solutions were filtered using Millipore filters 0.45 µm. A small volume of each filtered solutions was put in vials and loaded in the HPLC system in order to evaluate the release of the drug. Samples were immediately filtered upon sampling with a filter 0.45 µm. The medium used for the dissolution test was a buffer prepared with:

Acetic acid: 3.0 g
K2HPO4: 8.7 g
Polysorbate 20: 1.0 g
Water: 1.0 L

For the acid stage, the buffer described above was brought to pH 1.2 thanks to the addition of HCl 1N. Samples of microparticles remained in this medium for 2 hours. For the buffer stage, the same buffer was brought to pH 6.8 (enteric release) or pH 7.5 (both colonic and sustained release) by addition of NaOH 8N. Samples of microparticles remained in this medium for 45 minutes for enteric release, 4 hours for colonic release and 24h for sustained release. At the end of the dissolution test, the amount of unreleased pharmaceutically active compound was quantified. When needed, the microparticles were previously dispersed in phosphate buffer pH 7.0 for 2 hours before being put in acidic medium.

Thermogravimetric Analysis

TGA analysis was performed in order to evaluate residual solvent in the final batch of microparticles. A TGA. Q500 Hig. Res. equipment (TA Instruments, USA) was used for this purpose. Runs (~10 mg of sample) were set with platinum pans from 25° C. to 200° C. at a heating rate of 10° C/min at high resolution. The moisture level was determined by the weight loss obtained between 25° C. and 160° C.

High Performance Liquid Chromatography (HPLC)

The HPLC system consisted of a High Performance Liquid Chromatography system (series 1200 Agilent technologies), equipped with a single pump, an autosampler and a diode array UV detector.

For the quantification of both omeprazole and esomeprazole Mg, the column was a Nucleosil C8 125 mm×4.6 mm (5 µm) Lot n°: 21007023 (Macherey-Nagel). The mobile phase was an ammonium acetate buffer 0.05M pH 7.6 and the dilution phase was a phosphate buffer 0.2M pH 6.8. The wavelength was set at 305 nm; the flow rate at 1 mL/min; the temperature at 25° C.; the injected volume at 20 µL and the run time was 20 min. The method was validated using standard solutions of both drugs. For the quantification of budesonide epimers A&B, the column was a Purospher RP18e 55×4 mm (3 µm) (Merck); the mobile phase was a mixture phosphate buffer pH 5.2/acetonitrile 68:32; the wavelength was set at 225 nm; the flow rate at 1.5 mL/min; the temperature at 30° C.; the injected volume at 50 µL and the run time was 10 min.

For the quantification of Pramipexole the column was a BDS Hypersil™ C18 150 mm×4.6 mm (ThermoFisher Scientific, USA). The chromatographic conditions were set as follow: wavelength 264 nm; flow rate 1 mL/min; temperature 40° C.; injection volume 50 µL; run time 20 min.

When unspecified, the quantification of the described drugs was performed using validated methods form the European Pharmacopoeia VIII Edition.

Example 1

Development of a 5-Layered Coated Microparticle According to the Invention 500 g of Cellets® 1000 were poured into the fluid bed apparatus.

The first layer contains omeprazole as the model drug (the pharmaceutically active compound according to the invention), palmitate ascorbyl as the anti-oxidative agent, PVP as the binder, talc as bulk agent. The materials were dispersed in ethanol. Therefore the Cellets® coated with the first layer corresponds to the core comprising the pharmaceutically active compound according to the invention.

The second layer aimed to isolate the drug from the film-polymer Eudragit® type L. It contained PVP as both the isolating and binding polymer, titanium dioxide as an opacifying agent and talc as bulk agent. The materials were dispersed in ethanol. This second layer corresponds to the protective intermediate coating layer according to the invention.

The third layer was the effective layer which provided the final release characteristics of the product: it is the controlled-release intermediate coating layer according to the invention. The aqueous dispersion contained Eudragit® L30D55 as the enteric film-forming polymer, acetyl triethyl citrate (ATEC) as the plasticizer, polysorbate 80 as the surfactant agent, silicone as the antifoam agent and talc as bulk agent. The fourth layer aimed to isolate both acrylic acid derivatives, Eudragit® type L and type E from each other. The ethanolic solution contained PVP as the isolating agent and talc as bulk agent. The fourth layer corresponds to another protective intermediate coating layer according to the present invention. The outmost external layer contained Eudragit® E100 as the gastrosoluble film-forming polymer, silicone as the antifoam agent and talc as bulk agent.

The composition of the layers of the microparticle (Formulation 1) is indicated in the following table 1.1.

TABLE 1.1 composition of formulation 1

Layer 1 (g)

| | |
|---|---|
| Omeprazole | 50 |
| Ascorbyl palmitate | 0.025 |
| PVP | 20 |
| Talc | 20 |
| Ethanol | 400 |
| Dry residue | 90.025 |

Layer 4 (g)

| | |
|---|---|
| PVP | 15 |
| Talc | 10 |
| Ethanol | 150 |
| Dry residue | 25 |

Layer 2 (g)

| | |
|---|---|
| PVP | 10 |
| TiO2 | 5 |
| Talc | 5 |
| Silicon | 1 |
| Ethanol | 150 |
| Dry residue | 20 |

Layer 5 (g)

| | |
|---|---|
| Eudragit ® E 100 | 120 |
| Silicon | 1 |
| Talc | 30 |
| Ethanol | 1200 |
| Dry residue | 150 |

Layer 3 (g)

| | |
|---|---|
| Eudragit ® L30D55 | 100 |
| ATEC | 15 |
| Polysorbate 80 | 1 |
| Talc | 20 |
| Water | 500 |
| Dry residue | 120 |

The process of preparation (coating of the core and of the subsequent layers) is as described above in the coating parameters part of material and methods.

Figure 1:
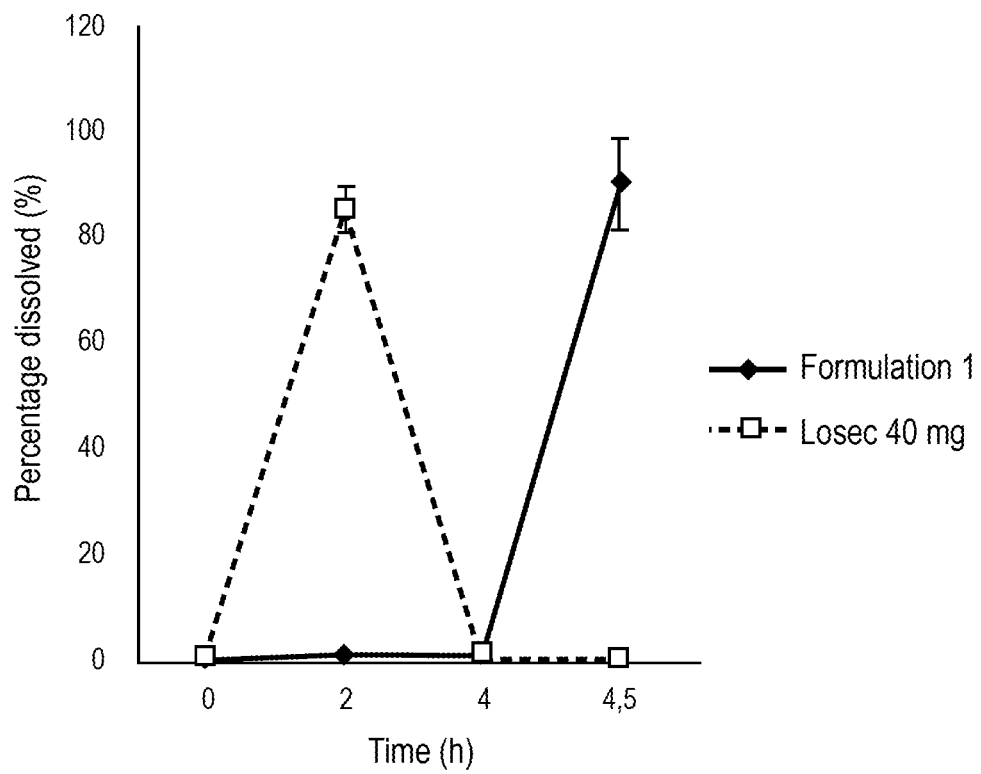

Dissolution studies using the dissolution test method indicated above in materials and methods showed that the outmost external coating seemed to resist for 2 hours in phosphate buffer pH 7.0 (FIG. 1). Indeed, it was shown that the new developed 5-layered coated system was able to avoid the early release of omeprazole for 2 hours in buffer pH 7.0. This means that the outermost external layer acted as a barrier. Then, no omeprazole was released for 2 hours in acidic medium. The enteric coating resisted at pH lower than 6.0. Finally, the drug was effectively released in buffer pH 6.8 as the enteric coating dissolved. In contrast, the marketed product Omeprazole (Losec 40 mg) released the omeprazole which was already partially degraded in acid condition.

However the microparticles were not stable in storage at 4° C. Indeed 5 g of formulation 1 were dispersed in 100 mL of water for 1 day. The release of omeprazole was quantified by HPLC according to the method indicated above in the material and methods. It was observed that the coated microparticles were not stable when placed both in the fridge (4° C.) and ambient temperature. The outmost external layer composed of Eudragit® E dramatically swelled which made the microparticles porous. Therefore, more than 60% of omeprazole were released in the external medium.

Therefore using only a hydrophilic gastro-soluble component in the outermost external layer is not sufficient to obtain the required characteristics: indeed, even if the dissolution profile seems satisfying, the microparticles are not stable during storage at 4° C. in the aqueous media.

In order to solve this problem, magnesium stearate was added in the outmost external coating layer Formulation 2 (Table 1.2).

TABLE 1.2

Composition of Formulation 2

Layer 1 (g)

| Omeprazole | 50 |
| Ascorbyl palmitate | 0.025 |
| PVP | 20 |
| Talc | 20 |
| Ethanol | 400 |
| Dry residue | 90.025 |

Layer 4 (g)

| PVP | 15 |
| Talc | 10 |
| Ethanol | 200 |
| Dry residue | 25 |

Layer 2 (g)

| PVP | 12 |
| $TiO_2$ | 5 |
| Talc | 5 |
| Ethanol | 150 |
| Dry residue | 22 |

Layer 5 (g)

| Eudragit E 100 | 240 |
| Mg stearate | 15 |
| Isopropanol | 1152 |
| Acetone | 768 |
| Dry residue | 255 |

Layer 3 (g)

| Eudragit ® L30D55 | 125 |
| ATEC | 19 |
| Polysorbate 80 | 1 |
| Silicone | 1 |
| Talc | 20 |
| Water | 500 |
| Dry residue | 145 |

Figure 2:
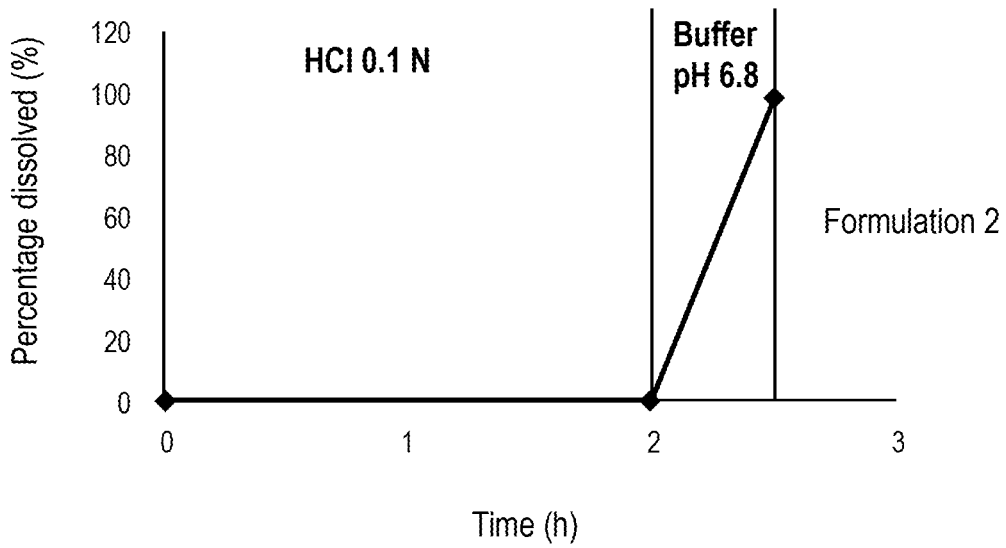

Surprisingly, when 5 g of Formulation 2 were dispersed in 100 mL of water for 3 days according to the method indicated above in the release of omeprazole in water part of the material and methods, it was observed that the coated microspheres looked stable when placed both in the fridge (4° C.) and ambient temperature. Indeed, the swelling of Eudragit® E seemed to be avoided. More surprisingly, the addition of magnesium stearate did not modify the dissolution profile of the microparticles (FIG. 2) when using the dissolution test described above in the material and methods. Indeed as shown in this figure, the 5-layered coated microparticle was able to avoid the release of omeprazole in acidic medium. The entire amount of the drug was then release within 45 min in phosphate buffer pH 6.8.

Therefore, it was decided to optimize the fifth coating by combining the gatrosoluble film-forming polymer Eudragit® E with a hydrophobic agent such as magnesium stearate in order to increase the stability of the coating microspheres during storage.

EXAMPLE 2

Compositions Suitable for Preparing the Outmost External Layer According to the Invention To test the barrier properties of outmost external layers compositions, omeprazole-containing microparticles have been prepared on top of which different compositions comprising gastrosoluble polymers and hydrophobic agents have been deposited.

The microparticles have been prepared as follow: In a first step 500 g Cellets® 1000 (microcrystalline cellulose pellets) were poured inside a Fluid Bed Coater (Aeromatic, STREA-1™; lab scale) and a solution/suspension containing omeprazole, PVP, palmitate ascorbyle in ethanol was sprayed with a peristaltic pump at a flow of 8 g/min. Then, the outmost external layer has been deposited by spraying solutions comprising compositions of Eudragit® E (the polycationic gastro-soluble polymer (a) according to the invention) with either ethylcellulose, Eudragit® RS, stearic acid, Compritol® 888 ATO, magnesium stearate or GMS (glyceryl monostearate) as the hydrophobic and/or insoluble component (b) according to the invention.

Table 2.1 gives the composition of the omeprazole-containing microparticles before coating with the outmost external layer.

TABLE 2.1

First layer deposited on Cellets ®

| Omeprazole | 50 g |
| PVP | 20 g |
| Talc | 20 g |
| Palmitate ascorbyle (Palm. Asc) | 0.025 g |
| Ethanol | 400 g |
| Dry residue | 90.025 g |

Table 2.2 gives the composition of the outmost external layer deposited on top of the omeprazole-containing microparticles.

TABLE 2.2

| | (g) Batch n° | | | | | | | | | |
|---|---|---|---|---|---|---|---|---|---|---|
| | N°1 | N°2 | N°3 | N°4 | N°5 | N°6 | N°7 | N°8 | N°9 | N°10 |
| Eudragit ® E | 31.25 | 31.25 | 31.25 | 31.25 | 31.25 | 31.25 | 31.25 | 62.5 | 62.5 | 62.5 |
| Talc | 2.6 | 2.6 | 2.6 | 2.6 | 2.6 | 2.6 | 2.6 | 5.2 | 5.2 | 13.5 |
| Ethylcellulose | 0.15 | | | | | | | | | |
| Eudragit ® RS | | 3.12 | 6.24 | | | | | | | |
| Stearic acid | | | | 0.15 | 1.5 | | | 3.125 | | |
| Compritol ® 888 ATO | | | | | | 0.31 | 1.5 | | | |
| Mg stearate | | | | | | | | | 5.2 | |
| GMS* | | | | | | | | | | 13.5 |
| Isopropanol | 300.0 | 300.0 | 300.0 | 300.0 | 300.0 | 300.0 | 300.0 | 300.0 | | |
| Acetone | 195.3 | 195.3 | 195.3 | 195.3 | 195.3 | 195.3 | 195.3 | 195.3 | | |
| Dry residue (g) | 34.00 | 36.97 | 40.09 | 34.00 | 35.35 | 34.16 | 35.35 | 39.57 | 72.9 | 79.12 |
| Weight ratio compounds (a)/(b) | 20/1 | 10/1 | 5/1 | 200/1 | 20/1 | 100/1 | 20/1 | 20/1 | 12/1 | 4.6/1 |
| % polymer | 5.0 | 5.0 | 4.95 | 5.0 | 5.0 | 5.0 | 5.0 | 10.0 | 9.4 | 9.3 |

GMS*: glyceryl monostearate

The microparticles have been characterized as follow:
✓ Released and unreleased Omeprazole after 3 days of storage at 5° C.

The amount of unreleased/released omeprazole has been measured for each of the 10 batches:

To measure the amount of omeprazole released from the multilayered microparticles within the aqueous solution, 100 mg of batches 1-10 were dispersed in 100 ml of purified water and stored at 5° C. At 24 hours interval, 10 ml of a filtered sample was withdrawn and put in a falcon tube containing 2 ml NaOH 0.25N. After mixing, the solutions were filtered (Millipore filters 0.45 µm) and submitted to omeprazole HPLC quantification. The amounts of released omeprazole after 3 days storage are given in Table 2.3.

The unreleased amount of omeprazole after 3 days of storage at 5° C. are given in Table 2.3

✓ Evolution of the pH of the surrounding aqueous medium with storage

The pH has been regularly measured alongside the storage at 5° C. as an easy way to assess possible solubilization of the outmost external layer due to a modification of the pH. The pH values of the aqueous medium surrounding the microparticles of the 10 batches after 3 days of storage at 5° C. are given in Table 2.3

Conclusion:

All the tested mixture of Eudragit® E (cationic polymer) with an hydrophobic compound (such as ethylcellulose, stearic acid, compritol® 888 ATO, Mg stearate and glyceryl monostearate) gives the water barrier properties to the microparticles according to the present invention. The best results are obtained with stearic acid, glyceryl monostearate and Mg stearate (lowest amount of the drug in the aqueous medium and highest amount of the drug inside the Cellets®). Since stearic acid is not easy to handle, glyceryl monostearate and Mg stearate are the best choices as the hydrophobic component (b) of the outmost external protection layer. In particular glyceryl monostearate (GMS) is the preferred choice since the results show a release of omeprazole in water of less than 0.5% by weight.

EXAMPLE 3

Omeprazole-Containing Multilayered Microparticles With the Outmost External Layer Comprising GMS and Eudragit® E (Formulation 3 and Formulation 4)

Two batches of omeprazole-containing multilayer microparticles coated with an outmost external layer com-

TABLE 2.3

Level of released and unreleased omeprazole after 3 days of storage of the microparticles according to the invention obtained by coating the microparticles of Table 2.1 with the outmost external layers (batches 1 to 10) of Table 2.2. and pH values of the aqueous solution after 3 days of storage at 5° C.

| | Batch n° | | | | | | | | | |
|---|---|---|---|---|---|---|---|---|---|---|
| | 1 | 2 | 3 | 4 | 5 | 6 | 7 | 8 | 9 | 10 |
| Amount of omeprazole within the pellet (weight %) | >93 | 82 | 90 | 83 | >98 | 95 | 70 | >98 | 95 | >93 |
| Amount of omeprazole in water (weight %) | 7 | 18 | 10 | 3 | 2.5 | 3 | 13.5 | 1.5 | 1.5 | <0.5 |
| pH | 6.02 | 5.84 | 5.92 | 6.04 | 6.4 | 5.78 | 5.94 | 6.06 | 6.07 | 6.1 | prising both Eudragit® E and GMS according to the present invention have been prepared (Formulation 3 and Formulation 4). The samples differ by the presence, in sample Formulation 4, of an additional layer of ethylcellulose deposited directly onto the surface of the microcrystalline cellulosic pellets (Cellets®) to further contribute to limit the water diffusion from the surrounding aqueous medium to the core of the microparticles.

Preparation:

The preparation of the core and of the layer n° 1 of Formulation 3 is identical to the preparation of the core and of the first layer according to example 2 and as described in the coating parameters of material and methods. Indeed 500 g of Cellets® 1000 were put inside the Fluid Bed Apparatus (Aeromatic, Switzerland). The coating parameters are described in the material & methods section.

The composition of Formulation 3 is indicated in table 3.1

The retention of non-degraded omeprazole within the microparticles according to the present invention of Formulation 3 and Formulation 4 after 8 days storage in purified water at 5° C. has been compared to the retention of omeprazole, in the same conditions, within commercial enteric coated units of omeprazole (i.e., the microparticles of commercial omeprazole microspheres Omeprazole-Sandoz 40 mg). These latter microparticles are designed to dissolve in the high pH of the small intestine to release omeprazole for absorption but to remain unaltered in the acidic pH environment of the stomach. The enteric external layer of such commercial microparticles is, therefore, unable to confer a water barrier capacity if said commercial microparticles are stored in water, even during short periods of time.

The release of omeprazole in water has been quantified by HPLC using the method described above in the release of omeprazole in water part of material and methods.

Thus 5 g of each of the 3 samples have been dispersed in a volume of 100 ml of purified water and stored at 5° C.

TABLE 3.1

| Layer 1 | | Layer 2 | | Layer 3 | | Layer 4 | | Layer 5 | |
|---|---|---|---|---|---|---|---|---|---|
| Omeprazole | | 50 g TiO$_2$ | | 5 g Eudragit® L30D55 | | 100 g Talc | | 10 g Eudragit® EPO | 62.5 g |
| Talc | | 20 g Talc | | 5 g Talc | | 20 g PVP | | 10 g Talc | 13.5 g |
| PVP | | 20 g PVP | | 10 g ATEC* | | 15 g | | GMS | 3.125 g |
| Palm. Asc. | | 0.025 g | | Polysorbate 80 | | 1 g | | | |
| | | | | Silicone oil | | 1 g | | | |
| Ethanol | | 400 g Ethanol | | 150 g water | | 500 g Ethanol | | 150 g Isopropanol Acetone | 300 g 195.3 g |
| Dry residue | 90.025 g | | 20 g | | 120 g | | 20 g | | 79.125 g |
| Total dry residue including the 500 g of Cellets® 1000 = 829.15 g | | | | | | | | | |
| % omeprazole compared to total dry residue of the microparticles | 6.0 | | | % Eudragit®L compared to total dry residue of the microparticles | 12.0 | | | % Eudragit® E compared to total dry residue of the microparticles | 7.5 |

*ATEC =: acetyl triethyl citrate

The composition of Formulation 4 is indicated in Table 3.2.

TABLE 3.2

| Layer 1 | | Layer 2 | | Layer 3 | | Layer 4 | | Layer 5 | | Layer 6 | |
|---|---|---|---|---|---|---|---|---|---|---|---|
| Ethocel FP prem. | 35 g | Omeprazole | | 50 g TiO$_2$ | | 5 g Eudragit® L30D55 | | 200 g Talc | | 10 g Eudragit® E | 62.5 g |
| TEC* | 7 g | Talc | | 20 g Talc | | 5 g Talc | | 48 g PVP | | 10 g Talc | 26 g |
| Talc | 20 g | PVP | | 20 g PVP | | 10 g ATEC* | | 15 g | | GMS | 3.125 g |
| TiO$_2$ | 5 g | Palm. Asc. | | 0.025 g | | PVP | | 23 g | | | |
| | | | | | | TiO$_2$ | | 10 g | | | |
| | | | | | | Polysorbate 80 | | 1 g | | | |
| | | | | | | Silicone oil | | 1 g | | | |
| Ethanol | 600 g | Ethanol | | 400 g Ethanol | | 150 g Eau | | 400 g Ethanol | | 150 g Isopropanol Acetone | 300 g 195.3 g |
| Dry residue | 60 g | | | 90.025 g | | 20 g | | 281 g | | 20 g | 91.625 g |
| Total dry residue including the 500 g of Cellets® 1000 = 1062.65 g | | | | | | | | | | | |
| | | % omeprazole compared to total dry residue of the microparticles | 4.7 | | | % Eudragit® L compared to total dry residue of the microparticles | 18.8 | | | % Eudragit® E compared to total dry residue of the microparticles | 5.9 |

*ATEC =: acetyl triethyl citrate
*TEC =: triethyl citrate

After 8 days of storage, the omeprazole has been measured by HPLC (i) in the aqueous medium and (ii) within the microparticle.

Figure 3:
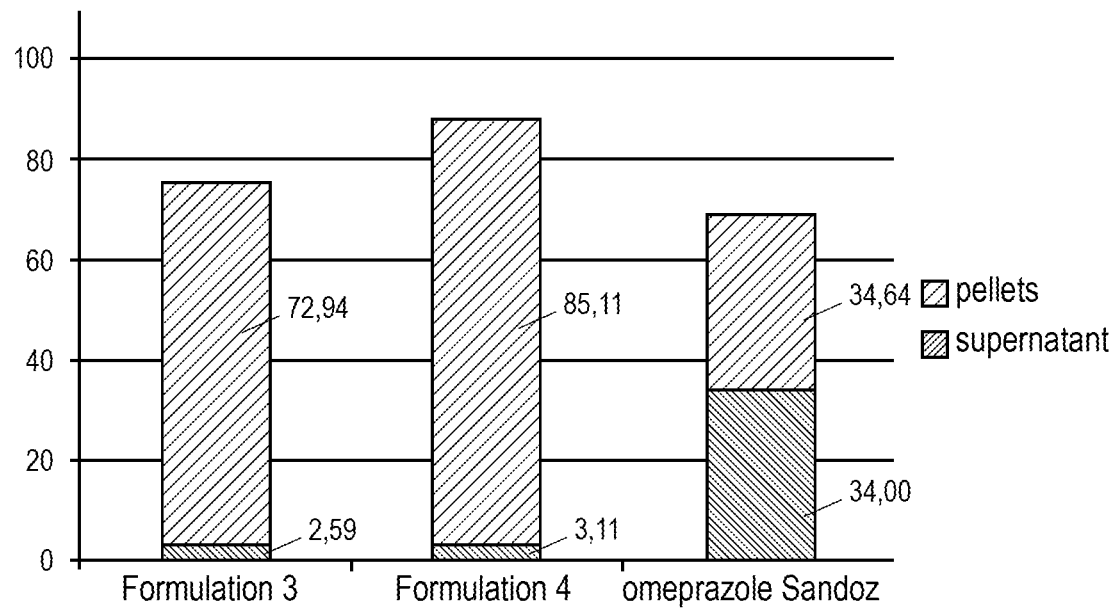

The results are presented in FIG. 3.

Compared to the commercial microparticles (without the outmost external layer of the invention comprising Eudragit® E and GMS) the level of unreleased omeprazole in both samples of Formulation 3 and Formulation 4 according to the present invention after a 8 days of storage period in water (5° C.) has increased from approximately 35% (commercial sample) to 73% and 85%, respectively. Therefore the highest amount of omeprazole that was already released in the aqueous medium was obtained with omeprazole Sandoz® which was not able to avoid early release of the drug during storage. In contrast, both Formulation 3 and Formulation 4 were able to decrease the release of omeprazole during storage. As a consequence, the amount of omeprazole that remained inside the dosage forms was higher in the microparticles according to the present invention than in the commercial omeprazole containing-microparticles.

The increase from 73% (Formulation 3) to 85% (Formulation 4) shows the effect of the optional additional layer of ethylcellulose deposited on top of the Cellets® which reinforces the role of the outmost external layer for increasing the level of non-degraded omeprazole within the microparticles.

Dissolution testing of Formulation 3 according to the present invention and the commercial omeprazole-containing microparticles (Omeprazole-Sandoz 40 mg) have been performed to compare the amount of released omeprazole following 3 consecutive steps:

step 1-4 hours storage at 37° C. in purified water (50 rpm; 750 ml containing 650 mg microparticles). Step 1 mimics the storage conditions of the microparticles in neutral pH syrup-like conditions. Compared to Example 3, the storage has been performed during a shorter period of time (4 hours) but at higher temperature (37° C.) for simulating accelerated shelf-life conditions;

step 2-2 hours storage at 37° C. in an acidic aqueous solution (pH 1.2, HCl 0.1N; 100 rpm; 1000 ml containing the 650 mg microparticles of step 1. Step 2 mimics the gastric environment;

step 3-45 minutes storage at 37° C. in a neutral aqueous solution (pH 6.8; phosphate buffer 0.05M; 100 rpm; 1000 ml containing the same 650 mg microparticles of step 2). Step 3 mimics the conditions of the intestinal drug release phase (classical recommendations states that not less than 75% of omeprazole should be released in these conditions).

At the end of each of the steps 1, 2 and 3, a 10 ml volume of the aqueous solution was withdrawn, diluted with 2 ml NaOH 0.25N. The amount of omeprazole was measured by HPLC. Each dosage has been performed in triplicate.

Figure 4:
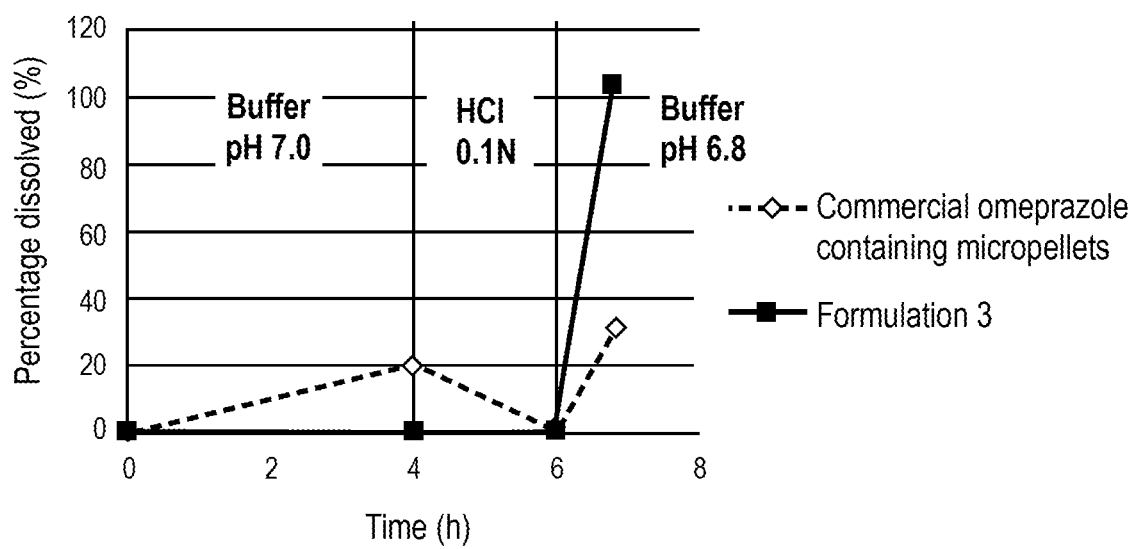

FIG. 4 shows that, omeprazole is already partially released after 4 hours in buffer pH 7.0 as the enteric coating of omeprazole Sandoz® dissolved. In gastric conditions, the drug is degraded. Therefore, in enteric conditions (phosphate buffer 6.8), the amount of omeprazole, that remains in the aqueous medium, only reaches 31%. In contrast, no omeprazole is released during both steps 1 and 2 with Formulation 3 microparticles according to the present invention. Thus, in intestinal condition, the entire amount of the drug is properly released.

Therefore, compared to the commercial omeprazole-containing microparticles, the multilayered microparticles coated with the outmost external layer comprising Eudragit E and GMS according to the present invention (Formulation 3) enable to suppress the release of omeprazole from the inner part of the microparticle to the aqueous medium during their storage at 37° C. during 4 hours. These conditions mimic longer periods of storage time of said microparticles in syrup-like conditions stored either at room temperature or at 4-5° C. The behavior of the same microparticles (after their 4 hours storage in water at 37° C.) when put in acidic conditions during 2 hours (gastric environment) is the same compared to the omeprazole-containing commercial microparticles which means that the microparticles of the invention withstand the acidic conditions by restoring the gastro-resistance of the state-of-the-art gastro-resistant pellets. When the same microparticles encounter the neutral pH intestinal conditions, the expected amount of omeprazole (no less than 75%) is released within 45 minutes.

EXAMPLE 4

Use of a Mixture of AVICEL® RC-591 and SORBITOL as a Viscosifying Agent in the Liquid Pharmaceutical Composition According to the Present Invention A liquid pharmaceutical composition according to the present invention has been prepared by using the microparticles (Formulation 3) according to the invention as disclosed in example 3 which have been suspended in water using different FDA approved viscosifying agents for oral use. These included; PVP from 1 to 20% w/w; Avicel® RC-951 from 1 to 4% w/w; used in combination with sorbitol in ranged of 10 to 60% w/w as the osmotic agent. The aim was to select the best viscosifying agent, in combination with an osmotic agent, easy to disperse, in order to get a final aqueous system with suitable viscosity.

1 g of neutral Cellets® 350 was placed in 100 mL cylinder filled with viscous aqueous solution containing the viscosifying agents in combination with sorbitol. After dispersion by manual shaking, the time of sedimentation was evaluated. The two following mixture allowed preserving stability for more than 30 seconds:

PVP 16% w/w+Sorbitol 30% w/w

Avicel® RC-951 2% w/w+sorbitol 30% w/w

Similar data has been found with the use of Cellets® 200 instead of Cellets® 350 with a preserved stability of even more than 60 seconds.

Then, 5 g of microparticles (Formulation 3) were dispersed in 100 mL flask containing the pre-selected viscous aqueous system and placed at 4° C. After one week, the two aqueous systems composed of PVP 16% w/w+sorbitol 30% w/w and Avicel® RC-951+30% w/w sorbitol allowed stabilizing the coated microparticles. Indeed, no strong purple color appeared which corresponded to the degradation of omeprazole.

EXAMPLE 5

Use of Buffering Agent in the Liquid Pharmaceutical Composition According to the Present Invention 5 g of omeprazole's microparticles (Formulation 3) according to the present invention as disclosed in example 3 were dispersed in a 100 ml flask containing a buffer and stored at 4° C. The buffers selected are not made with a phosphate salt because of its interaction with the Eudragit® E.

Buffers selected have a range of pH included between 6.5 and 7.5.

After a week, the amount of omeprazole was quantified both in solution (evaluation of its release) and inside the coated microparticles (evaluation of its ability to be retained in the dosage form).

The buffers tested are:
Borate (0.1M, 0.05M, 0.01M)
Glycine (0.2M, 0.1M).

Also a sample in water is analyzed as a reference.

Table 5.1 below shows the results obtained in terms of percentage of omeprazole by weight quantities released in the flask and remained inside the microparticles (Formulation 3) after 7 days at 4° C. in buffers or in tap water.

TABLE 5.1

| BUFFER | MEAN + SD % OMEPRAZOLE RELEASED (BY WEIGHT) | MEAN + SD % OMEPRAZOLE INSIDE THE MICROPARTICLES (BY WEIGHT) |
|---|---|---|
| Borate 0.1M | 2.18 ± 0.00 | 61.29 ± 0.27 |
| Borate 0.05M | 1.68 ± 0.01 | 72.22 ± 0.71 |
| Borate 0.01M | 0.53 ± 0.00 | 89.22 ± 0.14 |
| Glycine 0.2M | 0.55 ± 0.00 | 78.91 ± 0.18 |
| Glycine 0.1M | 0.48 ± 0.01 | 83.78 ± 0.55 |
| Tap water | 0.37 ± 0.01 | 52.62 ± 0.54 |

During the experiment, pH values were determined. In fact compounds present inside the different formulations can alter the pH of the medium in the flask, which can influence the resistance of Eudragit® E as a barrier and, consequently, the release of omeprazole.

Table 5.2 below shows the pH values of different liquid pharmaceutical composition according to the invention containing different buffers or only water before storage and after 7 days of storage at 5° C.

TABLE 5.2

| BUFFER | pH | pH AFTER 7 DAYS |
|---|---|---|
| Borate 0.1 M | 7.4 | 7.34 |
| Borate 0.05 M | 7.4 | 7.34 |
| Borate 0.01 M | 7.4 | 6.99 |
| Glycine 0.2 M | 7.4 | 6.83 |
| Glycine 0.1 M | 7.4 | 6.74 |
| water | 6.8 | 6.47 |

The test shows that the buffers can maintain stable the pH of the liquid pharmaceutical composition according to the present invention.

The most suitable buffer according to the amount of omeprazole that still remained inside the microparticles after one week at 4° C. seemed to be borate buffer 0.01M.

Then, 5 g of microparticles (Formulation 3) were dispersed in 100 mL flask containing aqueous solution containing PVP 16% w/w or Avicel® RC-951 +sorbitol 30% w/w +borate buffer 0.01M pH 7.4 in order to evaluate the amount of omeprazole that still remained inside the coated microparticles.

After one week, 86% w/w and 72% w/w of omeprazole remained in microparticles (Formulation 3) when dispersed in aqueous medium containing PVP and Avicel® RC-951 as viscosifying agents, respectively. After two weeks, 80% w/w and only 34% w/w of omeprazole remained in microparticles (Formulation 3) when dispersed in aqueous medium containing PVP and Avicel® RC-951 as viscosifying agents, respectively.

Figure 5:
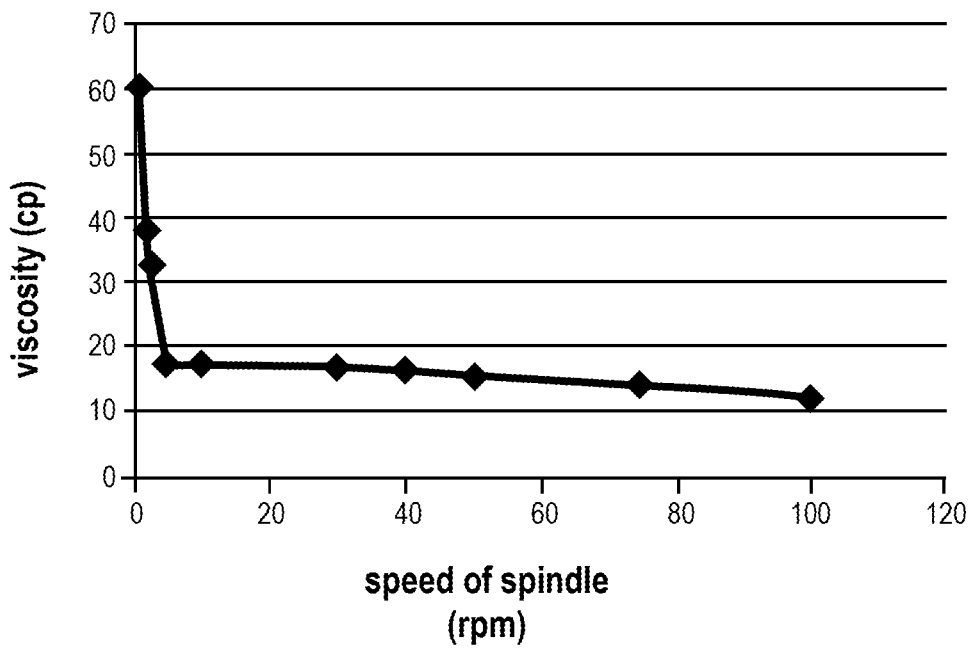
FIG. 5 represents the rheological profile (viscosity (cp) vs. shear stress (rpm)) of an aqueous solution containing PVP 16% w/w +sorbitol 30% w/w +borate buffer 0.01M pH 7.4 at ambient temperature, 1-2-2.5-5-10-30-40-50-75-100 rpm (Brookfield, USA).

Therefore, rheological evaluation (FIG. 5) of an aqueous solution containing PVP 16% w/w+sorbitol 30% w/w+borate buffer 0.01M pH 7.4 was performed at ambient temperature with a Brookfield rheometer. It was observed that the system was characterized by pseudoplastic behavior. Indeed, the viscosity rapidly decreased at the lowest values of shear stress (1-2.5 rpm). This means that the syrup present suitable rheological properties to be administered as it seemed to flow properly after a low shear stress (e.g. manual agitation before administration).

EXAMPLE 6

Use of Alkaline Agents in the First Coating Containing the Pharmaceutically Active Compound (Active Layer) to Increase the Stability of Acid Labile Pharmaceutically Active Compound While Decreasing the Mean Diameter of the Microparticles When the mean diameter $D_{50}$ in volume (measured by the laser granulometer Malvern Mastersizer® 3000) of the microparticles was decreased from 1000 to 500 μm, the time of process was increased to reach similar amount of omeprazole due to the increase of the surface/volume ratio of the core (e.g. Cellets® microspheres).

Therefore, omeprazole (the acid labile pharmaceutically active compound), which is subjected to environmental instabilities such as light and oxygen, can be more easily degraded during the coating. This issue can be visually observed by the modification of the coloration from white to brown of the dispersion containing the acid labile pharmaceutically active compound used for obtaining the first coating layer 1 (i.e. active layer) on the pellet during the preparation of the core of the microparticle. Thus, the coated microparticles are also colored in brown, whose color intensity is dependent on the rate of degradation of the drug from light to dark brown.

The influence of alkaline additives (Disodium hydrogen phosphate dihydrate for example) in the active layer on the stability of omeprazole during the first coating was evaluated with Cellets® 500 (Table 6.1).

TABLE 6.1

Compositions of Formulation 5 and Formulation 6

| | Formulation 5 (g) | Formulation 6 (g) |
|---|---|---|
| Pellet : Cellets ® 500 | 1500 | 1500 |
| Active layer composition | | |
| Omeprazole | 150 | 150 |
| PVP | 60 | 60 |
| Talc | 60 | 60 |
| Ascorbyl palmitate | 3 | 3 |
| Disodium hydrogenophosphate dihydrate | 0 | 17.25 |
| Solvent | | |
| Ethanol | 1200 | 1200 |
| Total weight | 1773 | 1790.25 |
| Dry residue | 273 | 290.25 |
| Percentage of coating (%) | 15 | 16 |

In order to preserve similar time of process, the amount of coating was kept constant around 15% (w/w). It was observed that, when no alkaline additive (Disodium hydrogenophosphate dihydrate:2Na HPO$_4$.2H$_2$O) was added in the formulation of the active layer, the yield of the process only reached 73%. The addition of disodium hydrogenophosphate dehydrate (alkaline additive) stabilized the omeprazole during the process. In ratio pharmaceutically active compound /alkaline additive of 8.7, the yield of process was increased to 82%.

Then, similar formulation of the active layer was applied to microparticles characterized by a mean diameter of 263 µm D$_{50}$ in volume (measured by the laser granulometer Malvern Mastersizer® 3000) (Cellets® 200) (Table 6.2).

TABLE 6.2

Composition of Formulation 7

|  | Formulation 7 (g) |
|---|---|
| Pellet: Cellets ® 200 | 1500 |
| Active layer composition | |
| Omeprazole | 150 |
| PVP | 60 |
| Talc | 60 |
| Ascorbyl palmitate | 3 |
| Disodium hydrogenophosphate dihydrate | 17.25 |
| Solvent | |
| Ethanol | 1200 |
| Total weight | 1790.25 |
| Dry residue | 290.25 |
| Percentage of coating (%) | 16 |

Quantification after the active layer has shown a yield similar to that obtained with Cellets® 500 (Formulation 6) as the percentage of non-degraded omeprazole reached 85%.

Moreover, it was demonstrated that the addition of water together with ethanol during the process of preparation of the active layer increased the stability of omeprazole during the process due to the solubilization of the alkaline additive. Indeed, using a 3/1 ratio water/ethanol similar to that in Formulation 7 (Formulation 8), the amount of non-degraded pharmaceutically active compound after the active layer coating reached 93%.

EXAMPLE 7

Compositions Suitable for Obtaining Proper Gastroresistance According to the Invention Without the Outmost External Protection Coating Layer The rationale for the delayed release, and more particularly enteric release layer of the microparticle according to the present invention, can be the protection of the gastric mucosa, the protection of the pharmaceutically active compound against the influence of acidic gastric medium or intended release of the pharmaceutically active compound in a predefined segment of the gastro-intestinal tract for local treatment.

In this way, the European Pharmacopoeia 8$^{th}$ Edition guidelines for enteric product recommend that, at least, two points should be included in the specification on in vitro dissolution of a gastroresistant product: an early time point to exclude release in the acidic medium (less than 10% dissolved after 2 hours) and one to ensure that the majority of the active substance (80%) has been released in a (near) neutral medium.

Both the ratio alkaline additive/omeprazole and solvent: water/ethanol were fixed at 30.5 and 3.0, respectively, in the active coating layer to obtain the better stability of the pharmaceutically active compound both during the coating process and the dissolution test in acidic medium. The amounts of the first (active layer) and the second coating (intermediate protective layer) were set at 35.0% and 4.85% w/w, respectively. Moreover, the yield of the process was remained higher than 90%.

TABLE 7.1

Composition of Formulation 9

|  | Layer 1 (g): active layer | Layer 2 (g): intermediate protective layer | Layer 3 (g): enteric coating layer |
|---|---|---|---|
| Cellets ® 200 | 611.25 | 951.05 | 999.55 |
| Omeprazole | 183 | 0 | 0 |
| Eudragit ® L100-55 | 0 | 0 | 420 |
| ATEC | 0 | 0 | 56 |
| PVP | 73 | 24.5 | 0 |
| Talc | 73 | 12 | 98 |
| Ascorbyl palmitate | 4 | 0 | 0 |
| Titane dioxide | 0 | 12 | 0 |
| 2Na HPO$_4$•2H$_2$O | 6 | 0 | 0 |
| Silicon oil | 0.8 | 0 | 0 |
| Solvents | | | |
| Ethanol | 306 | 300 | 2500 |
| Water | 917 | 0 | 0 |
| Total weight | 951.05 | 999.55 | 1517.55 |
| Dry residue | 339.8 | 48.5 | 518 |
| Coating (%) | 35 | 4.85 | 34.13 |

Figure 6:
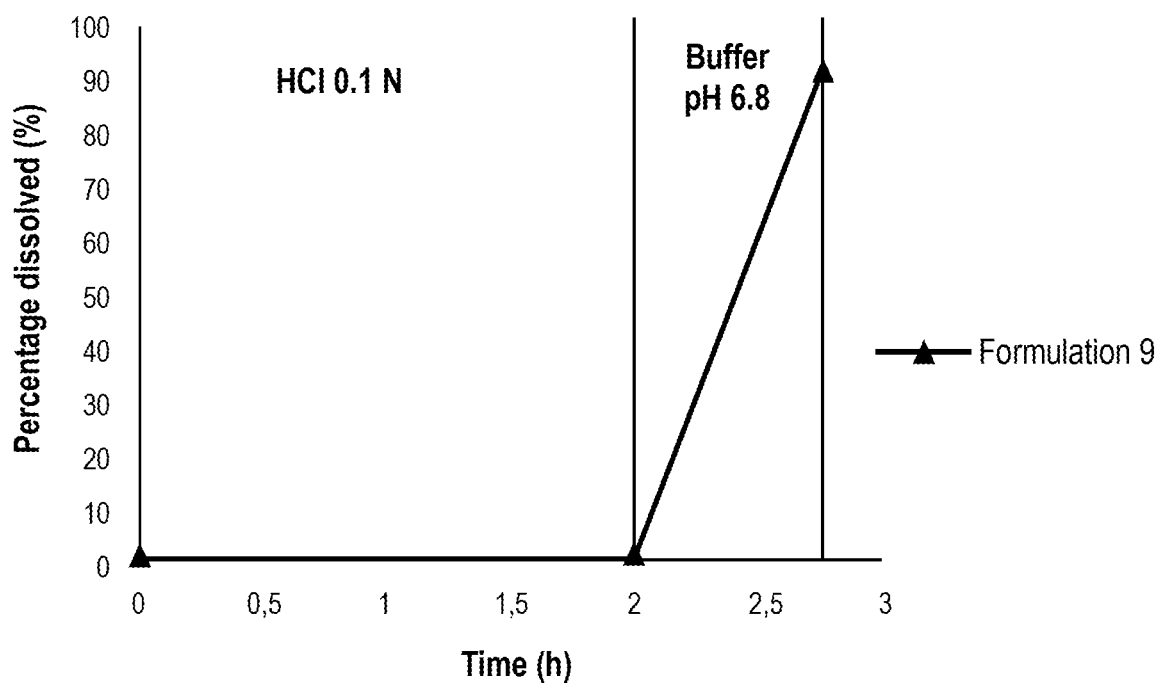
FIG. 6 represents the dissolution profile of the microparticles (Formulation 9) without the outmost layer according to the present invention using the European Pharmacopoeia VIII Edition recommendation for enteric dosage form: 2 hours in acidic medium followed by 45 min in phosphate buffer pH 6.8 (1 L, 37° C., paddle method, 100 rpm).

According to the present invention, the percentage of the third layer at least 30% and more particularly around 35% (w/w) seems to meet the recommendations of both the European and US Pharmacopoeia for enteric product (FIG. 6). Indeed, the percentage of omeprazole released in phosphate buffer pH 6.8 was higher than 80% (w/w) to reach 93% (w/w). This result means that the dissolution of the third layer was completed after 45 min which is particularly surprising with such percentage of enteric coating.

The use of an alkaline agent may be avoided when using esomeprazole magnesium instead of omeprazole. Therefore, the use of water in the composition of coating dispersion, which was added to dissolve the alkaline agent, can be avoided.

TABLE 7.2

Composition of Formulation 11

|  | Layer 1 (g): active layer | Layer 2 (g): intermediate protective layer | Layer 3 (g): enteric coating layer |
|---|---|---|---|
| Cellets ® 200 | 793 | 937.6 | 1001.6 |
| Esomeprazole Mg | 79 | 0 | 0 |
| Eudragit ® L100-55 | 0 | 0 | 420 |
| ATEC | 0 | 0 | 56 |
| PVP | 32 | 32 | 0 |
| Talc | 32 | 16 | 98 |
| Ascorbyl palmitate | 1.6 | 0 | 0 |
| Titane dioxide | 0 | 16 | 0 |
| Solvents | | | |
| Ethanol | 660 | 238 | 3500 |
| Total weight | 937.6 | 1001.6 | 1575.6 |

TABLE 7.2-continued

| | Composition of Formulation 11 | | |
|---|---|---|---|
| | Layer 1 (g): active layer | Layer 2 (g): intermediate protective layer | Layer 3 (g): enteric coating layer |
| Dry residue | 144.6 | 64 | 574 |
| Coating (%) | 15.42 | 6.4 | 36.4 |

As observed with omeprazole, the yield of process was higher than 90% w/w despite the absence of alkaline agent. After 2 hours in acidic medium pH 1.2, the release of esomeprazole Mg reached 2% w/w which was lower than the European Pharmacopoeia (8$^{th}$ Ed.) recommended guidelines for enteric products. After 45 min in phosphate buffer pH 6.8, after the dissolution of the enteric layer the drug was released in the dissolution medium (FIG. 10).

Example 8

Assessment of the Gastroresistance of 3-Layered Coated Microparticles Without the Outmost Layer According to the Invention Compared to Marketed Product Released by Fargon The marketed product Syrspend® SF Alka, released by Fagron, is described as a ready-to-use mixture of powders to be reconstituted to get neutral suspension suitable for drugs that are unstable at acidic pH. It is claimed that Syrspend® SF Alka was designed for pediatric and geriatric patients who have difficulty in swallowing or chewing solid pharmaceutical compositions. Therefore, such preparation is described as an alternative to conventional solid form products containing omeprazole.

Both the 3-layered coated microparticles (Formulation 9) according to the invention and the marketed product Syrspend® SF Alka were evaluated according to the European pharmacopoeia 8$^{th}$ Edition guidance's for in vitro dissolution tests of enteric products. Both products were placed in acidic medium pH 1.2 for 2 hours followed by 45 min in phosphate buffer pH 6.8 (FIG. 7).

In Syrspend® SF Alka, omeprazole is only dispersed in alkaline dispersion without any kind of physical protection. Therefore, the drug was degraded in acidic medium pH 1.2 within 2 hours and none non-degraded omeprazole was found in phosphate buffer pH 6.8. In contrast, formulation 9 preserved the stability of omeprazole in acidic medium pH 1.2 for 2 hours and 90% of the drug was released in phosphate buffer pH 6.8 after 45 min as recommended by the European pharmacopoeia 8$^{th}$ Edition guidance's for in vitro dissolution tests of enteric products.

EXAMPLE 9

Assessment of the Efficacy of the 5-Layered Coated Microparticles (Cellets® 200) According to the Present Invention Both the qualitative and quantitative compositions as well as the percentage of the third layer being optimized to meet the recommendations of both the European and US Pharmacopoeia for enteric product using Cellets® 200, the efficacy of the 5-layered coated microparticles was then assessed according to the invention.

The percentage of the third and the fifth layers reached 34% (w/w) and 30% (w/w), respectively (Table 9.1). Aluminum oxide was added to avoid sticking issue during the coating.

TABLE 9.1

| | Composition of Formulation 10 | | | | |
|---|---|---|---|---|---|
| | Layer 1 (g): active layer | Layer 2 (g): intermediate protective layer | Layer 3 (g): enteric coating layer | Layer 4 (g): second protective layer | Layer 5 (g): outmost coating layer |
| Cellets ® 200 | 1500 | 2336 | 1000 | 1000 | 1060 |
| Omeprazole | 450 | 0 | 0 | 0 | 0 |
| Eudragit ® L100-55 | 0 | 0 | 420 | 0 | 0 |
| Eudragit ® E | 0 | 0 | 0 | 0 | 324 |
| ATEC | 0 | 0 | 56 | 0 | 0 |
| PVP | 180 | 60 | 0 | 30 | 0 |
| GMS | 0 | 0 | 16 | | |
| Talc | 180 | 30 | 98 | 30 | 104 |
| Ascorbyl palmitate | 9 | 0 | 0 | 0 | 0 |
| Titane dioxide | 0 | 30 | 0 | 0 | 0 |
| Aluminum oxide | 0 | 0 | 0 | 0 | 16 |
| 2Na HPO$_4$•2H$_2$O | 15 | 0 | 0 | 0 | 0 |
| Silicon oil | 2 | 0 | 0 | 0 | 0 |
| Solvents | | | | | |
| Ethanol | 750 | 730 | 2500 | 350 | 0 |
| Isopropanol | 0 | 0 | 0 | 0 | 1560 |
| Acetone | 0 | 0 | 0 | 0 | 850 |
| Water | 2250 | 0 | 0 | 0 | 150 |
| Total weight | 2336 | 2456 | 1518 | 1060 | 1520 |
| Dry residue | 836 | 120 | 518 | 60 | 460 |
| Coating (%) | 36 | 5 | 34 | 6 | 30 |

Quantification at the end of the process (after the fifth layer) has shown a percentage of non-degraded omeprazole of 92% which demonstrated the stability of the drug during the entire coating process.

Moreover, the particle size distribution remained homogenous, monomodal without agglomerates and the mean diameter did not drastically increase during the coating process (FIG. 11).

Dissolution studies were performed to evaluate the ability of the developed formulation to release omeprazole only in phosphate buffer medium pH 6.8 (FIG. 8). Omeprazole was not released in acid medium pH 1.2 for 2 hours. Then, 90.5% w/w of the drug were released within 45min in phosphate buffer pH 6.8. Therefore, it can be assessed that the fifth layer was effectively dissolved at pH 1.2 within 2 hours although its high proportion (30% w/w) and that the third layer (enteric coating) avoided the early release and degradation of omeprazole in acidic environment. Moreover, the enteric coating was properly dissolved at pH 6.8, allowing the release of omeprazole only in phosphate buffer solution which mimicked the intestinal pH.

A fixed amount of the 5-layered coated microparticles from Formulation 10 was also dispersed in 100 mL of syrup according to the invention (e.g. Avicel® RC-951 2% w/w and sorbitol 30% w/w) to evaluate its stability as a function of time. After 7 days in the fridge (4° C.), no omeprazole was released in the external phase of the syrup (i.e. supernatant, <2%) and the content of omeprazole in the whole syrup (i.e. inside the pellets+supernatant) remained constant, demonstrating the ability of the fifth coating to retain the drug inside the dosage form and protect it during storage in the fridge. Acceptable results in term of stability or absence of drug release in the syrup were also obtained after a 1-month storage in the fridge.

Moreover, the time of sedimentation after reconstitution is higher than 5 minutes which allows the reproducibility of the taken dose (standard deviation lower than 1%), regardless of the targeted amount of omeprazole (20 or 40 mg).

In all these examples, the proton pump inhibitor omeprazole was mainly used as a worst-case model due to its high sensitivity to temperature, pH and photooxidation. The proof of concept realized with such labile drug allows similar development for other more stable compounds such as for example diclofenac, furosemide or tramadol.

EXAMPLES 10 and 11

Assessment of the Efficacy of the 5-Layered Coated Microparticles (Cellets® 200) According to the Present Invention With Diclofenac (Formulation 12) and Tenoxicam (Formulation 13) as Model Drugs Similar products according to the invention including an enteric coating and an external protective layer can be obtained with other drugs such as diclofenac and tenoxicam. Indeed, the yield of the coating process after 5 coatings remained higher than 90% (w/w). Moreover, according to the invention, the 5-layered coated microparticles meet the recommendations of both the European and US Pharmacopoeia for enteric product using Cellets® 200, regardless of the incorporated drug.

TABLE 10.1

Composition of the 5-layered coated microparticles containing diclofenac (Formulation 12)

|  | Layer 1 (%) - active layer | Layer 2 (%) - intermediate protective layer | Layer 3 (%) - enteric coating layer | Layer 4 (%) - second protective layer | Layer 5 (%) - outmost coating layer |
|---|---|---|---|---|---|
| Diclofenac | 48-70 | 0 | 0 | 0 | 0 |
| Eudragit® L100-55 | 0 | 0 | 60-80 | 0 | 0 |
| Eudragit® E | 0 | 0 | 0 | 0 | 60-80 |
| ATEC | 0 | 0 | 8-15 | 0 | 0 |
| PVP | 15-25 | 40-60 | 0 | 40-60 | 0 |
| GMS | 0 | 0 | 0 | 0 | 3-5 |
| Talc | 15-25 | 20-30 | 15-25 | 40-60 | 20-30 |
| Titane dioxide | 0 | 20-30 | 0 | 0 | 0 |
| Aluminum oxide | 0 | 0 | 0 | 0 | 3-5 |
| Silicon oil | 0-2 | 0 | 0 | 0 | 0 |
| Coating (%) | 2-40 | 3-8 | 15-40 | 3-8 | 15-40 |

TABLE 11.1

Composition of the 5-layered coated microparticles containing tenoxicam (Formulation 13)

|  | Layer 1 (%) - active layer | Layer 2 (%) - intermediate protective layer | Layer 3 (%) - enteric coating layer | Layer 4 (%) - second protective layer | Layer 5 (%) - outmost coating layer |
|---|---|---|---|---|---|
| Tenoxicam | 48-70 | 0 | 0 | 0 | 0 |
| Eudragit® L100-55 | 0 | 0 | 60-80 | 0 | 0 |
| Eudragite E | 0 | 0 | 0 | 0 | 60-80 |
| ATEC | 0 | 0 | 8-15 | 0 | 0 |
| PVP | 15-25 | 40-60 | 0 | 40-60 | 0 |
| GMS | 0 | 0 | 0 | 0 | 3-5 |
| Talc | 15-25 | 20-30 | 15-25 | 40-60 | 20-30 |
| Titane dioxide | 0 | 20-30 | 0 | 0 | 0 |
| Aluminum oxide | 0 | 0 | 0 | 0 | 3-5 |
| Silicon oil | 0-2 | 0 | 0 | 0 | 0 |
| Coating (%) | 2-40 | 3-8 | 15-40 | 3-8 | 15-40 |

EXAMPLE 12

Assessment of the Efficacy of Coated Budesonide-Containing Microparticles (Cellets® 200) According to the Present Invention for Colonic Delivery The ability to avoid both the degradation and the release of omeprazole (a worst-case model) in the syrup during storage as well as its ability to meet the recommendations of both the European and US Pharmacopoeia for enteric product being assessed with the 5-layered coated microspheres, the colonic release of budesonide from coated microspheres according to the present invention was assessed only with 2 layers : the first one containing the drug and the second one containing the colonic polymer Eudragit® S100.

The isolation layer between the active and colonic layer could be avoided since budesonide was not incompatible with the colonic polymer Eudragit® S100. Therefore, the colonic dosage forms contained four layers: the first layer containing the drug, the second layer containing Eudragit® S100 as the colonic polymer, the third was an isolation layer between the colonic coating and the outmost external protection coating layer and the last layer was based on Eudragit® E derivatives and GSM according to the present invention. The compositions of layers three and four were similar to those described in Table 9.1 for layer four and five, respectively.

Two percentages of the second layer were evaluated: 24% (w/w) and 33% (w/w) for Formulation 14 and Formulation 15, respectively (Table 10.1). The percentage of layers 3 and 4 were similar to those described in Table 9.1. for layers 4 and 5 and reached around 6 and 30% (w/w), respectively.

TABLE 12.1

Composition (g) of Formulation 14 and Formulation 15

|  | Formulation 14 | | Formulation 15 | |
| --- | --- | --- | --- | --- |
|  | Layer 1 (g) | Layer 2 (g) | Layer 1 (g) | Layer 2 (g) |
| Cellets ® 200 | 1500 | 1000 | 1500 | 1000 |
| Budesonide | 22.5 | 0 | 22.5 | 0 |
| Eudragit S100 | 0 | 250 | 0 | 400 |
| TEC | 0 | 34 | 0 | 54 |
| PVP | 7.5 | 0 | 7.5 | 0 |
| Talc | 7.5 | 61 | 7.5 | 96 |
| Ethanol | 750 | 0 | 750 | 0 |
| Isopropanol | 0 | 1890 | 0 | 2970 |
| Water | 0 | 340 | 0 | 530 |
| Total weight | 1537.5 | 1311 | 1537.5 | 1496 |
| Dry residue | 37.5 | 311 | 37.5 | 496 |
| Coating (%) | 2.4 | 24 | 2.4 | 33 |

Quantification at the end of the process has shown a yield of around 90% which demonstrated the stability of the drug during the coating process.

Dissolution studies were performed to evaluate the ability of the developed formulation to release budesonide only in phosphate buffer medium pH 7.5 (FIG. 9). Budesonide was not released in acid medium pH 1.2 for 2 hours. Then, more than 90% w/w of the drug were released within 1 hour in phosphate buffer pH 7.5. Therefore, it can be assessed that the second layer (colonic coating) avoided the early release of budesonide in acidic environment. The choice of Eudragit® S100 as the colonic polymer allowed a release at a pH higher than 7.0 which allows a targeted release at the lower part of the intestine (e.g. colon). Moreover, it was properly dissolved at pH 7.5, allowing the release of the drug only in phosphate buffer solution which mimicked the colonic pH.

EXAMPLE 13 & 14

Assessment of the Efficacy of Coated Budesonide-Containing Microparticles (Cellets® 200) According to the Present Invention for Colonic Delivery of Beclometasone Dipropionate (Formulation 16) and Mesalazine (Formulation 17)

Similar data can be obtained with other drugs such as beclometasone dipropionate or mesalazine. Indeed, the yield after the successive coatings remained higher than 90% (w/w). Moreover, according to the invention, the incorporated drug were not released in acid medium pH 1.2 for 2 hours. Then, more than 90% w/w of the drug were released within 1 hour in phosphate buffer pH 7.5 (colonic release). The percentage of layers 3 and 4 were similar to those described in Table 9.1. for layers 4 and 5 and reached 6-8% and 20-25% (w/w), respectively.

TABLE 13.1

Composition (% w/w) of the first two layers of the 4-layered coated microparticles containing beclometasone dipropionate for colonic release (Formulation 16).

|  | Layer 1 (% w/w) | Layer 2 (% w/w) |
| --- | --- | --- |
| Beclometasone dipropionate | 40-80 | 0 |
| Eudragit ® S100 | 0 | 50-85 |
| TEC | 0 | 5-20 |
| PVP | 10-40 | 0 |
| Talc | 10-40 | 10-40 |
| Coating (%) | 3-8 | 20-40 |

Due to the high dose of mesalazine that should be used to reach the therapeutic activity (250-500 mg), the core of the microspheres was obtained by hot melt extrusion (Formulation 17). The compositions of the other layers from the second to the fifth were similar to that used with beclometasone dipropionate.

EXAMPLE 15

Assessment of the Efficacy of Coated Budesonide-Containing Microparticles (Cellets® 200) According to the Present Invention for Sustained-Delivery The ability to provide both enteric and colonic releases being assessed according to the present invention, the sustained-release of budesonide from coated microspheres according to the present invention was also assessed only with 2 layers : the first one containing the drug and the second one containing sustained-release polymers Eudragit® RS, RL types or a mixture of thereof. Moreover, the ability of providing a sustained-release was assessed using both organic solutions and aqueous dispersions of the sustained-release polymers.

The isolation layer between the active and sustained-release layer could be avoided since budesonide was not incompatible with the sustained-release polymers as well as the isolation layer between the sustained-release polymers and the outmost external protection coating layer since the sustained-release polymers were not incompatible with the protective polymer.

Therefore, the prolonged-release dosage forms contained three layers: the first layer containing the drug, the second layer containing Eudragit® RS PO or a mixture of Eudragit® RS 30D and Eudragit® RL 30D (similar results could be obtained by mixtures of Eudragit® RS PO and RL PO) as the sustained-release polymers and the outmost external protection coating layer that was based on Eudragit® E derivatives and GSM according to the present invention. The compositions of the outmost external protection coating layer was similar to that described in Table 9.1 for layer 5.

Two percentages of the second layer were evaluated: 12% (w/w) and 10% (w/w) for Formulation 18 and Formulation 19, respectively (Table 15.1). The percentage of the outmost external protection coating layer was similar to that described in Table 9.1. for layer 5 and will reach around 15-30% (w/w).

TABLE 15.1

Composition (a) of Formulation 18 and Formulation 19

|  | Formulation 18 | | Formulation 19 | |
| --- | --- | --- | --- | --- |
|  | Layer 1 (g) | Layer 2 (g) | Layer 1 (g) | Layer 2 (g) |
| Cellets ® 200 | 1500 | 1000 | 1500 | 1000 |
| Budesonide | 22.5 | 0 | 22.5 | 0 |
| Eudragit RS PO | 0 | 100 | 0 | 0 |
| Eudragit RS 30D | 0 | 0 | 0 | 70 |
| Eudragit RL 30D | 0 | 0 | 0 | 30 |
| TEC | 0 | 10 | 0 | 15 |
| PVP | 7.5 | 10 | 7.5 | 0 |
| Talc | 7.5 | 25 | 7.5 | 50 |
| Lactose microfine | 45 | 0 | 45 | 0 |
| Polysorbate 80 | 0 | 1 | 0 | 0 |
| Silicon | 0 | 0 | 0 | 1 |
| Ethanol | 750 | 0 | 750 | 0 |
| Isopropanol | 0 | 2163 | 0 | 0 |
| Water | 0 | 67 | 0 | 401 |
| Total weight | 1582.5 | 1135 | 1582.5 | 1150 |
| Dry residue | 82.5 | 135 | 82.5 | 150 |
| Coating (%) | 5.2 | 12 | 5.2 | 10 |

Quantification at the end of the process has shown a yield higher than 90% regardless of the formulation and coating parameters which demonstrated the stability of the drug during the coating process.

Dissolution studies were performed in phosphate buffer pH 7.5 for 24 hours to evaluate the potential ability of the developed formulation to sustain the release budesonide immediately after administration (FIG. 12).

Budesonide being slightly soluble in water, lactose was added in the composition of the first layer to allow its release in the dissolution medium. In Formulation 18, Eudragit® RS was used in organic solution to get a very cohesive barrier layer. In Formulation 19, aqueous dispersions of a mixture of Eudragit® RS 30D and Eudragit® RL 30D was used to modulate the release of budesonide (similar sustained release effect can be obtained by using mixtures of Eudragit RS PO and RL PO). Eudragit® RL types being more permeable that Eudragit® RS types, it was possible to get a faster release than that observed with Formulation 18.

As it can observed in FIG. 12, the release of budesonide was prolonged more than 24 hours with Formulation 18 and more than 8 hours for Formulation 19 according to the present invention. Therefore, it can be possible to modulate the sustained-release of a drug depending on the composition of the second layer.

Similarly to the example 9, a fixed amount of the 3-layered sustained release coated microparticles from Formulation 19 can also dispersed in 100 mL of syrup according to the invention (e.g. Avicel® RC-951 2% w/w and sorbitol 30% w/w) to evaluate its stability as a function of time. After 7 days in the fridge (4° C.), no budesonide was released in the external phase of the syrup (i.e. supernatant, <2%) and the content of budesonide in the whole syrup (i.e. inside the pellets+supernatant) remained constant, demonstrating the ability of the third protective coating to retain the drug inside the dosage form and protect it during storage in the fridge. Acceptable results in term of stability or absence of drug release in the syrup were also obtained after a 1-month storage in the fridge.

Moreover, the sedimentation time after reconstitution was similar to that obtained in the example 9 (i.e. higher than 5 minutes), which allows the reproducibility of the taken dose (standard deviation lower than 5%).

EXAMPLES 16 & 17

Assessment of the Efficacy of Coated Containing Microparticles (Cellets® 200) According to the Present Invention for the Sustained-Delivery of Furosemide (Formulation 20) and Tamsulosine HCl (Formulation 21)

Similar data can be obtained with other drugs such as furosemide or tamsulosine. Indeed, the yield after the successive coatings remained higher than 90% (w/w). Moreover, according to the invention, the release of the incorporated drugs was sustained between 8 and more than 24 hours in phosphate buffer pH 7.5. The percentage of layer 3 was similar to that described in Table 9.1. for layer 5 and was 20-30% (w/w).

TABLE 16.1

Composition (% w/w) of the first two layer of the 3-layered coated microparticles containing furosemide for sustained-release (Formulation 20).

|  | Layer 1 (% w/w) | Layer 2 (% w/w) |
| --- | --- | --- |
| Furosemide | 40-70 | 0 |
| Eudragit ® RS 30D | 0 | 80-100* |
| Eudragit ® RL 30D | 0 | 0-20* |
| TEC | 0 | 10-20** |
| PVP | 15-25 | 0-15** |
| Talc | 15-25 | 10-50** |
| Silicon | 0-2 | 0-5** |
| Coating (%) | 10-40 | 10-30 |

*Percentage ratios between Eudragit ® RS30D and RL30D
**Percentages expressed in relation to the dry polymers (Eudragit ® RS and RL).

TABLE 17.1

Composition (% w/w) of the first two layers of the 3-layered coated microparticles containing tamsulosine for sustained-release (Formulation 21). The percentage of layer 3 was similar to that described in Table 9.1. for layer 5.

|  | Layer 1 (% w/w) | Layer 2 (% w/w) |
| --- | --- | --- |
| Tamsulosine HCl | 40-70 | 0 |
| Eudragit ® RS 30D | 0 | 80-100* |
| Eudragit ® RL 30D | 0 | 0-20* |
| TEC | 0 | 10-20** |
| PVP | 15-25 | 0-15** |
| Talc | 15-25 | 10-50** |
| Silicon | 0-2 | 0-5** |
| Coating (%) | 2-20 | 10-30 |

*Percentage ratios between Eudragit ® RS30D and RL30D
**Percentages expressed in relation to the dry polymers (Eudragit ® RS and RL).

EXAMPLE 18

Coated Microparticles (Cellets® 263) According to the Present Invention for the Sustained-Delivery of Pramipexole (Formulations 22)

In the case of Pramipexole, the experimental design used with budesonide was used and adapted for this drug substance, namely, a three-layered microparticles to reach a sustained-release thanks to the lack of polymer interaction between the different layers. However, in order to avoid the sticking of the pellets (microparticles) obtained after the coating layer 2 (i.e. sustained-release layer), an additional layer (i.e. layer 2bis) was added for reasons of industrial feasibility. Cellets® 263 was used in this example. However, it is possible to use instead Cellets® 350 if necessary.

TABLE 18.1

Composition (% w/w), expressed in relation to the weight of microparticles coated up to the outmost coating layer, of the 3 or 4 layers coated (multicoated) microparticles containing pramipexole for sustained-release (Formulation 22).

|  | Core | Layer 1 (1st coating layer) | Layer 2 (SL layer: 2nd coating layer) | Layer 2 bis (isolating coating layer) | Layer 3 (outmost coating layer) |
|---|---|---|---|---|---|
| Neutral core (Cellets ® 263) | 48.12 | 0 | 0 | 0 | 0 |
| Pramipexole | 0 | 1.04 | 0 | 0 | 0 |
| PVP | 0 | 0.33 | 0 | 1.51 | 0 |
| Talc | 0 | 0.33 | 4.29 | 1.51 | 6.97 |
| Eudragit ® RS PO | 0 | 0 | 8.58 | 0 | 0 |
| Eudragit ® RL100 | 0 | 0 | 0 | 0 |  |
| TEC | 0 | 0 | 1.28 | 0 | 0 |
| Eudragit ® E100 | 0 | 0 | 0 | 0 | 21.71 |
| GMS | 0 | 0 | 0 | 0 | 3.26 |
| Aluminum oxide | 0 | 0 | 0 | 0 | 1.07 |
| % of coating by weight of the total weight of the particle obtained after the corresponding layer coating | 0 | 1.7 | 14.15 | 3.02 | 33.01 |
| Solvent used for the coating |  | Ethanol | Isopropanol/ water mixture (87/13) | Ethanol | Ethanol/ water ratio of 94/6 |
| % of solid material dispersed in the solvent |  | 5.21 | 22.04 | 17.14 | 20.44 |

The second bis coating layer consists in an isolating coating layer which is readily soluble in water and aimed to avoid possible strong sticking issues observed at the end of the sustained release layer coating process.

The nude cores (1-1.5 Kg) were transferred into a lab-scale fluidized bed coating apparatus (SLFLL_3, Lleal.s.a., Spain) and coated with the coating dispersions until the desired film weight was deposited. According to the properties of the dispersions, the coating parameters were set as follow: drying air inlet temperature 33-37° C.; spraying air pressure 1.5-1.8 bars; coating dispersion flow rate 10-12 g/min.

For the first coating dispersion, pramipexole and PVP were dissolved in ethanol with a gentle stirring system (blade stirrer, Janle, Kunlem, model RW20, Ika Labortechnik, Germany). Then, talc was dispersed at 300 rpm.

The second coating dispersion, contains Eudragit® RS and Eudragit® RL, which were solubilized in an isopropanol water mixture (87:13) at 500 rpm using blade stirrer. TEC and talc were then added under the same condition.

The second bis coating dispersion contains PVP and talc. PVP was dissolved in ethanol with blade stirrer and dispersed at 300 rpm.

The outermost layer dispersion was prepared by solubilizing the Eudragit® E100 granules in an ethanol-water mixture (94/6) at 500 rpm. After its complete solubilization, GMS and aluminium oxide were dispersed using a T25 Ultra-Turrax (IKA®, Staufen, Germany) at 13 500 rpm. Then, talc was added to the suspension at 500 rpm using the blade stirrer.

The coating parameters used for the application for each coating layer in the fluid-bed coater are listed in table 18.2 below.

TABLE 18.2 coating parameters

| Coating parameters | First coating: drug layer | Second coating: sustained-release layer | Second bis coating: isolating coating layer | Third coating: outmost coating layer |
|---|---|---|---|---|
| Inlet air temperature (° C.) | 33-35 | 28-30 | 28-30 | 33-35 |
| Outlet air temperature (° C.) | 25-27 | 25-27 | 25-27 | 26-28 |
| Product temperature (° C.) | 26-28 | 26-28 | 26-28 | 28-30 |
| Air flow (m³/h) | 15-25 | 70-85 | 70-85 | 70-85 |
| Spraying rate (g/min) | 10-12 | 10-12 | 10-12 | 10-12 |
| Air pressure (Bar) | 1.5-1.7 | 1.7-1.9 | 1.7-1.9 | 1.6-1.8 |

The composition of the syrup used for the preparation of the liquid composition containing the microparticles of pramipexole is indicated in the table 18.3 below:

TABLE 18.3 composition of the syrup in g for 100 ml

| Syrup composition | Amount (g) for 100 ml | Function |
|---|---|---|
| Neosorb Sorbitol | 60 | Osmotic agent |
| Kollidon ® 30 (10%) (PVP) | 10 | Viscosifying agent |
| Potassium sorbate | 0.2 | preservative |
| Avicel ® RC 591 | 2 | Viscosifying agent |
| Methylparaben | 0.18 | Preservative |
| Strawberry flavour TGDA ATO | 0.5 | Flavoring agent |
| Cochenillum E124 | 0.01 | Colorant |
| di-sodium hydrogen phosphate di-hydrate | 0.178 | Buffer |
| Sodium carbonate | around 0.06 | pH adjusting agent (alkalinizing agent) |
| Total: | 73.128 |  |
| pH | 7.5 |  |

Characterization of the Multicoated Microparticles Containing Pramipexole According to the Invention Coated Pellets Sieving and Agglomerates To determine the amount of coated-pellet agglomerates and to discard any potential agglomerates, the coated pellets obtained after each step were sieved (i.e. after the 1st, $2^{nd}$ or $2^{nd}$ BIS, and 3rd coating). This step avoids multiple coating or the presence of broken agglomerates during the next steps in the coating process. The sieving was done at 30 Hz for 5 min, using a 500 µm sieve (Rhewum vibrating apparatus, Germany). From the sieved pellets obtained from the previous step, 1 Kg was then used as a starting point for the next coating step.

Size Distribution

The particles size distribution of the multicoated pellets was evaluated after withdrawing the agglomerates by sieving. This evaluation was made by laser diffraction (Mastersizer® 3000, Malvern Instruments, UK), using a dry sample dispersion accessory (Aero S). The SOP used for the analysis included: Fraunhofer scattering, dispersive air pressure of 0.5 bar, vibrating rate of 50%, measurement time of 10 s.

The results obtained for the different batches were put in comparison with the results of uncoated pellets (as reference) in order to evaluate the distribution of coating on the pellets (median diameter (Dv(50)) and mean diameter (D(4, 3)). The median diameter Dv(50) is the size in microns at which 50% of the sample volume is smaller and 50% is larger. The mean diameter D(4,3) is the volume mean diameter of the particles.

Quantification

The drug content was determined by grinding the coated pellets in a mortar and weighing an amount of powder containing a theoretical content equivalent to 2.1 mg of Pramipexole. The drug was extracted using a buffer pH 3.00-methanol mixture in the ratio 60:40. The quantification of Pramipexole in the coated microparticles was performed by HPLC. The HPLC system consisted of a High Performance Liquid Chromatography system (series 1200, Agilent technologies, USA), equipped with a single pump, an autosampler and a diode array UV detector. The column used for the quantification of Pramipexole was a BDS Hypersil™ C18 150 mm×4.6 mm (ThermoFisher Scientific, USA). The chromatographic conditions were set as follow: wavelength 264 nm; flow rate 1 mL/min; temperature 40° C.; injection volume 50 µL; run time 20 min.

Thermogravimetric Analysis

To evaluate the residual amount of solvent after each coating layer and in the final batch, thermogravimetric analysis (TGA) (Q500, TA Instruments, USA) was performed. Approximately 10 mg of intact coated sample was loaded in platinum pans and heated from 30° C. to 170° C. at a heating rate set at 10° C/min. The moisture level was determined by the weight loss obtained in the temperature range between 30° C. and 170° C.

Dissolution Test

A dissolution apparatus (Distek Inc., USA), type II (paddle method), with a rotational speed of 50 rpm and the temperature set at 37° C., was used. During the dissolution test performed on the SR Pramipexole formulation, the multicoated microparticles were maintained for 2 hours in 500 mL of acid medium pH 1.2 (HCL 0,1N). Then a phosphate buffer solution (trisodoium phosphate dodécahydrate) [0.05M] was added up to 600 mL and the pH of medium adjusted to 6.8. Withdraws were made at predetermined times (after 1, 2, 4, 6, 8, 24 hours) to evaluate the percentage of Pramipexole released (HPLC). The withdrawn volumes (2 mL) were replaced with equal volumes of blank medium to maintain the volume of the dissolution medium constant during the whole test. The pH that was selected for these tests corresponded to the pH conditions which permitted to simulate the passage of coated pellets in the gastric medium, and the release of drug after the dissolution of the external protection layer. The pramipexole dissolution profiles obtained from the dry multicoated formulation and from the formulation dispersed in the Syrup were compared to those obtained from the reference product Mirapexin®.

For the reference product, dissolution tests were also performed in a buffer only dissolution medium (i.e. without the acid phase) to determine the effect of acid phase on drug release profiles. Moreover, the tablets were also inserted into an adapted "sinker" (Sinker Basket 8 mesh, BSK008-01, Quality Lab Accessories LLC, Telford, Pa., USA) in order to avoid their floating at the surface of the dissolution medium or their sticking to the wall of the dissolution vessels, which can have an effect on drug release.

Stability Test

The stability of the final dosage forms was evaluated after dispersion of multilayered microparticles in the syrup at pH 7.5 and storage at a controlled temperature (25° C.). The release of drug from the pramipexole multilayered pellets dispersed in the syrup was evaluated during the storage up to 7 weeks and compared to the dissolution results obtained at time 0.

The similarity factor ($f_2$) was used to determine the similarity of dissolution profiles. This was used to verify the similarity of dissolution profiles between our developed technology and the reference product Mirapexin®, but also between the drug release profiles from our developed technology at different time points of storage stability period.

F2 Similarity Factor

Dissolution profile similarity testing can be considered valid only if the dissolution profile has been satisfactorily characterised using a sufficient number of time points. In this equation f2 is the similarity factor, n is the number of time points, R(t) is the mean percent reference drug dissolved at time t after initiation of the study; T(t) is the mean percent test drug dissolved at time t after initiation of the study. For both the reference and test formulations, percent dissolution should be determined. A value of 100 for f2 indicates that the two curves are equal. If f2 increases, similarity increases too. Therefore, a value between 50 and 100 for f2 is considered acceptable or similar.

$$f_2 = 50 \cdot \log \left\{ \left[ 1 + \frac{1}{n} \cdot \sum_{i=3}^{0} (R_t - T_t)^2 \right]^{-0.5} \cdot 100 \right\}$$

Results and Discussion

Design of Multilayered Microparticles

Mirapexin® 2.1 mg SR tablet was used as the reference product to develop the liquid dosage form according to the invention. The external outmost protection layer (i.e. layer 3) had to be enough resistant to avoid the early release of the drug in the supernatant liquid syrup during storage. At the same time, it should be dissolved quickly after oral administration in the stomach to obtain the targeted release profile of the developed dosage form. Based on the polymer involved in the sustained-release layer (i.e. layer 2), it could be possible to obtain release profiles similar to the reference product.

Characterization of Multilayered Microparticles

Size Distribution and Drug Quantification

The results of the particles size distribution of the multicoated pellets is indicated in the table 18.4 below:

TABLE 18.4

| size distribution of the multicoated pellets containing pramipexole | | | |
|---|---|---|---|
| | 1st Layer | 2nd Layer | 3rd Layer |
| Size | Dv (50) 275 µm<br>D (4;3) 277 µm | Dv (50) 318 µm<br>D (4;3) 326 µm | Dv (50) 346 µm<br>D (4;3) 353 µm |

The size of the microparticles increases during the coating procedure but it remains enough low to not create swallowing impairment to patients.

The percentage of agglomerates was limited after the coating process and remained below 5% w/w.

The percentage of Pramipexole inside the pellets was around 95%. The production could be considered satisfactory as this value reached an assay of ±5% of nominal label.

Dissolution Test

First, the release of pramipexole from the reference product Mirapexin® 2.1 mg SR tablet was evaluated, with and without the acid phase of 2 hours to determine the effect of acid, and also by performing the dissolution tests with or without the use of an adapted sinker (to avoid tablet floating or sticking). Only very slight differences between the drug releases profiles were observed depending on the dissolution test conditions as it can be observed in FIG. 13.

After that, the pramipexole release profiles from the multilayered pellets (microparticles) are adjusted by optimizing the sustained-release layer (i.e. modification of the composition and/or the thickness of the second coating). For this purpose, different Eudragit RS/RL ratios (10-0, 9.0-0.5 and 9-1) were used and the thickness of the second coating layer was varied between 20% and 40% w/w in relation of the total weight of the microparticles obtained after the second coating layer). By modifying these parameters, it was possible to cover a wide range of pramipexole release profiles (FIG. 14), and among them to find a release profile as closed as possible to that obtained for the reference product Mirapexin®. The most promising RS/RL ratios are the 10-0 and 9.5-0.5.

At the end of the coating process, a strong sticky effect was observed after the $2^{nd}$ coating, as once stocked in closed recipients, the pellets tend to form solid blocks, which must be broken and sieved before pursuing the next coating step. Such a drastic treatment could potential risk to weaken the coating layer (e.g. apparition of cracks). Therefore an additional coating has been added just after the second coating (i.e. coating 2 bis) to avoid this sticking issue. A dissolution test with and without this additional coating (2 bis), was carried out to ensure that there is no effect on the release of pramipexole. The profiles shown in FIG. 15 show that there is no important effect of this 2 bis coating on the pramipexole release profiles and in the both cases are very close to that obtained from the reference product Mirapexin®.

As shown in FIG. 16, the comparison of the dissolution profiles obtained from the selected Pramipexole multicoated SR (sustained release) pellets before and after dispersion showed a slight decrease of drug release after the dispersion of the pellets in the liquid syrup. This slight decrease can be explained by the solvation of the $2^{nd}$ and the $3^{rd}$ coating layers after the dispersion of the multicoated pellets in the liquid syrup, which can potentially impact the permeability of these coating layers. Interestingly, the drug release profiles from the SR pellets dispersed in the syrup are similar to those obtained from the reference product Mirapexin® SR tablets. The amount of Pramipexole released within 24 hours was around 90% for all the dosage forms evaluated (FIG. 16).

Stability of the Coated Pellets Dispersed in the Liquid Syrup

As it can be seen in FIG. 17 the dissolution profiles obtained from the reconstitutable syrup were only slightly affected during the storage at 25° C. up to 7 weeks. The $f_2$ calculated between the dissolution profiles at time zero and those at the predetermined storage time points demonstrated the similarity in terms of Pramipexole release over time. The $f_2$ values were 79.61, 75.19, 96.30, 90.75 and 82.45, after 1, 2, 4, 6 and 7 weeks storage, respectively.

F2 Similarity Factor

To evaluate the stability of the dissolution profiles obtained from the multicoated pellets dispersed in the syrup during the storage (see before), each dissolution curve obtained after the specified storage time was compared with the dissolution curve obtained at the initial time (0 week).

In order to determine the similarity with the reference product Mirapexin®, each dissolution curve was compared with that obtained from Mirapexin®. The results are indicated in table 18.5 below.

TABLE 18.5 f2 similarity factor for the composition of formulation 20

| Storage weeks | Stability | Mirapexin ® |
|---|---|---|
| 0 |  | 59.54 |
| 2 | 79.61 | 57.98 |
| 3 | 75.19 | 59.05 |
| 4 | 96.30 | 61.90 |
| 6 | 90.75 | 59.49 |
| 7 | 82.45 | 60.17 |

The f2 values obtained after the different storage times were comprised between 59% and 62% (in comparison to the Mirapexin® dissolution profiles). Therefore, the dissolution profiles obtained from the multilayered pellets stored during the 7-week storage at 25° C. could be considered similar to that of the reference product.

CONCLUSION

The oral Pramipexole SR dosage form based on a multilayered microparticle-based technology according to the invention has shown an innovative process that permitted to obtain reconstitutable liquid dosage forms with prolonged-release properties similar to the reference product Mirapexin®.

These multilayered pellets remained stable for at least 7 weeks when suspended in liquid syrup. It is also demonstrated that this technology is a flexible manufacturing process adapted for different drugs and different kinds of releases.

What is claimed is:

1. A chemically stable pharmaceutical aqueous liquid composition intended for oral administration or direct administration in the stomach comprising microparticles homogenously dispersed in an aqueous liquid medium having a pH>6, wherein said microparticles are controlled-release multilayer microparticles comprising:
a core comprising a pharmaceutically active compound, said pharmaceutically active compound being pramipexole;
a controlled-release intermediate coating layer;
an outmost external protection coating layer surrounding the controlled-release intermediate coating layer and containing a mixture of
a) a hydrophilic gastro-soluble component which is insoluble in aqueous media at a pH of between 6.5 and 7.5 and which is selected from a cationic polymer based on dimethylaminomethyl methacrylate, butyl methacrylate and methyl methacrylate, and
b) a hydrophobic and/or insoluble component which is selected from glycerides glyceryl monostearate, wherein the weight ratio of the hydrophilic gastro-soluble component/hydrophobic and/or insoluble component is between 30/1 and 1/1, and wherein less than 20% by weight of the pharmaceutically active compound contained in the microparticles is released in the aqueous liquid medium when the aqueous liquid composition is stored for at least one week at 25° C.

2. The chemically stable pharmaceutical aqueous liquid composition according to claim 1, wherein the controlled-release intermediate coating layer is a prolonged or sustained release coating layer.

3. The chemically stable pharmaceutical aqueous liquid composition according to claim 2, wherein the prolonged or sustained release coating layer includes at least one insoluble film-forming polymer.

4. The chemically stable pharmaceutical aqueous liquid composition according to claim 3, wherein the insoluble film-forming polymer is selected in the group consisting of copolymers of ethyl acrylate, methyl methacrylate and methacrylic acid ester with quaternary ammonium groups.

5. The chemically stable pharmaceutical aqueous liquid composition according to claim 1, wherein the weight ratio hydrophilic gastro-soluble component/hydrophobic and/or insoluble component is of between 10/1 to 30/1.

6. The chemically stable pharmaceutical aqueous liquid composition according to claim 1, wherein it contains at least another intermediate layer between the controlled-release intermediate coating layer and the outmost external protection layer.

7. The chemically stable pharmaceutical aqueous liquid composition according to claim 1, wherein the microparticles are prolonged or sustained release microparticles.

8. The chemically stable pharmaceutical aqueous liquid composition according to claim 1, wherein the microparticles have a median diameter in volume Dv(50) measured by the laser granulometer Malvern Mastersizer of between 80 μm and 2 000 μm.

9. The chemically stable pharmaceutical aqueous liquid composition according to claim 1, wherein it is a suspension, an emulsion, a dispersion, a gel or a paste.

10. The chemically stable pharmaceutical aqueous liquid composition according to claim 1, wherein the liquid medium contains a viscosifying agent, a buffering agent, and/or an osmotic agent.

11. The chemically stable pharmaceutical aqueous liquid composition according to claim 1, wherein the aqueous liquid medium contains a viscosifying agent selected in the group consisting of microcrystalline cellulose, starch, hyaluronic acid, pectin, sodium carboxymethylcellulose, polyvinylpyrrolidone and mixture thereof, a buffering agent, and/or an osmotic agent selected in the group consisting of polyols.

12. A method for treating Parkinson's disease and/or restless legs syndrome comprising the administration of an effective amount of the chemically stable pharmaceutical aqueous liquid composition according to claim 1 to a patient in need thereof.

13. The chemically stable pharmaceutical aqueous liquid composition according to claim 1, wherein the outmost protection coating layer further comprises talc.

14. The chemically stable pharmaceutical aqueous liquid composition according to claim 1, wherein the outmost protection coating layer further comprises aluminum oxide.

15. A chemically stable pharmaceutical aqueous liquid composition intended for oral administration or direct administration in the stomach comprising microparticles homogeneously dispersed in an aqueous liquid medium having a pH>6, wherein said microparticles are controlled-release multilayer microparticles comprising:

a core comprising a pharmaceutically active compound, said pharmaceutically active compound being pramipexole;

a controlled-release intermediate coating layer;

an outmost external protection coating layer surrounding the controlled-release intermediate coating layer and containing a mixture of a) a hydrophilic gastro-soluble component which is insoluble in aqueous media at a pH of between 6.5 and 7.5 and is selected from a cationic polymer based on dimethylaminomethyl methacrylate, butyl methacrylate and methyl methacrylate, b) a hydrophobic and/or insoluble component which is selected from glycerides glyceryl monostearate, and c) talc, wherein the weight ratio of the hydrophilic gastro-soluble component/hydrophobic and/or insoluble component is between 30/1 and 1/1, and wherein less than 20% by weight of the pharmaceutically active compound contained in the microparticles is released in the aqueous liquid medium when the aqueous liquid composition is stored for at least one week at 25° C.

16. The chemically stable pharmaceutical aqueous liquid composition according to claim 15, wherein the outmost external protection coating layer further comprises aluminum oxide.

* * * * *